US012678841B2

(12) United States Patent
Lim et al.

(10) Patent No.: US 12,678,841 B2
(45) Date of Patent: Jul. 14, 2026

(54) FOOD WASTE DISPOSER

(71) Applicant: SAMSUNG ELECTRONICS CO., LTD., Suwon-si (KR)

(72) Inventors: Hyeonkyu Lim, Suwon-si (KR); Keonpyo Koo, Suwon-si (KR); Namsoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 18/342,411

(22) Filed: Jun. 27, 2023

(65) Prior Publication Data

US 2024/0009717 A1      Jan. 11, 2024

Related U.S. Application Data

(63) Continuation of application No. PCT/KR2023/006339, filed on May 10, 2023.

(30) Foreign Application Priority Data

Jul. 6, 2022      (KR) ........................ 10-2022-0083392
Aug. 23, 2022      (KR) ........................ 10-2022-0105827

(51) Int. Cl.
B09B 3/35              (2022.01)
B02C 23/24              (2006.01)
(Continued)

(52) U.S. Cl.
CPC ................ B09B 3/35 (2022.01); B02C 23/24 (2013.01); B09B 3/38 (2022.01); B09B 3/40 (2022.01); *B09B 2101/70* (2022.01)

(58) Field of Classification Search
CPC .... B09B 3/35; B09B 3/38; B09B 3/40; B09B 2101/70; B02C 23/24; B65F 1/14
See application file for complete search history.

(56) References Cited

U.S. PATENT DOCUMENTS 7,614,674 B2      11/2009   Shiono
7,735,761 B2       6/2010   Koh

FOREIGN PATENT DOCUMENTS

CN            101234700 A      8/2008
CN            101386282 A      3/2009
(Continued)

OTHER PUBLICATIONS

KR-101335349-B1_English translation (Year: 2013).*
(Continued)

*Primary Examiner* — Youngsul Jeong

(57)            ABSTRACT
Disclosed herein is a food waste disposer. The food waste disposer includes a cover housing, a disposal arranged inside the cover housing to receive food waste, an exhaust pipe connected to the disposal and configured to guide air containing moisture, a water storage container including a water storage opening configured to collect condensed water from the exhaust pipe, and configured to separate from the cover housing, a water storage cover connected to the exhaust pipe, and configured to cover the water storage opening of the water storage container, and a locking seat configured to limit movement of the water storage container. A space between the water storage container and the water storage cover is sealed in response to the movement of the water storage container being limited by the locking seat.

19 Claims, 33 Drawing Sheets

(51) Int. Cl.
  *B09B 3/38* (2022.01)
  *B09B 3/40* (2022.01)
  *B09B 101/70* (2022.01)

(56) References Cited

FOREIGN PATENT DOCUMENTS

| | | | | | |
|---|---|---|---|---|---|
| CN | 109248902 | A | | 1/2019 | |
| CN | 109248902 | B | * | 3/2021 | .......... B09B 3/0075 |
| CN | 113431532 | A | | 9/2021 | |
| CN | 215623775 | U | | 1/2022 | |
| KR | 10-0808132 | B1 | | 2/2008 | |
| KR | 10-0880786 | B1 | | 2/2009 | |
| KR | 2010-0051506 | | * | 5/2010 | .............. B09B 3/00 |
| KR | 20100051506 | A | | 5/2010 | |
| KR | 10-1268148 | B1 | | 6/2013 | |
| KR | 101335349 | B1 | * | 12/2013 | ........ B02C 18/0092 |
| KR | 10-1738909 | B1 | | 5/2017 | |
| KR | 10-2028957 | B1 | | 10/2019 | |
| KR | 20200082905 | A | | 7/2020 | |
| KR | 2020-0082905 | | * | 9/2021 | .............. B09B 3/00 |
| KR | 102297289 | B1 | | 9/2021 | |

OTHER PUBLICATIONS

CN-109248902-B_English translation (Year: 2021).*
KR-10-2020-0082905_English translation (Year: 2021).*
KR-10-2010-0051506_English translation (Year: 2010).*
KR-10-2020-0082905_English translation (Year: 2020).*
International Search Report and Written Opinion of the International Searching Authority dated Aug. 23, 2023, in connection with International Application No. PCT/KR2023/006339, 11 pages.
Supplementary European Search Report dated Aug. 5, 2025, in connection with European Patent Application No. 23835674.5, 6 pages.
Notification of the First Office Action issued Apr. 22, 2026, in connection with Chinese Patent Application No. 202380033142.5, 15 pages.

* cited by examiner 500-1 (1-1)

500-2 (1-2)

500-3 (1-3)

500-2 (1-4)

FOOD WASTE DISPOSER

CROSS-REFERENCE TO RELATED APPLICATIONS

This application is a bypass continuation of International Application No. PCT/KR2023/006339, filed May 10, 2023, which claims priority to Korean Patent Application No. 10-2022-0083392, filed Jul. 6, 2022, and Korean Patent Application No. 10-2022-0105827, filed Aug. 23, 2022, the disclosures of which are herein incorporated by reference in their entirety.

BACKGROUND

1. Field

The disclosure relates to a food waste disposer, more particularly to the food waste disposer including a water storage configured to store condensed water generated while disposing of food waste.

2. Description of Related Art

A food waste disposer is a device that disposes of food waste by drying, stirring and grinding food waste.

The food waste disposer may include a disposal in which food waste is dried, stirred, and grinded.

The food waste disposer may be provided with an exhaust pipe defining an exhaust flow path connected to a grinding device so as to discharge odors, which is generated in a food waste disposal process, to the outside.

Moisture in air passing through the exhaust flow path may be condensed and liquefied into condensed water. The food waste disposer may include a water storage including a water storage container to collect the condensed water. A water storage space may be defined to store the condensed water in the water storage container.

SUMMARY

Therefore, it is an aspect of the disclosure to provide a food waste disposer capable of easily cleaning a water storage container by allowing the water storage container to be separable.

It is another aspect of the disclosure to provide a food waste disposer capable of not contaminating a surrounding area by preventing a case, in which when a water storage container is received, the water storage container is not easily separated and thus condensed water splashes in an operation.

It is another aspect of the disclosure to provide a food waste disposer capable of, when a water storage container is received, preventing odor, which is generated from condensed water contained in the water storage container, from leaking out of the food waste disposer.

It is another aspect of the disclosure to provide a food waste disposer capable of, when a water storage container is in a locked position, sealing between a water storage cover and the water storage container.

It is another aspect of the disclosure to provide a food waste disposer including a locking seat capable of easily moving a water storage container of condensed water to a water storage cover.

It is another aspect of the disclosure to provide a food waste disposer capable of, while a water storage container moves to a locked position, moving the water storage container while maintaining a level.

It is another aspect of the disclosure to provide a food waste disposer including a locking seat capable of being prevented from being relatively moved while a water storage container moves from a receiving position to a separating position.

It is another aspect of the disclosure to provide a food waste disposer capable of easily moving a locking seat.

It is another aspect of the disclosure to provide a food waste disposer capable of leveling a water storage container while preventing condensed water from leaking out of the water storage container.

Additional aspects of the disclosure will be set forth in part in the description which follows and, in part, will be obvious from the description, or may be learned by practice of the disclosure.

In accordance with an aspect of the disclosure, a food waste disposer includes cover housing, a disposal arranged inside the cover housing and configured to receive food waste, an exhaust pipe connected to the disposal and configured to guide air containing moisture, a water storage container including a water storage opening configured to collect condensed water from the exhaust pipe, and configured to separate from the cover housing, a water storage cover connected to the exhaust pipe, and configured to cover the water storage opening of the water storage container, and a locking seat configured to limit movement of the water storage container. A space between the water storage container and the water storage cover is sealed in response to the movement of the water storage container being limited by the locking seat.

While the water storage container moves from an unlocked position for allowing the movement to a locked position for limiting the movement, the water storage container may move toward the water storage cover.

The food waste disposer may further a base housing configured to support the water storage container between the base housing and the water storage cover. The locking seat may include a lock including a connection shaft support provided to move the water storage container by pressing the base housing while the water storage container moves from the unlocked position to the locked position.

The connection shaft support may be configured to, while the water storage container moves from the unlocked position to the locked position, move from a first position, in which the water storage container and the water storage cover are spaced apart by a first distance, to a second position, in which the water storage container and the water storage cover are spaced apart by a second distance less than the first distance.

The food waste disposer may further include a gasket positioned between the water storage container and the water storage cover and configured to create a seal between the water storage container and the water storage cover in response to the water storage container being in the locked position.

The locking seat may further include a support plate coupled to the water storage container and arranged between the water storage container and the base housing. The connection shaft support may be configured to move the water storage container by pressing the support plate while the water storage container moves from the unlocked position to the locked position.

The support plate may be configured to move together with the water storage container in response to the water storage container being moved from the locked position to the unlocked position. The water storage container may slide relative to the support plate while the water storage container is separated out of the cover housing.

The lock may further include a rotation shaft rotatably coupled to the support plate, and a handle extending from one side of the rotation shaft. The connection shaft support may extend from the handle to move from the first position to the second position as the handle is rotated with respect to the rotation shaft.

The support plate may include a first unit member, and a second unit member arranged in parallel to the first unit member with respect to a direction in which the water storage container is received in the cover housing. The lock may be coupled to the first unit member. The locking seat may include a sub-lock provided to correspond to the lock. While the support moves from the first position to the second position, the sub-lock may be coupled to the second unit member to allow the support plate to move while maintaining a level.

The locking seat may include a connection link rotatably coupled to the lock and the sub-lock so as to allow the lock and the sub-lock to move in conjunction with each other.

The base housing may include a lock support rib provided to be in contact with the lock in response to the connection shaft support being in the first position. The lock support rib may extend toward a direction, in which the support moves, and may be configured to allow vibration to occur as the lock support rib is separated from the lock in response to the connection shaft support moving from the first position to the second position.

The base housing may include a lock contact member provided to support the support and configured to allow the support plate to move toward the base housing while the water storage container moves from the locked position to the unlocked position.

The base housing may include a base guide rib provided to extend in a direction toward the water storage cover and configured to insert into the support plate so as to guide the support plate while the water storage container moves from the unlocked position to the locked position.

The base housing may include at least one friction rib protruding toward the locking seat to reduce a frictional force generated between the base housing and the locking seat.

The base housing may include a base surface provided to face the locking seat and inclined to collect condensed water. The at least one friction rib may include a rib friction surface defined to face the locking seat and to correct an inclination of the base surface In accordance with another aspect of the disclosure, a food waste disposer includes a cover housing, a disposal arranged inside the cover housing, a heater configured to heat the disposal, an exhaust pipe connected to the disposal, a water storage container including a water storage opening configured to collect condensed water in the exhaust pipe, the water storage container configured to separate from the cover housing, a water storage cover connected to the exhaust pipe, and configured to cover the water storage opening of the water storage container, a gasket arranged between the water storage container and the water storage cover and may be configured to create a seal between the water storage container and the water storage cover, and a locking seat including a lock configured to move the water storage container from an unlocked position, in which a movement out of the cover housing is allowed, to a locked position, in which the movement is limited. In response the water storage container being in the locked position, the gasket seals between water storage cover and the water storage container.

The food waste disposer may further include a base housing configured to allow the water storage container to be located between the base housing and the water storage cover. The lock may include a rotation shaft configured to be rotated, a handle extending from one side of the rotation shaft, and a connection shaft support extending in a direction opposite to the handle. The connection shaft support may move the water storage container to the gasket by pressing the base housing in response to rotation of the handle with respect to the rotation shaft.

The locking seat may include a lifting device configured to move the water storage container to the water storage cover.

The water storage cover may include a filter connection hole defined to communicate with an outside of the cover housing. The food waste disposer may include an opening and closing device configured to open the filter connection hole in response to the water storage container being in the locked position, and configured to close the filter connection hole in response to the water storage container being outside the cover housing.

In accordance with another aspect of the disclosure, a food waste disposer includes a cover housing, a disposal configured to receive food waste, an exhaust pipe connected to the disposal to guide air containing moisture, a water storage container configured to collect condensed water in the exhaust pipe, and configured to be separated out of the cover housing, a water storage cover connected to the exhaust pipe, and configured to cover the water storage container, and a locking seat configured to move the water storage container from an unlocked position, in which a movement out of the cover housing is allowed, to a locked position, in which the movement is limited.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
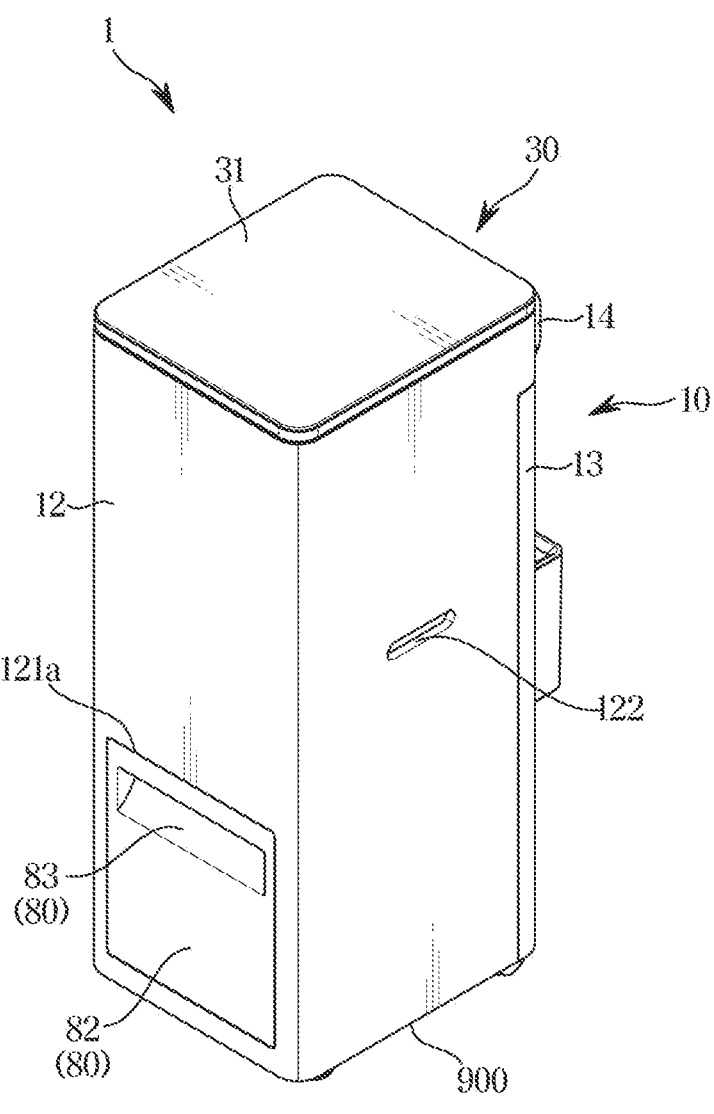
FIG. 1 is a front-perspective view illustrating a food waste disposer according to an embodiment of the disclosure.

FIGS. 1 through 33, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless they are definitely different in a context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, elements, or combinations thereof, but do not preclude the presence or addition of one or more of the features, elements, steps, operations, elements, elements, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

In the following detailed description, the terms of "up and down direction", "lower side", "front and rear direction" and the like may be defined by the drawings, but the shape and the location of the element is not limited by the term.

Figure 2:
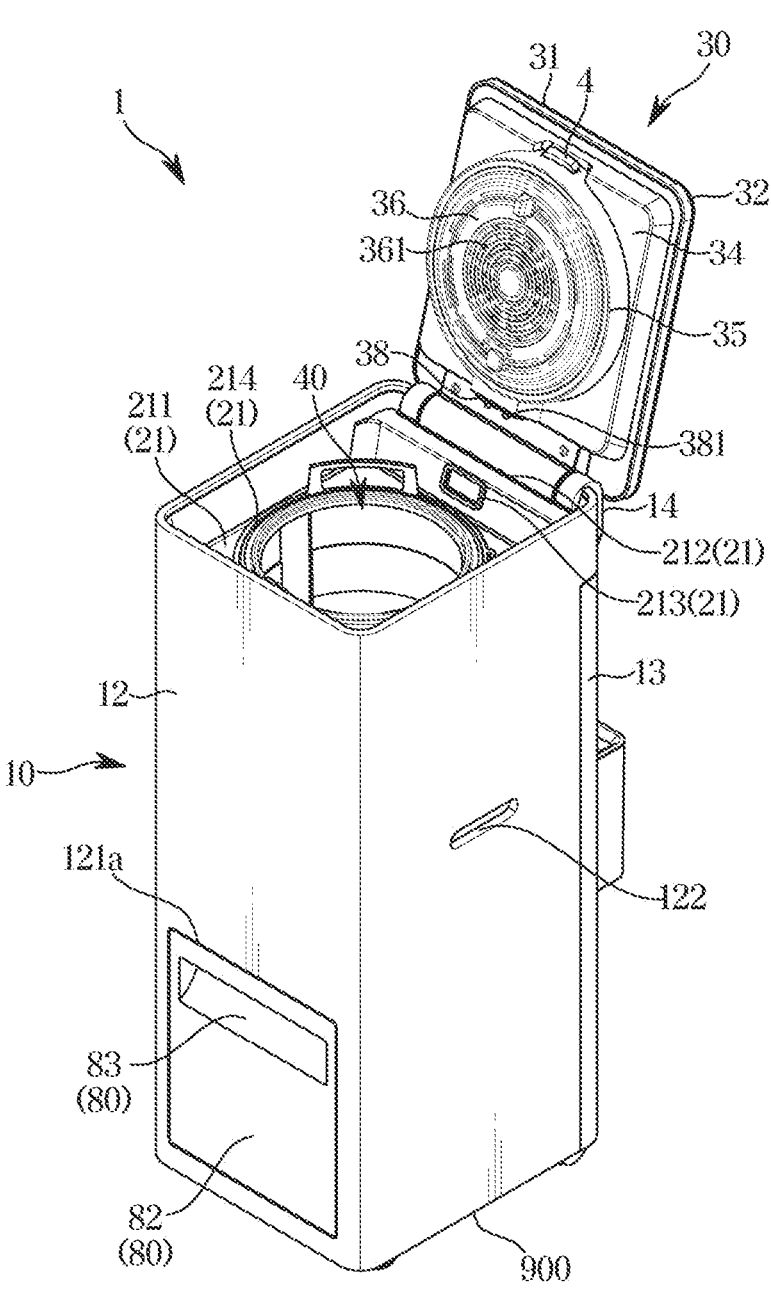
FIG. 2 is a front-perspective view illustrating a state in which a cover of the food waste disposer shown in FIG. 1 is opened.

Particularly, as shown in FIG. 2, a direction in which a holding member of a food waste disposer 1 faces is defined as a front side, and based on this, a rear side, left and right sides and upper and lower sides are defined.

Food to be described below may mean something that humans or animals can eat. However, food may not be limited to what is edible. Food may be an organic substance. However, even if it is an inorganic substance, inorganic substance may be food as long as the inorganic substance contains water.

Food waste may refer to food in which utility has disappeared. For example, food waste may refer to leftover food after a meal or food that has been unopened for a long time.

The food waste disposer 1 may refer to a device configured to dispose of food waste. For example, the food waste disposer 1 may refer to a device configured to grind food to reduce a volume of food waste or evaporate moisture from food to reduce a weight of food waste.

Hereinafter an embodiment according to the disclosure will be described in detail with reference to the accompanying drawings.

Figure 3:
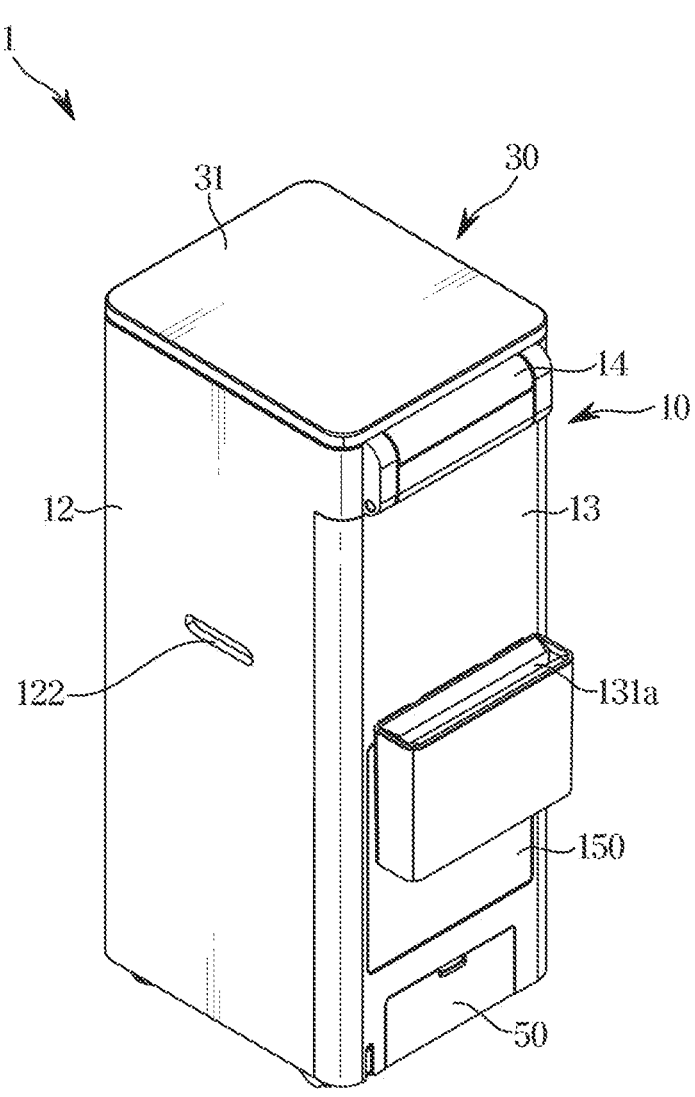
FIG. 3 is a rear-perspective view of the food waste disposer shown in FIG. 1.

FIG. 1 is a front-perspective view illustrating a food waste disposer according to an embodiment of the disclosure. FIG. 2 is a front-perspective view illustrating a state in which a cover of the food waste disposer according to an embodiment of the disclosure is opened. FIG. 3 is a rear-perspective view of the food waste disposer according to an embodiment of the disclosure.

Referring to FIGS. 1 to 3, the food waste disposer 1 may include a housing 10 and a cover 30 covering an upper portion of the housing 10.

The housing 10 may form an exterior of the food waste disposer 1. For example, the housing 10 may include a base housing 900, and a first cover housing 12 and a second cover housing 13 which are arranged above the base housing 900.

The base housing 900 may form a bottom surface 412 of the food waste disposer 1, and the first cover housing 12 and the second cover housing 13 may form side surfaces of the food waste disposer 1.

The base housing 900, the first cover housing 12, and the second cover housing 13 may be detachably coupled to each other.

It is illustrated that the first cover housing 12 and the second cover housing 13 are formed separately in FIGS. 1 to 3, but are not limited thereto. Alternatively, the first cover housing 12 and the second cover housing 13 may be integrally formed with each other.

A user or an installer can easily access various components arranged inside the food waste disposer 1 by separating the first cover housing 12 and the second cover housing 13 from the base housing 900.

The first cover housing 12 of the food waste disposer 1 may include a storage accommodating member 121a and a grip groove 122a.

The storage accommodating member 121a may be formed by opening a portion of a front surface of the first cover housing 12. The storage accommodating member 121a may be provided to receive a storage case 81 of a storage 80 to be described later. The storage case 81 may be provided to be inserted into or withdrawn from the storage accommodating member 121a.

For example, the storage case 81 may slide along the front and rear direction of the food waste disposer 1 and be inserted into or withdrawn from the storage accommodating member 121a.

A holding member 83 provided to be gripped may be formed on an exposed member 82 of the storage case 81.

The exposed member 82 of the storage case 81 may form the front surface of the storage case 81. The exposed member 82 of the storage case 81 may be exposed to the outside of the food waste disposer 1 through the storage accommodating member 121a of the first cover housing 12.

The holding member 83 of the storage case 81 may have a shape that is recessed rearward from the front surface of the exposed member 82 of the storage case 81.

Although not shown in the drawing, the exposed member 82 of the storage case 81 may include a window. A user can visually check an amount of food waste collected inside the storage case 81 through the window formed of a transparent material.

The grip groove 122a of the first cover housing 12 may be formed by cutting a portion of the first cover housing 12. A user can move the position of the food waste disposer 1 by holding the food waste disposer 1 through the grip groove 122a.

The food waste disposer 1 may include a housing discharger 131a provided at the rear of the second cover housing 13.

The housing discharger 131a may be provided to communicate with a filter discharger 153 (refer to FIG. 4) of a filter assembly 150. Accordingly, air filtered inside the filter assembly 150 may be discharged to the outside of the food waste disposer 1 through the filter discharger 153 and the housing discharger 131a.

A water storage container 530 may be arranged under the filter assembly 150. The water storage container 530 may be detachably mounted on the base housing 900. The water storage container 530 may be provided to collect condensed water generated in a deodorizing device 100. Details thereof will be described later.

The food waste disposer 1 may include a hinge housing 14. The hinge housing 14 may be provided to connect the housing 10 and the cover 30. For example, the hinge housing 14 may be connected to the cover 30 and coupled to the second cover housing 13. Accordingly, the cover 30 may be provided to be rotatable with respect to the housing 10 through the configuration of the hinge housing 14.

The cover 30 may be configured to open or close an open upper surface of the housing 10. The cover 30 may be rotatably mounted on the housing 10 to cover the upper portion of the housing 10.

For example, the cover 30 may be provided to cover the open upper surfaces of the first cover housing 12 and the second cover housing 13.

The cover 30 may be mounted on the housing 10 to cover an upper portion of a disposal 40. The cover 30 may be provided to transfer air in the disposal 40 to the deodorizing device 100 in a state in which the housing 10 is closed. Details thereof will be described later.

Figure 4:
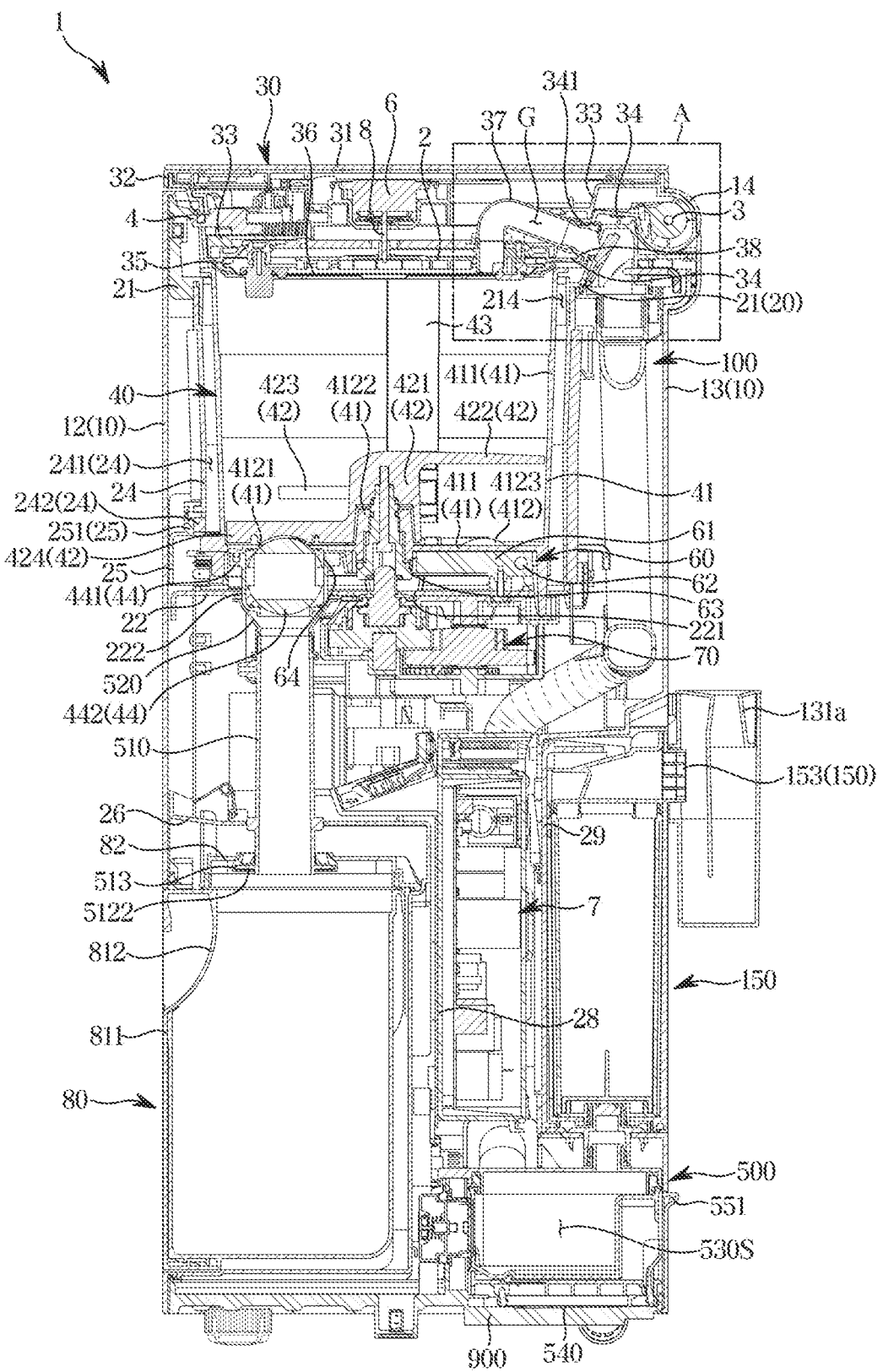
FIG. 4 is a cross-sectional view of the food waste disposer shown in FIG. 1.
Figure 5:
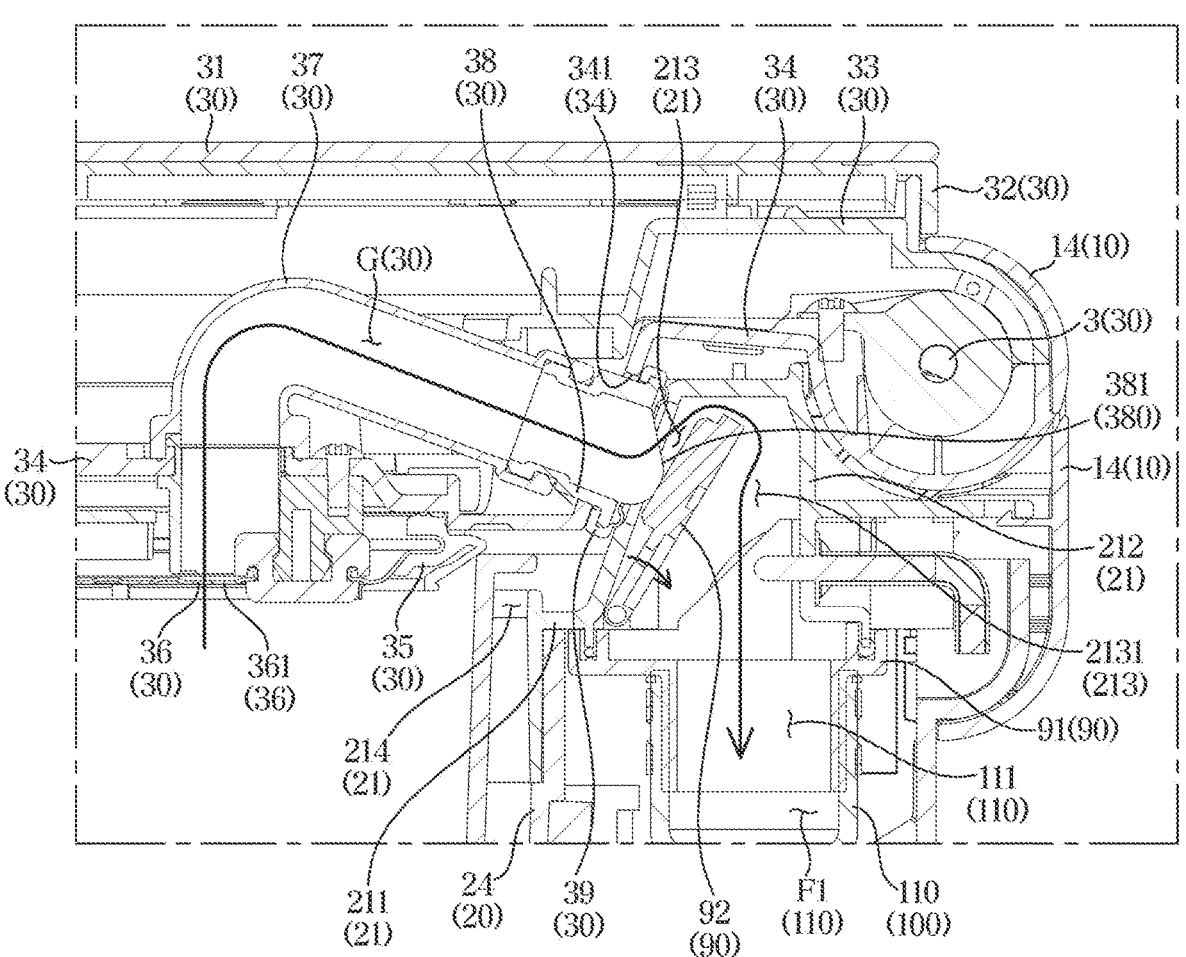
FIG. 5 is an enlarged-view of part A of the food waste disposer shown in FIG. 4.

FIG. 4 is a cross-sectional view of the food waste disposer according to an embodiment of the disclosure. FIG. 5 is an enlarged view of part A of FIG. 4.

Hereinafter the overall configuration of the food waste disposer 1 according to an embodiment of the disclosure will be described with reference to FIGS. 1 to 5.

Referring to FIGS. 4 and 5, the food waste disposer 1 may include the cover 30 mounted on the outside of the housing 10 to open or close the upper surface of the disposal 40, and the disposal 40 received in the housing 30.

The cover 30 may include a top plate 31, an upper frame 32, a middle frame 33 and a lower frame 34.

The top plate 31 may form an upper surface of the food waste disposer 1. For example, when the cover 30 closes the upper portion of the housing 10, the top plate 31 may be provided as the upper surface of the food waste disposer 1. The top plate 31 may form an upper exterior of the food waste disposer 1.

The upper frame 32, the middle frame 33, and the lower frame 34 may be arranged under the top plate 31. The upper frame 32 may be coupled to the middle frame 33. The middle frame 33 may be coupled to the lower frame 34. The middle frame 33 may be arranged between the upper frame 32 and the lower frame 34.

A predetermined accommodation space may be formed between the upper frame 32 and the middle frame 33. A predetermined accommodation space may be formed between the middle frame 33 and the lower frame 34.

For example, the upper frame 32 and the middle frame 33 may be coupled to form a space spaced apart by a predetermined distance in a vertical direction. In addition, the middle frame 33 and the lower frame 34 may be coupled to form a space spaced apart by a predetermined distance in the vertical direction.

The cover 30 may include a cover frame 36 and a cover gasket 35.

The cover frame 36 may form a lower surface of the cover 30. The cover frame 36 may be provided in a size that is received in a food waste inlet port arranged in the upper portion of the disposal 40. The cover frame 36 may include an inlet hole 361 (refer to FIG. 2) through which air flows from the disposal 40. Air inside the disposal 40 may flow to a guide duct 37, to be described later, through the inlet hole 361 of the cover frame 36.

The cover frame 36 may be provided in a shape corresponding to the inlet port of the disposal 40. Referring to FIG. 2, as the inlet port of the disposal 40 is provided in a circular shape, the cover frame 36 may also be provided in a circular shape. However, the shapes of the cover frame 36 and the inlet port of the disposal 40 are not limited thereto.

The cover gasket 35 may be arranged to cover an outer rim of the cover frame 36.

The cover gasket 35 may be provided to seal between the cover frame 36 and the inlet port of the disposal 40. The cover gasket 35 may be provided to be in contact with an upper edge of the disposal 40.

For example, the cover gasket 35 may be provided to prevent air, which is in the disposal 40, from leaking out of the cover 30 in a state in which the cover 30 closes the upper portion of the housing 10. Accordingly, the cover gasket 35 may prevent a state in which air, which contains contaminants inside the disposal 40, leaks out of the food waste disposer 1 without passing through the deodorizing device 100.

The cover gasket 35 may be formed of a material having a predetermined elasticity.

The cover 30 may be provided to be rotatable with respect to the housing 10 based on a cover rotation shaft 3. For example, the cover rotation shaft 3 may be coupled to the hinge housing 14 to allow the cover 30 to rotatably open or close the top of the housing 10.

However, the operation of the cover 30 is not limited thereto, and the upper portion of the housing 10 may be opened or closed in a sliding manner without a separate hinge housing 14, or the upper portion of the housing 10 may be opened or closed in a manner completely separated from the housing 10.

The cover 30 may include a locking member 4.

The locking member 4 may be mounted on the middle frame 33. The locking member 4 may be provided to be elastically movable along the front and rear direction of the food waste disposer 1.

The locking member 4 may be provided to be inserted into an accommodation frame 21 to be described later. Accordingly, the locking member 4 may be provided to maintain a closed state of the cover 30 when the cover 30 closes the upper portion of the housing 10.

However, the shape of the locking member 4 is not limited thereto, and the locking member 4 may be provided in a hook shape to fix the position of the cover 30.

The cover 30 may include a circulation fan 2, a fan rotation shaft 8 and a fan driver 6.

The circulation fan 2 may be arranged between the middle frame 33 and the lower frame 34. The fan driver 6 may be arranged between the upper frame 32 and the middle frame 33.

The fan rotation shaft 8 may be provided to transmit power of the fan driver 6 to the circulation fan 2 by connecting the fan driver 6 and the circulation fan 2. The fan rotation shaft 8 may pass through the middle frame 33 and be coupled to the circulation fan 2.

The circulation fan 2 may be provided above the disposal 40 to allow heat inside a grinding case 41 of the disposal 40 to be evenly distributed.

For example, as a heater 60 provided under the disposal 40 heats the disposal 40, food waste inside the disposal 40 may be heated.

In the disposal 40, food waste adjacent to the heater 60 is heated more. Therefore, heat may be non-uniformly transferred to the food waste received in the disposal 40.

Therefore, as the circulation fan 2 is arranged in the cover 30, heat inside the disposal 40 may be evenly circulated. In other words, the circulation fan 2 may be provided to induce convection inside the grinding case 41.

Therefore, a temperature inside the grinding case 41 may be almost uniform regardless of its position, and a drying efficiency of the food waste received inside the grinding case 41 may be improved.

The cover 30 may include the guide duct 37.

The guide duct 37 may be provided to penetrate the lower frame 34. The guide duct 37 may be provided to be rotated together with the cover 30 as the cover 30 rotates.

For example, when the cover 30 closes the upper portion of the housing 10, one end of the guide duct 37 may be arranged to face the inside of the grinding case 41 together with the cover frame 36.

For example, when the cover 30 closes the upper portion of the housing 10, one end of the guide duct 37 may be provided to face downward.

The guide duct 37 may be mounted inside the cover 30. One end of the guide duct 37 may be fixed to the lower frame 34. One end of the guide duct 37 may be open toward the cover frame 36. The other end of the guide duct 37 may be coupled to a connecting duct 38 to be described later.

The guide duct 37 may extend in a curved shape. However, the shape of the guide duct 37 is not limited thereto. For example, it is sufficient that the shape of the guide duct 37 is provided to guide the air in the grinding case 41 to an exhaust pipe.

The guide duct 37 may form a guide flow path G into which air of the disposal 40 is introduced. The guide flow path G may communicate with the disposal 40. Particularly, as one end of the guide duct 37 is provided to open toward the cover frame 36, the air of the disposal 40 introduced through the inlet hole 361 of the cover frame 36 may be introduced into the guide duct 37.

The cover 30 may include the connecting duct 38 and a duct sealing member 39.

The connecting duct 38 may be coupled to the other end of the guide duct 37. For example, the connecting duct 38 may be coupled to a rear end of the guide duct 37. The connecting duct 38 may be coupled to a duct mounting member 341 of the lower frame 34.

The connecting duct 38 may be provided to connect the guide duct 37 received in the cover 30 and an exhaust member 213 formed in the accommodation frame 21. One end of the connecting duct 38 may be connected to the guide duct 37 and the other end of the connecting duct 38 may protrude outward from the cover 30 through the duct mounting member 341.

The connecting duct 38 may include a pusher 381. The pusher 381 may protrude outward from the rear of the cover 30.

The pusher 381 may be provided to press a blocking member 92 provided to maintain the exhaust member 213 of the accommodation frame 21 in a closed state, which will be described later. Details thereof will be described later.

The duct sealing member 39 may be coupled to the other end of the connecting duct 38. For example, the duct sealing member 39 may be coupled to a portion, which protrudes outward of the cover 30 through the duct mounting member 341, in the connecting duct 38.

The duct sealing member 39 may be provided to seal between the connecting duct 38 of the cover 30 and the exhaust member 213 of the accommodation frame 21. When the cover 30 closes the upper portion of the housing 10, the duct sealing member 39 may prevent the air, which flows to the connecting duct 38 through the guide duct 37, from leaking into a gap between the connecting duct 38 and the exhaust member 213. Therefore, air containing contaminants may not flow out without passing through the deodorizing device.

The disposal 40 may be arranged under the cover 30 so as to be opened or closed by the cover 30.

The disposal 40 may include the grinding case 41 in which food waste is disposed of. Disposal of food waste may be used as a term referring to drying, stirring, and grinding of food waste. Alternatively, disposal of food waste may be used as a term referring to one of drying, stirring, or grinding of food waste.

The disposal 40 may be provided to accommodate food waste. The disposal 40 may be arranged inside the housing 10 and separated out of the housing 10. The disposal 40 may include a handle 413. A user can separate the disposal 40 from the inside of the housing 10 to the outside by gripping the handle 413.

The grinding case 41 may include an open upper surface so as to form an inlet port. A user can insert food waste into the disposal 40 through the inlet port of the grinding case 41.

The inlet port of the grinding case 41 may be closed by the cover frame 36 of the cover 30. The cover gasket 35 of the cover 30 may be provided to seal a gap between the inlet port of the grinding case 41 and the cover frame 36.

The grinding case 41 may include a side wall 411 and a bottom surface 412.

A fixed grinder 43 may be mounted on the sidewall 411 of the grinding case 41. On the bottom surface 412 of the grinding case 41, a rotary grinder 42 may be connected to a first driving device 72 so as to be rotatable.

The rotary grinder 42 and the fixed grinder 43 may be provided to grind food waste through interaction with each other.

The rotary grinder 42 may include a rotary body 421 to which a grinder shaft 71 of the first driving device 72 is coupled. The rotary grinder 42 may include a first grinder 422, a second grinder 423, and a third grinder 424 that extend radially from the rotary body 421. The first grinder 422, the second grinder 423, and the third grinder 424 may be arranged at different heights to stir and grind food waste.

It is illustrated that the rotary grinder 42 includes the first grinder 422 to the third grinder 424 in FIG. 4, but the number of grinders is not limited thereto.

A transfer member 4121 may be formed on the bottom surface 412 of the grinding case 41. The transfer member 4121 may be formed by cutting a portion of the bottom surface 412 of the grinding case 41. Food waste that is disposed of inside the grinding case 41 may be transported to the storage 80 through the transfer member 4121.

A rotation shaft accommodating member 4122 may be formed on the bottom surface 412 of the grinding case 41. The rotation shaft accommodating member 4122 may be formed to extend upward from the center of the grinding case 41. The grinder shaft 71 of the first driving device 72 may be inserted into the rotation shaft accommodating member 4122 to transmit power to the rotating body 421 of the rotary grinder 42.

The disposal 40 may include a valve assembly 44.

The valve assembly 44 may include a valve case 441 and a ball valve 442.

The valve case 441 may be coupled to a lower portion of the grinding case 41. The valve case 441 may be coupled to the grinding case 41 at a position communicating with the transfer member 4121 of the grinding case 41.

The valve case 441 may be provided to accommodate the ball valve 442 therein. Particularly, the valve case 441 may cover the outside of the ball valve 442 to allow the ball valve 442 to be rotated therein.

The ball valve 442 may be rotated inside the valve case 441. The ball valve 442 may be rotated so as to open and close the transfer member 4121 of the grinding case 41.

The ball valve 442 may pass through the transfer member 4121 of the grinding case 41 and protrude upward from the bottom surface 412 of the grinding case 41. Accordingly, a lower surface of the third grinder 424 of the rotary grinder 42 may be recessed inward to correspond to the protruding shape of the ball valve 442. Accordingly, the third grinder 424 may be provided to avoid interference with the ball valve 442.

In addition, due to the shape of the third grinder 424, a protrusion 4123 may be formed on the bottom surface 412 of the grinding case 41.

The protrusion 4123 may be provided to protrude upward from the bottom surface 412.

As the protrusion 4123 corresponding to the recessed shape of the third grinder 424 is formed on the bottom surface 412 of the grinding case 41, the third grinder 424 may transfer all the food waste accumulated in the food waste to the transfer member 4121 and effectively stir the food waste.

The ball valve 442 may be provided in a ball shape in which a part of an inner portion thereof is opened.

The ball valve 442 of the valve assembly 44 may be rotated by receiving a driving force from the driving devices. For example, the ball valve 442 may be provided to open or close the transfer member 4121 of the grinding case 41 through rotation by receiving the driving force from a second driving device 73.

In addition, when the ball valve 442 is rotated in a state in which the transfer member 4121 is opened, the second driving device 73 may interfere with the upward movement of the ball valve 442 so as to prevent the ball valve 442 from being separated from the second driving device 73.

Accordingly, it is possible to prevent food waste from leaking out when a user separates the disposal 40 without recognizing the open state of the transfer member 4121.

The food waste disposer 1 may include the heater 60.

The heater 60 may include a heating frame 61 and a heating wire 62 accommodated inside the heating frame 61.

The heating frame 61 may be arranged to be in contact with the lower portion of the disposal 40. The bottom surface 412 of the disposal 40 may be heated by the heating wire 62 accommodated inside the heating frame 61.

The food waste disposer 1 may include the driving device 70.

The driving device 70 may be arranged below the heater 60.

Figure 6:
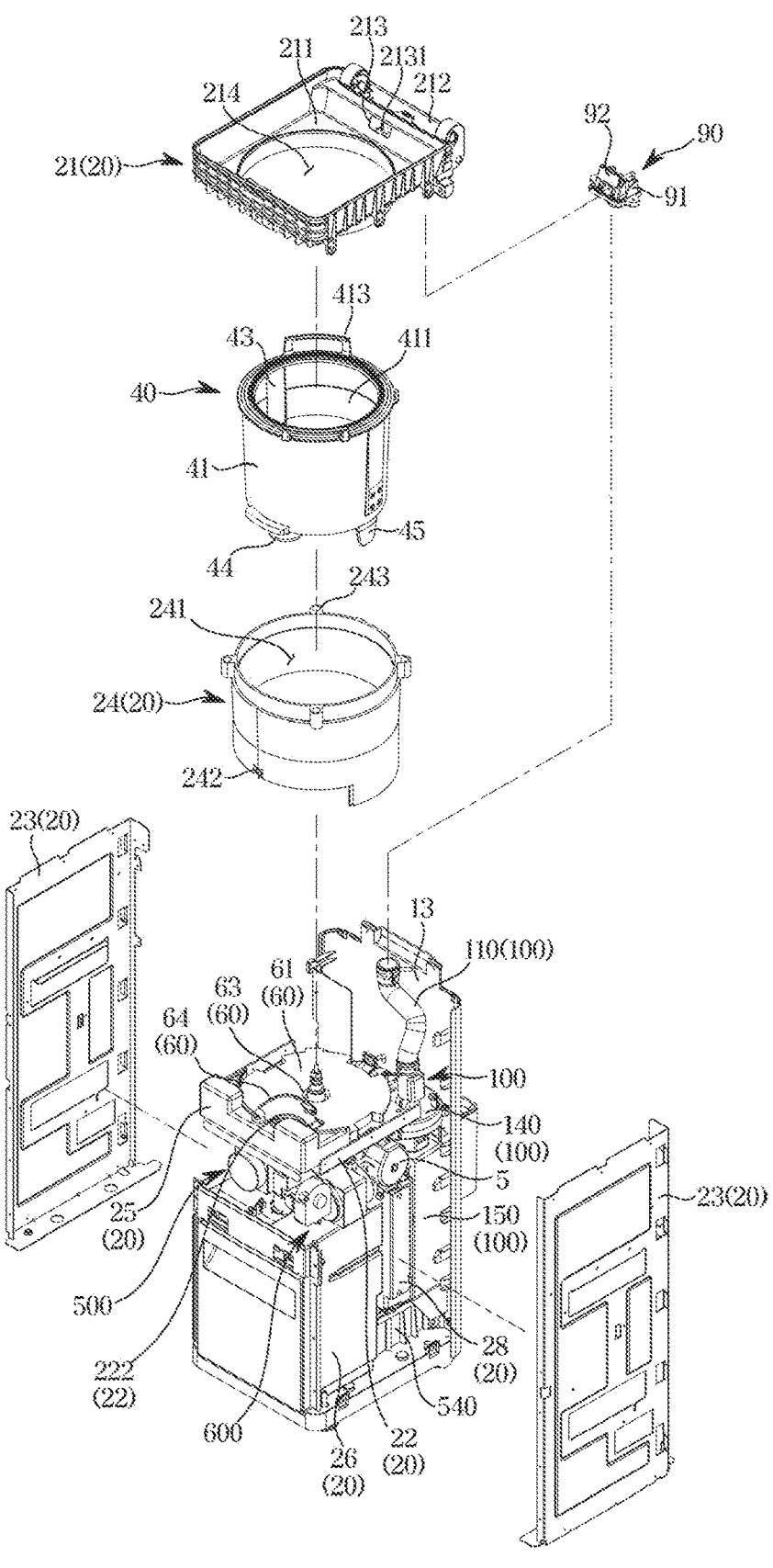
FIG. 6 is a front-exploded view illustrating some components of the food waste disposer shown in FIG. 1.

The driving device 70 may include the first driving device 72 (refer to FIG. 6) and the second driving device 73 (refer to FIG. 6). The first driving device 72 may transmit a driving force to the rotary grinder 42 of the disposal 40, and the second driving device 73 may transmit a driving force to the valve assembly 44 of the disposal 40.

The food waste disposer 1 may include the storage 80.

The storage 80 may be arranged inside the storage frame. The storage 80 may be connected to a transfer pipe 27. An upper end of the transfer pipe 27 may be connected to the valve assembly 44 and a lower end of the transfer pipe 27 may be connected to the storage 80.

Food waste processed by the disposal 40 may be transferred to the transfer pipe 27 as the valve assembly 44 opens the transfer member 4121. Food waste transported through the transfer pipe 27 may be stored in the storage 80.

The storage 80 may be arranged on the front lower side of the disposal 40 to store food waste processed by the disposal 40.

The storage 80 may include the storage case 81 and the exposed member 82 coupled to the storage case 81 and exposed to the outside of the food waste disposer 1. The holding member 83 may be formed at an upper end of the exposed member 82. Accordingly, a user can empty the food waste collected in the storage 80 from the storage 80 by holding the holding member 83 and separating the storage 80 from the housing 10.

The food waste disposer 1 may include an electrical component chamber 7. Electrical components such as various circuit boards may be arranged in the electrical component chamber 7.

The food waste disposer 1 may include a controller. The controller may control various components of the food waste disposer 1. Accordingly, the controller may control the operation of the food waste disposer 1 based on an electronic signal generated by the electrical component chamber 7.

The food waste disposer 1 may include an exhaust member opening and closing device 90.

The exhaust member opening and closing device 90 may include a frame coupling body 91 and the blocking member 92. The blocking member 92 may be provided to open or close the exhaust member 213 of the accommodation frame 21. The blocking member 92 may be positioned to close the exhaust member 213 when the cover 30 opens the top of the housing 10.

The frame coupling body 91 may be connected to an end of a first exhaust pipe 110 to be described later. The frame coupling body 91 may be coupled to a lower portion of the accommodation frame 21.

The frame coupling body 91 may be provided to connect the accommodation frame 21 and the first exhaust pipe 110. The frame coupling body 91 may form a communication space 2131 therein. The communication space 2131 may be provided to communicate with the guide flow path G of the guide duct 37. The communication space 2131 may be provided to communicate with a first exhaust flow path F1 of the first exhaust pipe 110.

The blocking member 92 may be elastically supported by the frame coupling body 91. The blocking member 92 may be coupled to the frame coupling body 91 to maintain a state in which the exhaust member 213 of the accommodation frame 21 is closed. The blocking member 92 may be movably arranged inside the communication space 2131.

The food waste disposer 1 may include the deodorizing device 100.

The deodorizing device 100 may be connected to the cover 30. The deodorizing device 100 may include the first exhaust pipe 110 connected to the cover 30.

The first exhaust pipe 110 may include a first inlet 111 connected to the communication space 2131 of the frame coupling body 91. The first exhaust pipe 110 may form the first exhaust flow path F1 through which air of the disposal 40 flows.

The deodorizing device 100 may be arranged in a rear portion of the food waste disposer. Details regarding the deodorizing device 100 will be described later.

The food waste disposer 1 may include the water storage container 530.

The water storage container 530 may be arranged on the base housing 900 to collect condensed water generated in the exhaust flow path of the deodorizing device 100.

For example, the water storage container 530 may be mounted on a water storage housing 540 of the base housing 900. The water storage container 530 may form a collecting space 521 therein. The water storage container 530 may be arranged below the filter assembly 150 and connected to the filter assembly 150. Details regarding the water storage container 530 will be described later.

A flow of air in a state in which the upper portion of the housing 10 is closed by the cover 30 will be described with reference to FIG. 5.

As shown in FIG. 5, when the cover 30 closes the upper portion of the housing 10, the pusher 381 formed on the connecting duct 38 may press the blocking member 92 arranged inside the accommodation frame 21.

For example, the pusher 381 may pass through the exhaust member 213 of the accommodation frame 21 and press the blocking member 92. As the blocking member 92 is pressed and rotated toward the communication space 2131, the blocking member 92 may open the exhaust member 213 of the accommodation frame 21.

As the blocking member 92 opens the exhaust member 213 of the accommodation frame 21, the inside of the connecting duct 38 and the communication space 2131 may be connected to each other to allow air to flow therebetween.

In addition, the communication space 2131 is provided to communicate with the first inlet 111 of the first exhaust pipe 110, and thus the pusher 381 may open the first inlet 111 of the first exhaust pipe 110 by pressing the blocking member 92.

That is, when the cover 30 closes the upper portion of the housing 10, the blocking member 92 may be elastically moved to a position for opening the exhaust member 213.

Therefore, air inside the disposal 40 may flow into the cover 30 through the inlet hole 361 of the cover frame 36 of the cover 30. Air passing through the inlet hole 361 may flow to the guide duct 37 of the cover 30. In other words, the air of the disposal 40 may flow along the guide flow path G.

Thereafter, the air passing through the guide duct 37 and the connecting duct 38 may flow into the communication space 2131 through the open exhaust member 213 of the accommodation frame 21.

The air flowing into the communication space 2131 may flow along the first exhaust flow path F1 through the first inlet 111 of the first exhaust pipe 110. The air flow may be formed by an exhaust fan 140 to be described later.

Figure 7:
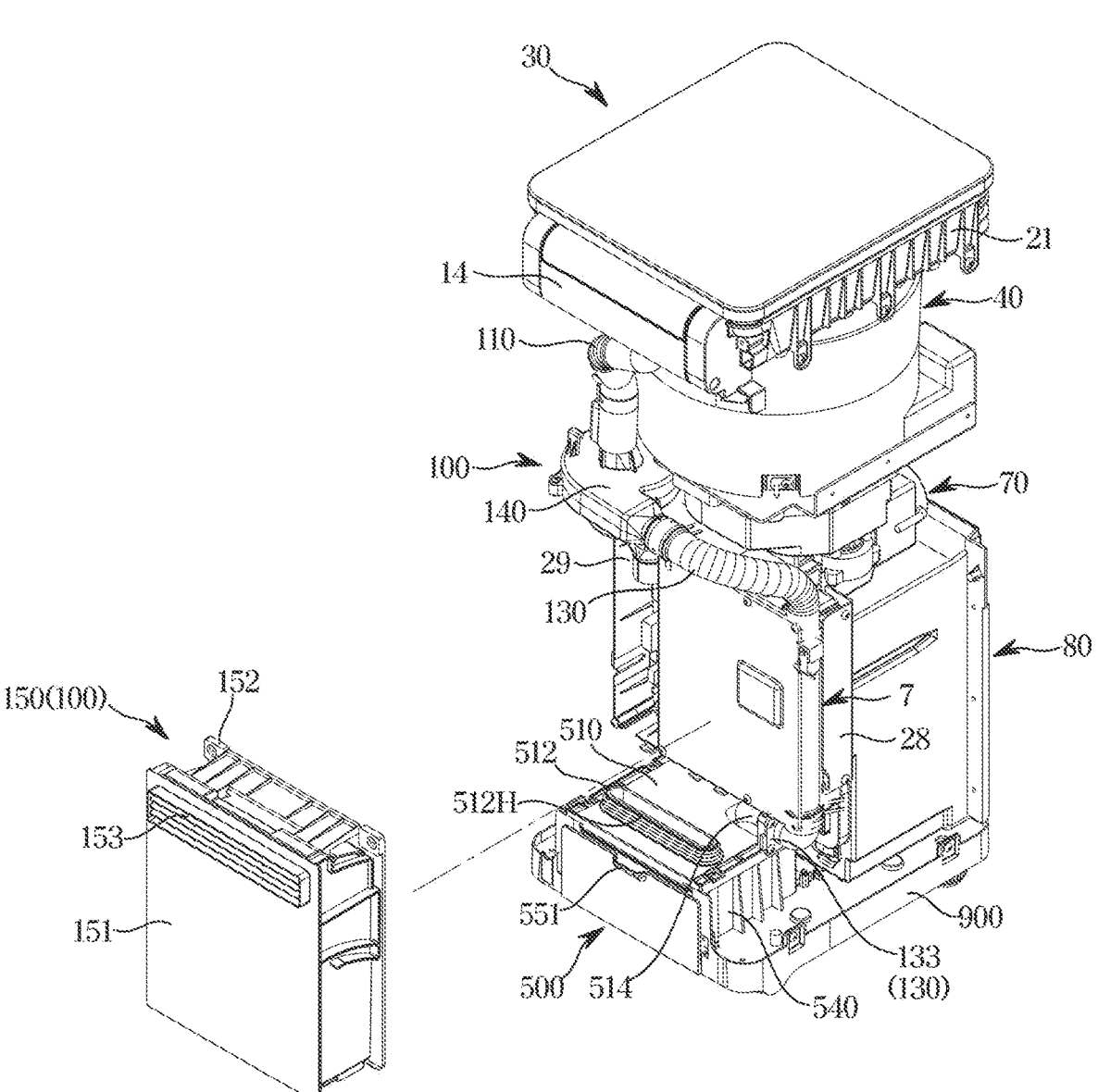
FIG. 7 is a rear-exploded view illustrating some components of the food waste disposer shown in FIG. 1.

FIG. 6 is a front-exploded view illustrating some components of the food waste disposer according to an embodiment of the disclosure. FIG. 7 is a rear-exploded view illustrating some components of the food waste disposer according to an embodiment of the disclosure.

The food waste disposer 1 may include a plurality of inner frames 20. In FIG. 6, the cover 30 and the first cover housing 12 are omitted for convenience of description.

Hereinafter the detailed structure of the inner frame 20 of the food waste disposer 1 and arrangement of various devices will be described.

Referring to FIGS. 6 and 7, the food waste disposer 1 may include the accommodation frame 21.

The accommodation frame 21 may include a base member 211, a hinge mounting member 212, the exhaust member 213, and an opening 214.

The accommodation frame 21 may be arranged between the housing 10 and the disposal 40 to cover the outside of the disposal 40. For example, the base member 211 of the accommodation frame 21 may be arranged between the housing 10 and the disposal 40 to cover the outside of the disposal 40.

The hinge mounting member 212 may be formed at the rear of the base member 211. The hinge housing 14 may be coupled to the hinge mounting member 212 of the accommodation frame 21. The cover 30 may be provided to be rotated by being coupled to the hinge mounting member 212 of the accommodation frame 21.

The exhaust member 213 may be formed behind the base member 211. The exhaust member 213 may be provided to connect the guide flow path G of the cover 30 and the exhaust flow path of the deodorizing device 100.

The exhaust member 213 may communicate with the guide flow path G and the exhaust flow path. The exhaust member 213 may be formed by cutting an inner portion of the base member 211.

The accommodation frame 21 may include the communication space 2131 connected to the exhaust member 213. The communication space 2131 may be formed in the rear portion of the accommodation frame 21. The exhaust member opening and closing device 90 may be accommodated in the communication space 2131.

The opening 214 may be provided to be opened inside the base member 211. Through the opening 214, the disposal 40 may be separated out of the accommodation frame 21. The opening 214 may be provided to communicate with the inlet port of the disposal 40.

The food waste disposer 1 may include a support frame 22, a case frame 24, and a fixing frame 25.

The support frame 22 may be arranged below the heater 60 to support the heater 60 and the disposal 40. The fixing frame 25 may be arranged in front of the support frame 22. The fixing frame 25 may include a frame fixer 251 coupled to the case frame 24.

The case frame 24 may be provided to accommodate the disposal 40. The case frame 24 may be provided in a shape corresponding to the disposal 40. For example, the case frame 24 may be provided in a substantially cylindrical shape with open upper and lower surfaces.

The case frame 24 may include a disposal accommodation space 241. In the disposal accommodation space 241, the disposal 40 may be arranged spaced apart from the case frame 24 by a predetermined distance.

The case frame 24 may include a case fixer 242. The case fixer 242 may be coupled to the frame fixer 251 of the fixing frame 25. Accordingly, the case frame 24 may be fixed relative to the fixing frame 25.

The case frame 24 may include a frame coupler 243. The case frame 24 may be coupled to the lower portion of the accommodation frame 21 by the frame coupler 243. Accordingly, the case frame 24 may be fixed relative to the accommodation frame 21.

The food waste disposer 1 may include a side frame 23. The side frame 23 may be provided as a pair.

A pair of side frames 23 may be arranged to face each other. The side frame 23 may be coupled to both sides of the accommodation frame 21. The side frame 23 may be coupled to the second cover housing 13.

The side frame 23 may be arranged on the left and right side of the food waste disposer 1 to cover the disposal 40, the heater 60, the driving device 70, the storage 80, and the deodorizing device 100.

Referring to FIGS. 4 and 6, the food waste disposer 1 may include a storage frame. The storage frame may include a first storage frame 261 and a second storage frame 262. However, the first storage frame 261 and the second storage frame 262 may be formed integrally with each other.

The storage frame may form a space in which the storage 80 is accommodated. The storage frame may be connected to the transfer pipe 27.

The storage frame may be provided to prevent food waste from affecting other components inside the food waste disposer 1 in an accident in which food waste is transferred through the transfer pipe 27 in a state in which the storage 80 is not accommodated in the housing 10, or an accident in which food waste is leaked from the storage 80 when a user withdraws the storage 80.

The food waste disposer 1 may include a first partition plate 28 arranged behind the storage 80 to define the electrical component chamber 7.

The driving device 70 of the food waste disposer 1 may include the first driving device 72 and the second driving device 73.

The first driving device 72 may include the grinder shaft 71 extending upward by penetrating the center of the heater 60 so as to supply power to the rotary grinder 42.

The second driving device 73 may be configured to supply power to the valve assembly 44. The first driving device 72 and the second driving device 73 may be respectively controlled by the controller.

The heater 60 may include a first shaft through-hole 63 and a first valve through-hole 64. The support frame 22 may include a second shaft through-hole 221 and a second valve through-hole 222.

The first shaft through-hole 63 and the second shaft through-hole 221 may be formed side by side in the vertical direction. The first valve through-hole 64 and the second valve through-hole 222 may be formed side by side in the vertical direction.

The grinder shaft 71 of the first driving device 72 may be provided to pass through the first shaft through-hole 63 and the second shaft through-hole 221. Accordingly, the first driving device 72 may pass through the support frame 22 and the heater 60, thereby transmitting the driving force to the disposal 40.

As the valve assembly 44 of the disposal 40 is formed to protrude downward from the grinding case 41, the valve assembly 44 may protrude to a lower side of the heater 60 and the support frame 22 by passing through the first valve through-hole 64 and the second valve through-hole 222.

The valve assembly 44 protruding to the lower side of the heater 60 and the support frame 22 may be driven by the second driving device 73.

The ball valve 442 of the valve assembly 44 may be rotated by the second driving device 73 so as to open or close the transfer member 4121 of the grinding case 41.

The food waste disposer 1 may include a cooling fan 5.

The cooling fan 5 may be arranged below the heater 60. The cooling fan 5 may be configured to circulate air inside the housing 10 to allow heat inside the housing 10 to be discharged to the outside. The cooling fan 5 may be arranged on one side of the driving device 70. The cooling fan 5 may be arranged in front of the exhaust fan 140.

The deodorizing device 100 may be arranged in a region behind the disposal 40. The deodorizing device 100 may be arranged inside the second cover housing 13.

Referring to FIGS. 6 and 7, the deodorizing device 100 may include the first exhaust pipe 110, the exhaust fan 140, a second exhaust pipe 130, and the filter assembly 150.

The exhaust fan 140 may be arranged inside the housing 10 to form the air flow. The exhaust fan 140 may be arranged at the rear of the housing 10. The exhaust fan 140 may be provided to suck air from the disposal 40. The first exhaust pipe 110 and the second exhaust pipe 130 may be connected to the exhaust fan 140.

At an upstream side of the exhaust fan 140, the first exhaust pipe 110 may be connected to the exhaust fan 140, and at a downstream side of the exhaust fan 140, the second exhaust pipe 130 may be connected to the exhaust fan 140. The first exhaust pipe 110 may be connected to the exhaust fan 140 to form the first exhaust flow path F1 (refer to FIG. 8) communicating with the guide flow path G.

Figure 8:
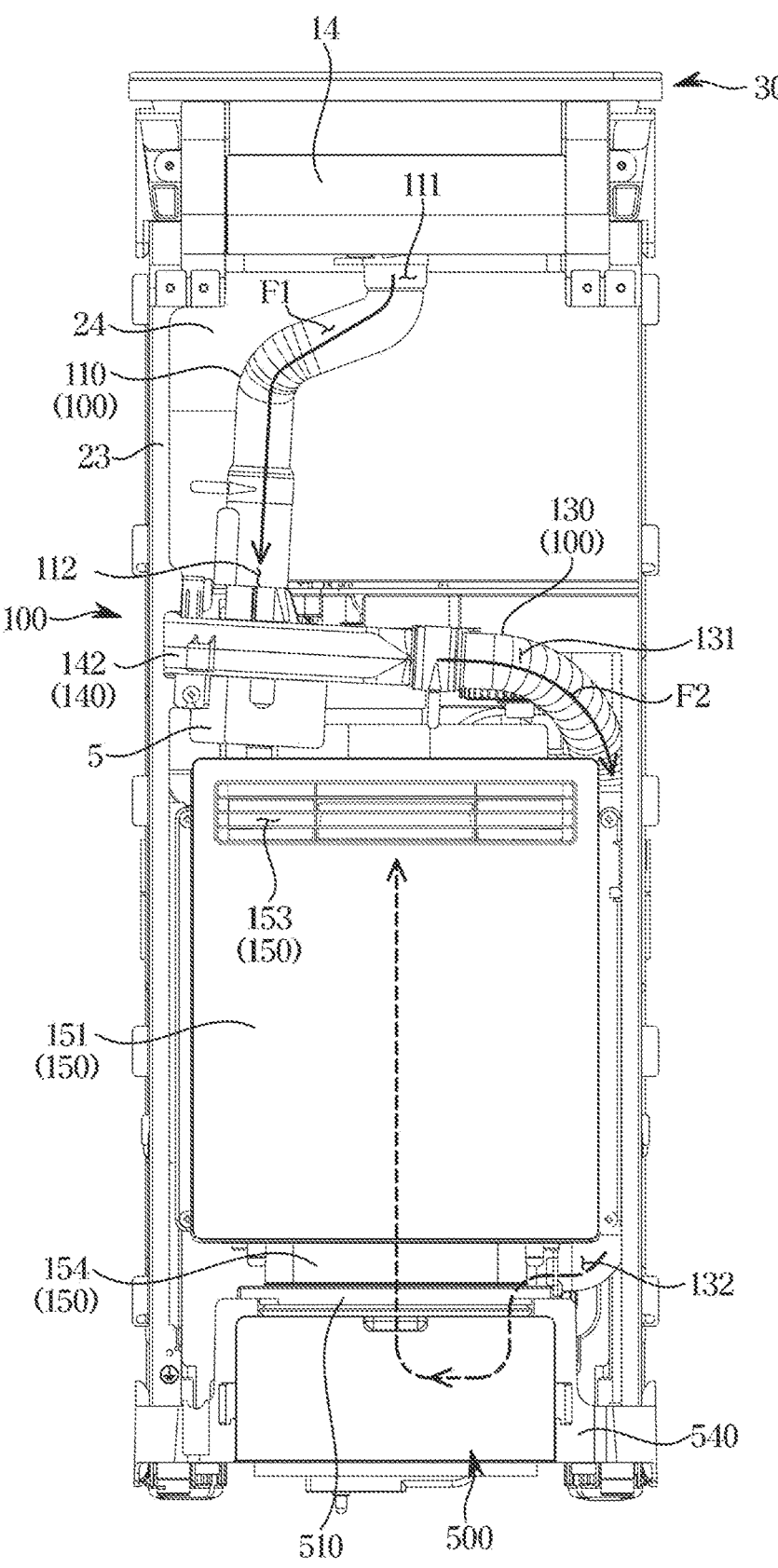
FIG. 8 is a rear view illustrating an air flow path during a sterilization process of the food waste disposer shown in FIG. 1.

The first exhaust pipe 110 may form the first exhaust flow path F1 (refer to FIG. 8). The second exhaust pipe 130 may form a second exhaust flow path F2 (refer to FIG. 8). The first exhaust flow path F1 and the second exhaust flow path F2 may be collectively referred to as an exhaust flow path.

The first exhaust pipe 110 and the second exhaust pipe 130 may be provided to allow air, which is introduced from the disposal 40 by the exhaust fan 140, to flow.

The filter assembly 150 may be provided to adsorb contaminants from air flowing along the first exhaust pipe 110 and the second exhaust pipe 130. A filter provided to filter out contaminants in the air may be arranged inside the filter assembly 150.

The filter assembly 150 may be connected to the exhaust flow path through the exhaust pipe to adsorb contaminants from air flowing along the first exhaust flow path F1 and the second exhaust flow path F2.

Air introduced from the disposal 40 into the first exhaust pipe 110 and the second exhaust pipe 130 may flow along the exhaust flow path. The filter assembly 150 may be connected to the exhaust flow path. Particularly, the filter assembly 150 may be connected to the exhaust flow path through the first exhaust pipe 110 and the second exhaust pipe 130.

The water storage container 530 may be connected to the filter assembly 150 and the second exhaust pipe 130. Accordingly, the air flowing inside the second exhaust pipe 130 may pass through the inside of the water storage container 530 and flow to the filter assembly 150.

The water storage container 530 may be mounted on the water storage housing 540 of the base housing 900. The water storage container 530 may include a water storage cover 510.

The water storage cover 510 may form an upper surface of the water storage container 530. The water storage cover 510 may include an exhaust pipe connector 514 connected to the second exhaust pipe 130. For example, the exhaust pipe connector 514 of the water storage cover 510 may be coupled to a coupling flange 133 of the second exhaust pipe 130.

The water storage cover 510 may include a filter mounting member 512. The filter mounting member 512 may extend to an upper side of the water storage cover 510 and be connected to the lower portion of the filter assembly 150. The filter mounting member 512 may form a path through which air flowing into the water storage container 530 through the second exhaust pipe 130 flows to the filter assembly 150.

The water storage container 530 may include a filter sealing member 513 coupled to the filter mounting member 512. The filter sealing member 513 may be provided to seal a gap between the water storage container 530 and the filter assembly 150.

The water storage container 530 may include a container holding member 533. The container holding member 533 may be exposed to the outside of the second cover housing 13 of the food waste disposer 1. A user can remove the collected condensed water by separating the water storage container 530 from the housing 10 by gripping the container holding member 533.

The filter assembly 150 may include a filter case 151 in which the filter is accommodated. The filter case 151 may be coupled to a filter mounting plate 152. The filter mounting plate 152 may be coupled to a second partition plate 29 that defines the electrical component chamber 7 from the rear.

The filter discharger 153 may be formed behind the filter case 151. The air flowing through the first exhaust pipe 110 and the second exhaust pipe 130 may pass through the inside of the water storage container 530 and flow to the filter assembly 150, and then contaminants may be removed by the filter assembly 150. The air from which contaminants are removed may be discharged to the outside of the food waste disposer 1 through the filter discharger 153.

Figure 9:
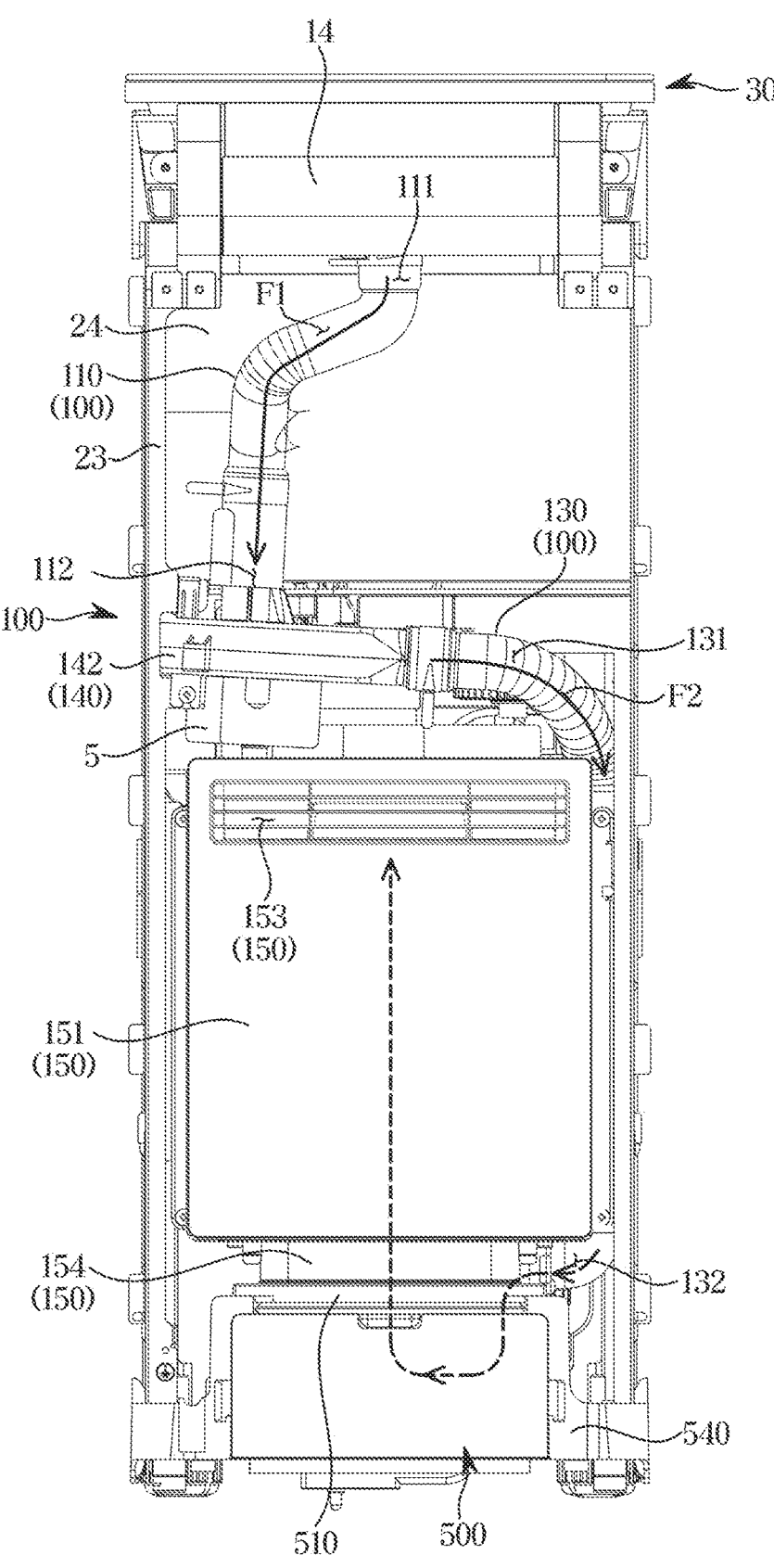
FIG. 9 is a rear view illustrating an air flow path during a food waste disposal process of the food waste disposer shown in FIG. 8.
Figure 10:
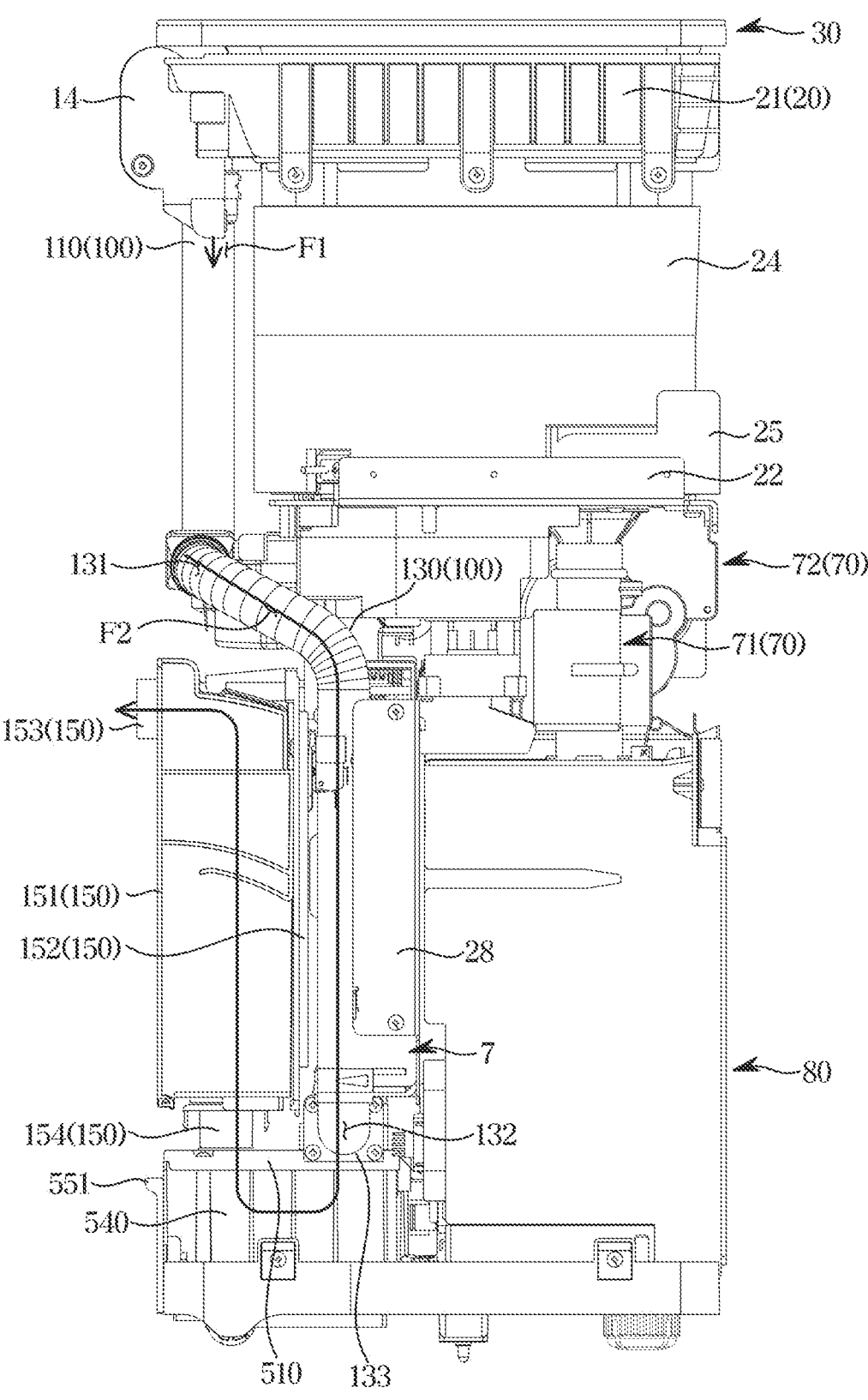
FIG. 10 is a side view illustrating an air flow path of the food waste disposer shown in FIG. 9.

FIG. 8 is a rear view illustrating an air flow path during a sterilization process of the food waste disposer shown in FIG. 1. FIG. 9 is a rearview illustrating an air flow path during a food waste disposal process of the food waste disposer shown in FIG. 8. FIG. 10 is a side view illustrating an air flow path of the food waste disposer shown in FIG. 9.

The overall air flow in a state, in which the sterilization process of the disclosure is performed, and in a state, in which the food waste disposal process is performed, will be described with reference to FIGS. 8 to 10.

The first exhaust pipe 110 may include the first inlet 111 and a first outlet 112. As described above, the first inlet 111 may be provided to communicate with the guide flow path G and the communication space 2131 when the cover 30 closes the upper portion of the housing 10. Air inside the disposal 40 may flow into the first exhaust pipe 110 through the first inlet 111.

The first outlet 112 may be provided to communicate with the exhaust fan case 142. The first outlet 112 may be provided to allow air, which is introduced into the first exhaust pipe 110 through the first inlet 111, to flow out to the exhaust fan 140. The first exhaust flow path F1 may be formed between the first inlet 111 and the first outlet 112.

The first exhaust flow path F1 may communicate with the guide flow path G in a state in which the cover 30 is closed with respect to the housing 10.

The second exhaust pipe 130 may form the second exhaust flow path F2.

The second exhaust pipe 130 may be connected to the exhaust fan 140 to form a downstream portion of the exhaust flow path formed by the exhaust fan 140.

The second exhaust pipe 130 may include a second inlet 131 and a second outlet 132. The second inlet 131 may be provided to communicate with the exhaust fan case 142. The second inlet 131 may be provided to allow air, which flows through the first exhaust flow path F 1, to flow into the second exhaust pipe 130.

The second outlet 132 may be provided to communicate with the water storage container 530. The second outlet 132 may be provided to allow air, which is introduced into the second exhaust pipe 130 through the second inlet 131, to flow out into the water storage container 530. The second exhaust flow path F2 may be formed between the second inlet 131 and the second outlet 132.

The second exhaust pipe 130 may include the coupling flange 133 coupled to the water storage cover 510 of the water storage container 530.

The water storage container 530 may be arranged between the second exhaust pipe 130 and the filter assembly 150. The water storage container 530 may be provided to collect condensed water generated from air flowing through the first exhaust flow path F1 and the second exhaust flow path F2. The water storage cover 510 of the water storage container 530 may be connected to the second exhaust pipe 130 and the filter assembly 150.

During the food waste disposal process, the air inside the disposal 40 is introduced into the first exhaust pipe 110 through the first inlet 111, flows along the first exhaust flow path F1, and flows to the exhaust fan 140 through the first outlet 112.

Thereafter, the air flows into the second exhaust pipe 130 through the second inlet 131, flows along the second exhaust flow path F2, and flows into the water storage container 530 through the second outlet 132. The air flowing into the water storage container 530 may flow to the filter assembly 150 through the filter connector 154 to remove contaminants, and then be discharged to the outside through the filter discharger 153.

An air flow may be formed even when the food waste disposal process is not performed. For example, the exhaust fan 140 may operate even when the process of grinding, stirring, and drying the food waste is not performed in the disposal 40.

Therefore, it is possible to filter odors that may occur in any situation in the food waste disposer, and to discharge the filtered air.

Figure 11:
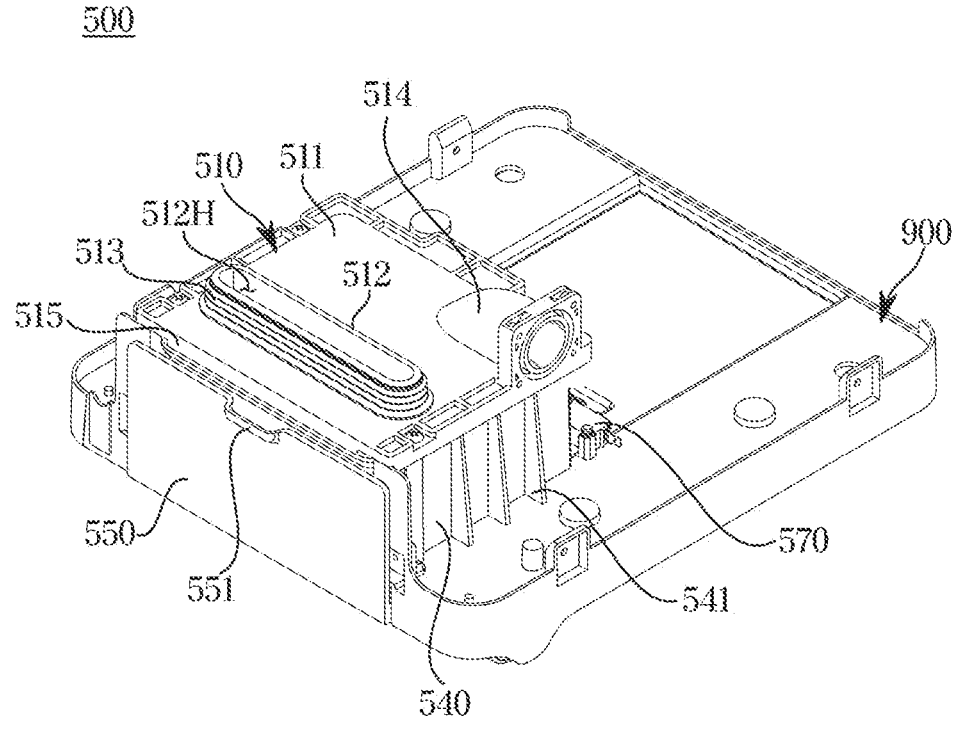
FIG. 11 is a perspective view illustrating a water storage of the food waste disposer shown in FIG. 9.
Figure 12:
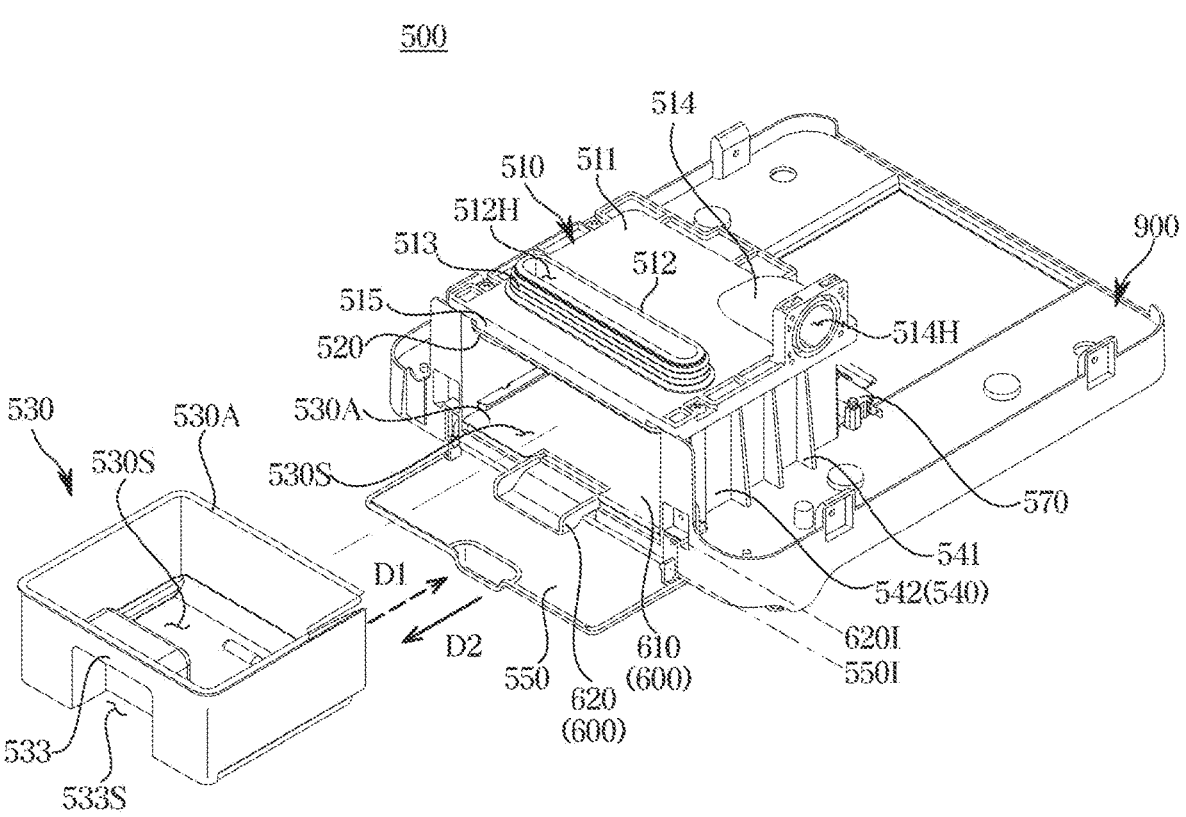
FIG. 12 is a perspective view illustrating a state in which a water storage container is separated from the water storage of the food waste disposer shown in FIG. 11.
Figure 13:
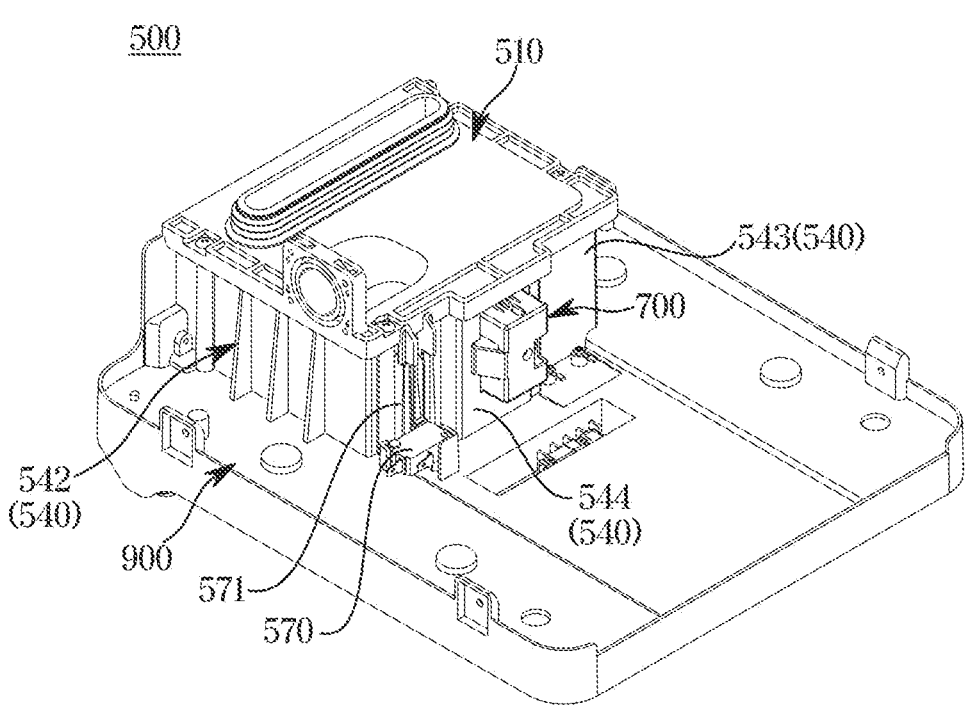
FIG. 13 is a rear-perspective view of the water storage of the food waste disposer shown in FIG. 11.

FIG. 11 is a perspective view illustrating a water storage 500 of the food waste disposer 1 shown in FIG. 9. FIG. 12 is a perspective view illustrating a state in which the water storage container 530 is separated from the water storage 500 of the food waste disposer 1 shown in FIG. 11. FIG. 13 is a rear-perspective view of the water storage 500 of the food waste disposer 1 shown in FIG. 11.

The water storage 500 according to an embodiment of the disclosure will be described with reference to FIGS. 11 to 13.

The food waste disposer 1 may include the water storage 500. The water storage 500 may be connected to the exhaust pipes 110 and 130. The water storage 500 may communicate with the exhaust flow path defined by the exhaust pipes 110 and 130.

Air containing moisture may be located in the exhaust pipes 110 and 130. Air containing moisture may be condensed while passing through the exhaust pipes 110 and 130.

More particularly, air may be heated by the heater 60 included in the food waste disposer 1. The heater 60 may be configured to heat the disposal in order to evaporate moisture in the food waste stored in the disposal.

As the heated air flows along the exhaust pipes 110 and 130, a temperature of the air may decrease. The air having the decreased temperature may contain moisture. As the temperature decreases, moisture may be liquefied into a liquid state. Moisture in the liquid state may be referred to as condensed water.

The exhaust pipes 110 and 130 may be connected to the disposal to guide air containing moisture.

The water storage 500 may be a device configured to collect condensed water. The water storage 500 may be provided in the direction of gravity with respect to the exhaust pipes 110 and 130. The water storage container 530 may be located in the direction of gravity with respect to the exhaust pipes 110 and 130 to allow condensed water generated in the exhaust pipes 110 and 130 to be concentrated.

The condensed water located in the exhaust pipes 110 and 130 may receive gravity, and then flow into the water storage 500. However, it is not limited thereto, and the food waste disposer 1 may include a component configured to move condensed water to the water storage 500.

The food waste disposer 1 may include the exhaust fan 140. The exhaust fan 140 may be coupled to the exhaust pipes 110 and 130 to move air containing moisture in the disposal to the exhaust pipes 110 and 130.

Referring to FIG. 12, the water storage 500 may include the water storage container 530 provided to store condensed water. A water storage space 530S may be defined in the water storage container 530 to receive condensed water therein. An entrance into the water storage space 530S may be referred to as a water storage opening 530A.

The water storage container 530 may collect condensed water in the exhaust pipes 110 and 130. The water storage container 530 may be separable out of the cover housings 12 and 13.

The water storage container 530 may have a substantially rectangular parallelepiped shape. The water storage opening 530A may be defined on one surface of the rectangular parallelepiped. For example, the water storage container 530 may include one surface of the rectangular parallelepiped corresponding to the water storage opening 530A, and other five surfaces of the rectangular parallelepiped. However, it is not limited thereto, and thus the shape of the water storage container 530 may vary as long as the water storage container 530 stores condensed water.

The water storage container 530 may include a plastic material, but is not limited thereto. Alternatively, the water storage container 530 may include a metal material.

The water storage container 530 may be manufactured by an injection process. However, it is not limited thereto. Alternatively, the water storage container 530 may be manufactured by a suitable method according to the material.

The water storage container 530 may be separated out of the cover housings 12 and 13 (refer to FIG. 9). Accordingly, the water storage container 530 may be easily cleaned. Because the condensed water stored in the water storage container 530 is connected to the disposal, the condensed water may be contaminated. Accordingly, the inside of the water storage container 530 may also be contaminated by the contaminated condensed water. Because the water storage container 530 is separatable from the cover housings 12 and 13, it is possible to keep the water storage container 530 clean. In the case of the food waste disposer 1 used at home, the food waste disposer 1 may be located in the house, and thus hygiene may be more important.

A direction in which the water storage container 530 is received in the cover housings 12 and 13 may be referred to as a receiving direction D1. A direction in which the water storage container 530 is separated from the cover housings 12 and 13 may be referred to as a separating direction D2. For example, the receiving direction D1 may be forward. The separating direction D2 may be backward.

A position in which the water storage container 530 is received in the cover housings 12 and 13 may be referred to as a receiving position of the water storage container 530. A position in which the water storage container 530 is separated from the cover housings 12 and 13 may be referred to as a separating position of the water storage container 530. A position between the receiving position and the separating position may be referred to as a transition position. The transition position may be referred to as a position in which at least a part of the water storage container 530 is received in the cover housings 12 and 13.

In other words, the water storage container 530 may be located in the cover housings 12 and 13, and may be in the receiving position in contact with a sensor module 700. The water storage container 530 may be in the separating position located outside the cover housings 12 and 13.

At the receiving position, the water storage container 530 may be in contact with the sensor module 700.

The water storage container 530 may include the container holding member 533 to allow a user to easily withdraw the water storage container 530 from the cover housings 12 and 13. The container holding member 533 may be located on a lateral side of the water storage container 530 with respect to the separating direction D2. The container holding member 533 may have a shape that is easy for a user to grip. The container holding member 533 may be located in the upper portion of the water storage container 530. A gripping recess 533S recessed toward the water storage space 530S may be provided below the container holding member 533. A user can put his/her hand into the gripping recess 533S, hold the container holding member 533, and withdraw the water storage container 530 from the cover housings 12 and 13.

The water storage container 530 may include a gasket contact member 532 positioned on an edge of the water storage opening 530A. The gasket contact member 532 may be in contact with a gasket 520 to be described later. This will be described later with reference to related drawings.

When the water storage container 530 is separated from the sensor module 700, condensed water in the water storage container 530 may be prevented from leaking to the outside of the water storage container 530.

The water storage 500 may include the water storage cover 510 configured to cover the water storage container 530. The water storage cover 510 may be configured to cover the water storage space 530S of the water storage container 530. In other words, the water storage cover 510 may be configured to cover the water storage opening 530A of the water storage container 530.

The water storage cover 510 may be connected to the exhaust pipes 110 and 130. Condensed water formed in the exhaust pipes 110 and 130 may be moved to the water storage container 530 through the water storage cover 510.

The water storage cover 510 may communicate with the outside of the cover housings 12 and 13. As a result, air passing through the exhaust flow paths in the exhaust pipes 110 and 130 may be moved toward the filter assembly 150 (refer to FIG. 4).

The water storage cover 510 may include a plastic material. However, it is not limited thereto, and may include a metal material.

The water storage cover 510 may be formed by injection molding. However, it is not limited thereto, and may be formed by a suitable process such as a press process.

The water storage cover 510 may include a water storage cover body 511. The water storage cover body 511 may include a configuration defining a main appearance of the water storage cover 510.

The water storage cover 510 may include the exhaust pipe connector 514 extending from the water storage cover body 511. The exhaust pipe connector 514 may be configured to be connected to the exhaust pipes 110 and 130.

The exhaust pipe connector 514 may have a bent shape. The exhaust pipes 110 and 130 may extend vertically downward. It may be difficult for the water storage container 530 to be located in a direction directly below the exhaust pipes 110 and 130. The exhaust pipe connector 514 may be bent from the exhaust pipes 110 and 130 to the water storage container 530 to connect the exhaust flow path and the water storage space 530S. For example, the exhaust pipe connector 514 may have a pipe shape bent at right angles.

The exhaust pipe connector 514 may be formed separately from the water storage cover body 511. The exhaust pipe connector 514 and the water storage cover body 511 may be coupled by a fastening member. However, it is not limited to thereto, and the exhaust pipe connector 514 and the water storage cover body 511 may be integrally formed with each other.

An exhaust pipe connection hole 514H communicating with the exhaust pipes 110 and 130 may be defined in the exhaust pipe connector 514.

The water storage cover 510 may include the filter mounting member 512 extending from the water storage cover body 511. The filter mounting member 512 may be configured to couple the water storage cover 510 to the filter assembly 150. A filter connection hole 512H communicating with the filter assembly 150 may be defined on the filter mounting member 512.

The filter mounting member 512 may extend toward the filter assembly 150. For example, the filter mounting member 512 may extend upward.

A cross section of the filter mounting member 512 may have an oval or a shape in which two opposite edges are round and the remaining opposite edges are long. However, it is not limited thereto.

The water storage 500 may include the filter sealing member 513 positioned to surround the filter mounting member 512. Condensed water may be contaminated, and thus it is required to prevent leakage of condensed water or odor between the filter mounting member 512 and the filter assembly 150. The filter sealing member 513 may seal between the filter mounting member 512 and the filter assembly 150.

The filter mounting member 512 may include an elastic material. For example, the filter mounting member 512 may include a rubber material.

The water storage cover 510 may include a cover flange 515 that is bent toward the water storage housing. The cover flange 515 may be positioned to correspond to the rim of the water storage cover 510.

The water storage 500 may include the water storage housing 540 receiving the water storage container 530. A water storage container receiving space 540S, in which the water storage container 530 is received, may be defined in the water storage housing 540.

The water storage housing 540 may be provided to surround the water storage container 530. However, the water storage cover 510 may cover the water storage opening 530A of the water storage container 530, and thus the water storage housing 540 may be provided to surround the remaining surface not covered by the water storage cover 510 of the water storage container 530.

The water storage container 530 may be separated from the water storage housing 540. A receiving opening 540A may be defined to separate the water storage container 530 from the water storage housing 540. The receiving opening 540A may be defined in the separating direction D2. For example, the receiving opening 540A may be defined at the rear of the water storage housing 540.

One side of the water storage housing 540 may be covered by the water storage cover 510. The water storage cover 510 may cover both the water storage housing 540 and the water storage container 530.

The water storage housing 540 may have a substantially rectangular parallelepiped shape. However, a surface covered by the water storage cover 510 may define a mounting opening 541A (refer to FIG. 14). The receiving opening 540A may be defined on the surface on which the water storage container 530 moves. That is, the water storage housing 540 may have a rectangular parallelepiped shape in which two surfaces are open.

When the water storage container 530 is in the receiving position, the water storage container 530 may be located between the water storage cover 510 and the water storage housing 540.

The water storage housing 540 may be coupled to the water storage cover 510. The water storage cover 510 may be coupled to the water storage housing 540 by a fastening member.

The water storage housing 540 may include plastic material. However, it is not limited thereto, and the water storage housing 540 may include a metal material.

The water storage housing 540 may be formed by an injection process. However, it is not limited thereto.

The water storage housing 540 may include a side water storage housing 542 to define a side surface. For example, the side water storage housing 542 may be located on the left and right sides of the water storage housing 540, respectively. The side water storage housing 542 may have a wall shape extending toward the water storage cover 510. For example, the side water storage housing 542 may extend upward.

The water storage housing 540 may include a counter housing wall 543 positioned in a direction in which the water storage container 530 is received. The counter housing wall 543 may be positioned between the side water storage housings 542 located on the left and right sides. For example, the counter housing wall 543 may be located in front of the water storage housing 540.

The counter housing wall 543 may have a shape of a wall substantially extending along the direction in which the side water storage housing 542 extends. For example, the counter housing wall 543 may extend upward.

The counter housing wall 543 may include a module insert 544 to which the sensor module 700 is mounted. This will be described later with reference to related drawings.

The water storage 500 may include the base housing 900. That is, the base housing 900 may be included in the housing 10 and simultaneously included in the water storage 500. The base housing 900 may be a component defining a lower exterior of the food waste disposer 1.

The base housing 900 may be integrally formed with the water storage housing 540. The base housing 900 may be connected to the water storage housing 540. The water storage housing 540 may be coupled to one side of the base housing 900.

The base housing 900 may be located below the water storage housing 540. One surface of the water storage housing 540 may be defined as the base housing 900. The base housing 900 may define the lower exterior of the water storage housing 540. The receiving space 540S, in which the water storage container 530 is received, may be defined by the water storage housing 540, the base housing 900 and the water storage cover 510. The receiving opening 540A may be defined by the water storage housing 540, the base housing 900 and the water storage cover 510.

However, it is not limited thereto. The base housing 900 may be spaced apart from the water storage housing 540. The water storage housing 540 may be positioned in a gravity direction with respect to the exhaust pipes 110 and 130 so as to collect condensed water generated in the exhaust pipes 110 and 130. Accordingly, the water storage housing 540 may be located in the lower portion of the food waste disposer 1. The water storage housing 540 may be supported so as to be placed inside the cover housings 12 and 13. The water storage housing 540 and the base housing 900 may be located in the lower portion of the food waste disposer 1. Accordingly, the base housing 900 may support the water storage housing 540.

In order to easily separate the water storage container 530 from the water storage housing 540, the water storage housing 540 may be located in the rear portion of the food waste disposer 1. Accordingly, at the upper rear of the base housing 900, the water storage housing 540 may be coupled to the base housing 900.

The water storage housing 540 may include a water storage housing support rib 541 supporting the side to enhance strength.

The base housing 900 may have a substantially flat shape.

In order to reduce a weight and to improve the strength, the base housing 900 may include a plurality of ribs arranged therein. The plurality of ribs may be located on the lower side of the base housing 900.

The base housing 900 may include a plastic material. However, it is not limited thereto, and thus may also include a metal material.

The base housing 900 may be formed by an injection process. However, it is not limited thereto, and may be formed by a suitable process according to the material.

The water storage 500 may include a water storage housing door 550 configured to open or close the receiving opening 540A.

The water storage housing door 550 may define the appearance of the food waste disposer 1. Accordingly, the water storage housing door 550 may prevent the configuration, such as the water storage container 530, from being exposed to the outside, and thus the aesthetics of the food waste disposer 1 may be improved.

The water storage housing door 550 may be coupled to the base housing 900. In order to open or close the receiving opening 540A, the water storage housing door 550 may be rotatably coupled to the base housing 900. However, it is not limited thereto, and the water storage housing 540 may be slidably coupled to the base housing 900.

The water storage housing door 550 may perform a pivotal movement based on a water storage door rotation axis 5501. The water storage door rotation axis 5501 may be positioned in a downward direction relative to the water storage door. Accordingly, it is possible to prevent the water storage housing door 550 from being downwardly rotated and closed by gravity.

The water storage housing door 550 may include a plastic material. However, it is not limited thereto and may include a metal material.

The water storage housing door 550 may be formed by an injection process. However, it is not limited thereto and may be formed according to a suitable process according to the material.

The water storage housing door 550 may include a handle 551 protruding away from the cover flange 515 to allow a user to grip the handle 551.

The handle 551 may be located in the upper portion of the water storage door 550. As a result, even if a user does not extend his/her hand further toward the floor, the user can easily grip the handle 551.

The water storage 500 may include a locking seat 600 provided to limit movement of the water storage container 530.

The locking seat 600 may be positioned to be in contact with the water storage container 530.

When the movement of the water storage container 530 is limited by the locking seat 600, a gap between the water storage cover 510 and the water storage container 530 may be sealed.

The locking seat 600 may include a support plate 610 configured to support the water storage container 530.

The support plate 610 may be coupled to the water storage container 530, and may be arranged between the water storage container 530 and the base housing 900.

While the water storage container 530 moves from an unlocked position to a locked position, the support may move the water storage container by pressing the support plate.

The support plate 610 may support the lower side of the water storage container 530. However, it is not limited thereto, and the support plate 610 may be located in any position as long as the support plate 610 supports the water storage container 530. The support plate 610 may support the upper side, the left and right side, and the front and rear side of the water storage container 530.

The support plate 610 may have a flat plate shape. However, it is not limited thereto, and the support plate 610 may have a shape capable of uniformly pushing the bottom surface of the water storage container 530. For example, the support plate 610 may include a shape that protrudes toward the water storage container 530 to be symmetrical with respect to the center of the water storage container 530.

The support plate 610 may include a plastic material.

The support plate 610 may be formed by an injection process.

While the water storage container 530 moves from the locked position to the unlocked position, the support plate 610 may be movable together with the water storage container 530.

While the water storage container 530 is separated out of the cover housings 12 and 13, the water storage container 530 may slide relative to the support plate 610.

The locking seat 600 may include a lock 620 coupled to the support plate 610.

The lock 620 may be rotated based on a lock rotation axis 6201.

The lock 620 may be configured to move the support plate 610. The lock 620 may be rotated so as to push the base housing 900, thereby moving the support plate 610. Accordingly, the water storage container 530 may be moved toward the gasket 520. Accordingly, a user can easily change a position of the water storage container 530 by manipulating the lock 620 exposed to the outside. However, the lock 620 may not be limited thereto as long as the lock 620 is configured to move the support plate 610. For example, the lock 620 may include a motor and a lifting device operated from the outside.

The lock 620 may include a plastic material.

The lock 620 may be formed by an injection process.

The locking seat 600 may include a sub-lock 630 coupled to the support plate 610.

The sub-lock 630 may be a configuration corresponding to the lock 620.

Particularly, referring to FIG. 13, the water storage 500 may include the sensor module 700. The sensor module 700 may include a water level sensor 710 (not shown). The sensor module 700 may be a component for the water level sensor 710 to perform sensing.

The water level sensor 710 may be a sensor configured to output a signal corresponding to an amount of condensed water stored in the water storage container 530. This will be described later with reference to the drawings.

The sensor module 700 may be mounted on the water storage housing 540. The sensor module 700 may be coupled to the counter housing wall 543 of the water storage housing 540. The sensor module 700 may be coupled to the module insert 544 of the counter housing wall 543. For example, the sensor module 700 may be coupled to the front portion of the water storage housing 540.

The sensor module 700 may be positioned to face a surface defined in a direction in which the water storage container 530 is inserted from the separating position to the receiving position.

The water level sensor 710 may be configured to output a signal about the water level of the water storage container 530 in response to the water storage container 530 being in the receiving position.

The sensor module 700 may include the water level sensor 710 configured to output a signal about the level of the condensed water collected in the water storage container 530 in response to the sensor module 700 being located adjacent to the water storage container 530.

The water level sensor 710 may be located in the cover housings 12 and 13, and in response to being in contact with the water storage container 530, the water level sensor 710 may be configured to output a signal about the level of condensed water collected in the water storage container 530.

The water storage 500 may include a mounting sensor 570. In response to the water storage 500 being in the receiving position, the mounting sensor 570 may be configured to output a signal corresponding to the position of the water storage 500.

The mounting sensor 570 may include a micro switch. The micro switch may be a sensor configured to output a signal as the sensor is pressed.

The mounting sensor 570 may be coupled to the base housing 900.

The mounting sensor 570 may be positioned adjacent to the water storage housing 540.

The water storage 500 may include a mounting lever 571 to press the mounting sensor 570. The mounting lever 571 may press the mounting sensor 570 as the mounting lever 571 is pressed by the water storage container 530.

The mounting lever 571 may include a plastic material. However, it is not limited thereto and may include a metal material.

The mounting lever 571 may be formed by an injection process. However, it is not limited thereto and may be formed by a process suitable for the material.

Hereinafter the water storage 500 will be described at in more detail.

Figure 14:
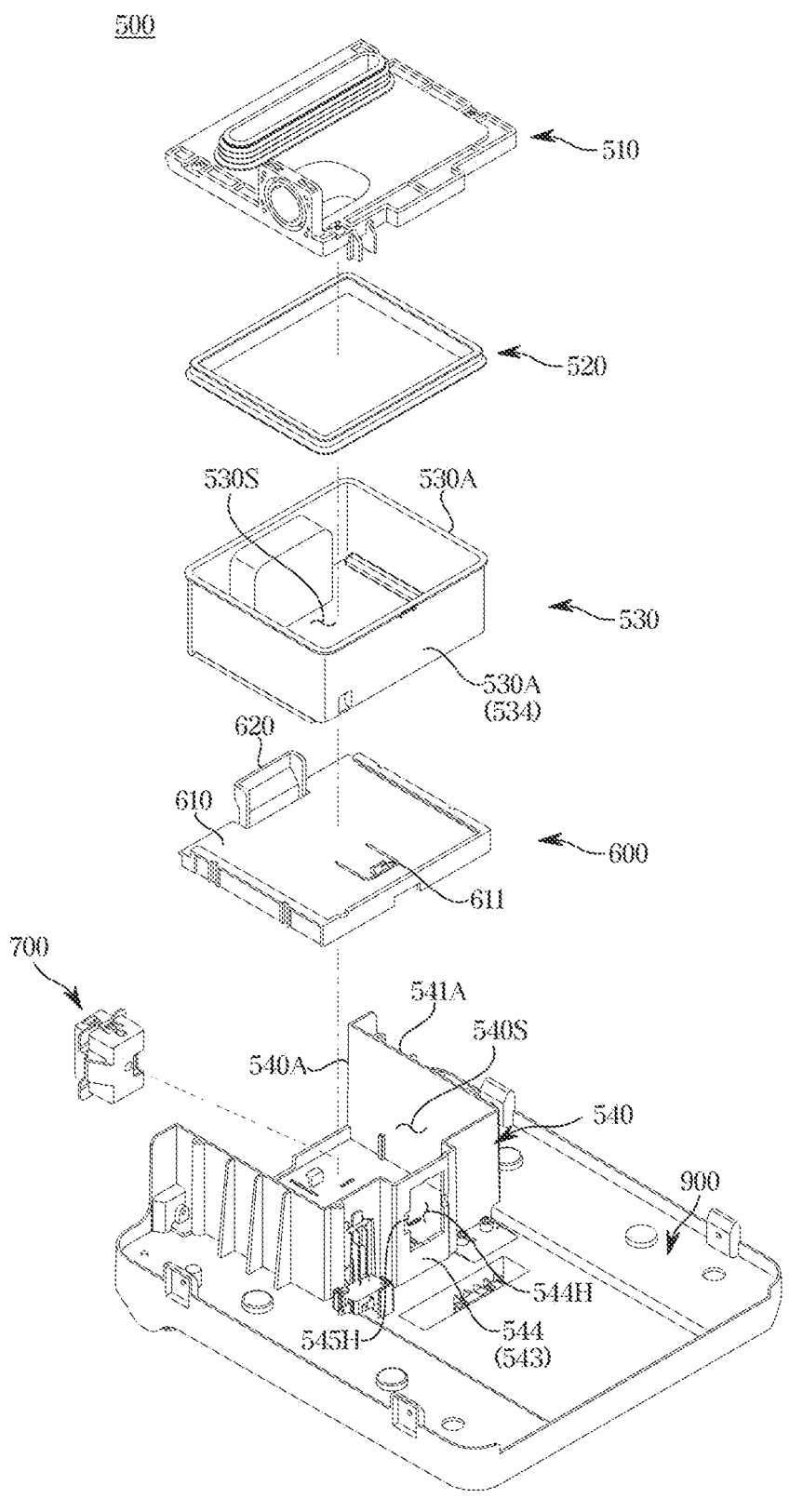
FIG. 14 is an exploded-view of the water storage of the food waste disposer shown in FIG. 13.

FIG. 14 is an exploded view of the water storage 500 of the food waste disposer 1 shown in FIG. 13.

The water storage 500 according to an embodiment of the disclosure will be described in more detail with reference to FIG. 14.

The water storage 500 may include the gasket 520. The gasket 520 may be configured to seal between the water storage cover 510 and the water storage container 530.

The gasket 520 may be positioned between the water storage container 530 and the water storage cover 510 to seal between the water storage container 530 and the water storage cover 510 in response to the water storage container 530 being in the locked position.

The gasket 520 may be positioned between the water storage cover 510 and the water storage container 530. The gasket 520 may be positioned along a gap defined between the water storage cover 510 and the water storage container 530.

The gasket 520 may extend along the water storage opening 530A. For example, the gasket 520 may have a square ring shape.

The gasket 520 may be coupled to the water storage cover 510. The water storage cover 510 may include a groove for receiving the gasket 520. The gasket 520 may be positioned to be in contact with the gasket contact member 532 of the water storage container 530.

The gasket contact member 532 of the water storage container 530 may extend toward the outside of the water storage space 530S. The gasket contact member 532 may be bent and extended.

In the gasket 520, a thickness of a portion being in contact with the gasket contact member 532 may be less than a thickness being in contact with the water storage cover 510. Accordingly, while the gasket 520 is stably coupled to the water storage cover 510 and in contact with the water storage container 530, the gasket 520 may be easily deformed.

The gasket 520 may include a deformable elastic material. For example, the gasket 520 may be formed of rubber. Accordingly, when the water storage container 530 and the water storage cover 510 are pressed toward the gasket 520, the gasket 520 may be deformed. Therefore, the gasket 520 may fill the gap defined between the water storage container 530 and the water storage cover 510.

The gasket 520 may be formed by an injection process. However, it is not limited thereto, and may be formed by a process suitable for the material.

The water storage housing 540 may include the counter housing wall 543 positioned in the receiving direction D1 of the water storage container 530.

The counter housing wall 543 may include the module insert 544 provided to be more concave in the receiving direction D1. A module insertion hole 544H defined to allow the sensor module 700 to pass through may be provided in the module insert 544.

The module insertion hole 544H may have a shape corresponding to the sensor module 700. The module insertion hole 544H may have a rectangular shape.

The module insertion hole 544H may be formed by cutting.

The module insertion hole 544H may be provided as a protrusion insertion hole 544H defined to allow a support protrusion 735 of the sensor module 700 (refer to FIG. 10) to be inserted thereinto. The protrusion insertion hole 544H may be defined to correspond to the support protrusion 735. The protrusion insertion hole 544H may have a shape in which the support protrusion 735 is not easily separated in a direction opposite to the insertion direction after being inserted.

The module insert 544 may include a module mounting space 544S in which the sensor module 700 is seated.

The water storage housing 540 may include a stopper 611. When the water storage container 530 is located in the receiving position, the stopper 611 may prevent the water storage container 530 from further moving toward the counter housing wall 543.

When the water storage container 530 is in the receiving position, the stopper 611 may have a shape protruding toward the water storage container 530. The stopper 611 may be defined in such a way that an angle formed between a surface defined in the separating direction D2 and the base housing 900 is greater than an angle formed between a surface defined in the receiving direction D1 and the base housing 900. For example, the stopper 611 may be defined in such a way that a surface defined in the separating direction D2 is substantially perpendicular to the base housing 900. The stopper 611 may be defined in such a way that a surface defined in the receiving direction D1 has an angle of substantially 10 degrees to 80 degrees with the base housing 900.

As a result, when the water storage container 530 is in contact with the stopper 611 as the water storage container 530 moves in the receiving direction D1, the stopper 611 may prevent the water storage container 530 from moving in the receiving direction D1. When the water storage container 530 moves in the separating direction D2, it is possible to prevent that the movement of the water storage container 530 is limited by the stopper 611.

The stopper 611 may be configured to move in a direction perpendicular to the receiving direction D1. For example, the stopper 611 may be configured to move in the up and down direction.

The stopper 611 may have elasticity. One end of the stopper 611 may be a fixed end, and the other end may have a free end. Accordingly, even if the stopper 611 moves, the stopper 611 may be returned to its original position.

The stopper 611 may have a substantially rectangular shape. At this time, one edge may be fixed and the remaining three edges may be free. A slit may be provided to surround the three free edges. A protruding shape may be positioned on the side of the free edge opposite to the fixed one edge.

The water storage container 530 may include a stopper receiving groove forming member defining a stopper receiving groove 531H to allow the stopper 611 to be received therein. The stopper receiving groove 531H may have a shape corresponding to the protruding shape of the stopper 611.

The configuration of the water storage 500 will be described again, with reference to FIG. 14.

The water storage housing 540 including the receiving space 540S may be arranged on the base housing 900.

The locking seat 600 may be arranged to be received in the water storage housing 540.

The sensor module 700 may be arranged to penetrate the counter housing wall 543 of the water storage housing 540.

The water storage container 530 including the water storage space 530S may be arranged on the locking seat 600. The water storage container 530 may include a counter container wall 534 facing the sensor module 700. The counter container wall 534 may include a counter container surface 534A contactable with the sensor module 700.

The counter container surface 534A may face the sensor module 700 when the water storage container 530 is in the receiving position.

The water storage cover 510 may be arranged to cover the water storage space 530S. The water storage cover 510 may be coupled to the water storage housing 540.

The gasket 520 may be arranged along a rim of the water storage cover 510. The gasket 520 may be arranged to be in contact with the water storage container 530.

When the water storage container 530 is in the receiving position, the stopper 611 may be seated in the stopper receiving member 531. Accordingly, the water storage container 530 may be arranged at a predetermined position. For example, the predetermined position in which the water storage container 530 is received may be a position in which the water storage container 530 comes into contact with the sensor module 700.

When the water storage container 530 is positioned in the receiving position, the counter container wall 534 of the water storage container 530 may come into contact with the sensor module 700. The counter container wall 534 may press against the sensor module 700. Accordingly, the counter container wall 534 may be closer to the water level sensor 710 included in the sensor module 700.

The sensor module 700 may be coupled to the water storage housing 540. The sensor module 700 may be coupled to the counter housing wall 543 of the water storage housing 540. Accordingly, while the water storage housing 540 moves from the separating position to the receiving position, the sensor module 700 may be positioned to face the water storage housing 540 in the receiving direction D1 with respect to the water storage housing 540. Accordingly, while the water storage housing 540 moves in the receiving direction D1, the water storage housing 540 may press the sensor module 700.

The locking seat 600 may be configured to limit movement in response to the water storage container 530 being in the receiving position. The locking seat 600 may be moved from the unlocked position, which allows movement of the water storage container 530 from the receiving position to the separating position, to the locked position which limits movement of the water storage container 530.

In other words, the water storage container 530 may be allowed to move in the locked position. The movement of the water storage container 530 may be limited in the unlocked position. While the water storage container 530 moves from the locked position to the unlocked position, the water storage container 530 may be moved toward the water storage cover 510.

In response to the locking seat 600 being in the locked position, the water storage container 530 may be placed in close contact with the gasket 520. In response to the water storage container 530 coming into close contact with the gasket 520, a negative pressure may be generated between the gasket 520 and the gasket 520. Accordingly, the water storage container 530 may come into close contact with the gasket 520.

While the locking seat 600 moves from the unlocked position to the locked position, the water storage container 530 may be moved toward the gasket 520. The locking seat 600 may move the water storage container 530 toward the water storage cover 510. However, it is not limited thereto, and the locking seat 600 may move the water storage container 530 to an appropriate position to limit the movement of the water storage container 530.

A user can move the support plate 610 by manipulating the lock 620. As the support plate 610 moves, the water storage container 530 may be moved toward the water storage cover 510.

The gasket 520 may also be placed in close contact with the water storage cover 510. Accordingly, a gap may not be provided between the water storage container 530 and the gasket 520, and between the gasket 520 and the water storage cover 510. The water storage container 530 may be covered by the water storage cover 510 configured to cover the water storage opening 530A (refer to FIG. 14). One side of the water storage cover 510 may be connected to the exhaust pipes 110 and 130 (refer to FIG. 4) and the other side of the water storage cover 510 may be connected to the filter assembly 150 (refer to FIG. 4). That is, when the locking seat 600 is in the locked position, the water storage container 530 may be positioned to prevent the communication between the flow path, which is from the exhaust pipes 110 and 130 to the filter assembly 150, and the outside. The air inside the exhaust pipes 110 and 130 of the food waste disposer 1 may be mixed with odors generated from the disposal (refer to FIG. 4). Accordingly, when the flow path from the exhaust pipes 110 and 130 to the filter assembly 150 communicates with a flow path other than the predetermined path, odors may be discharged along an undetermined path. Particularly, the food waste disposer 1 may be generally used in an indoor space, and thus when the flow path from the exhaust pipes 110 and 130 to the filter assembly 150 is not sealed, odors may be discharged into the indoor space. In order to create a comfortable indoor environment, it is required to seal the flow path from the exhaust pipes 110 and 130 to the filter assembly 150.

Figure 15:
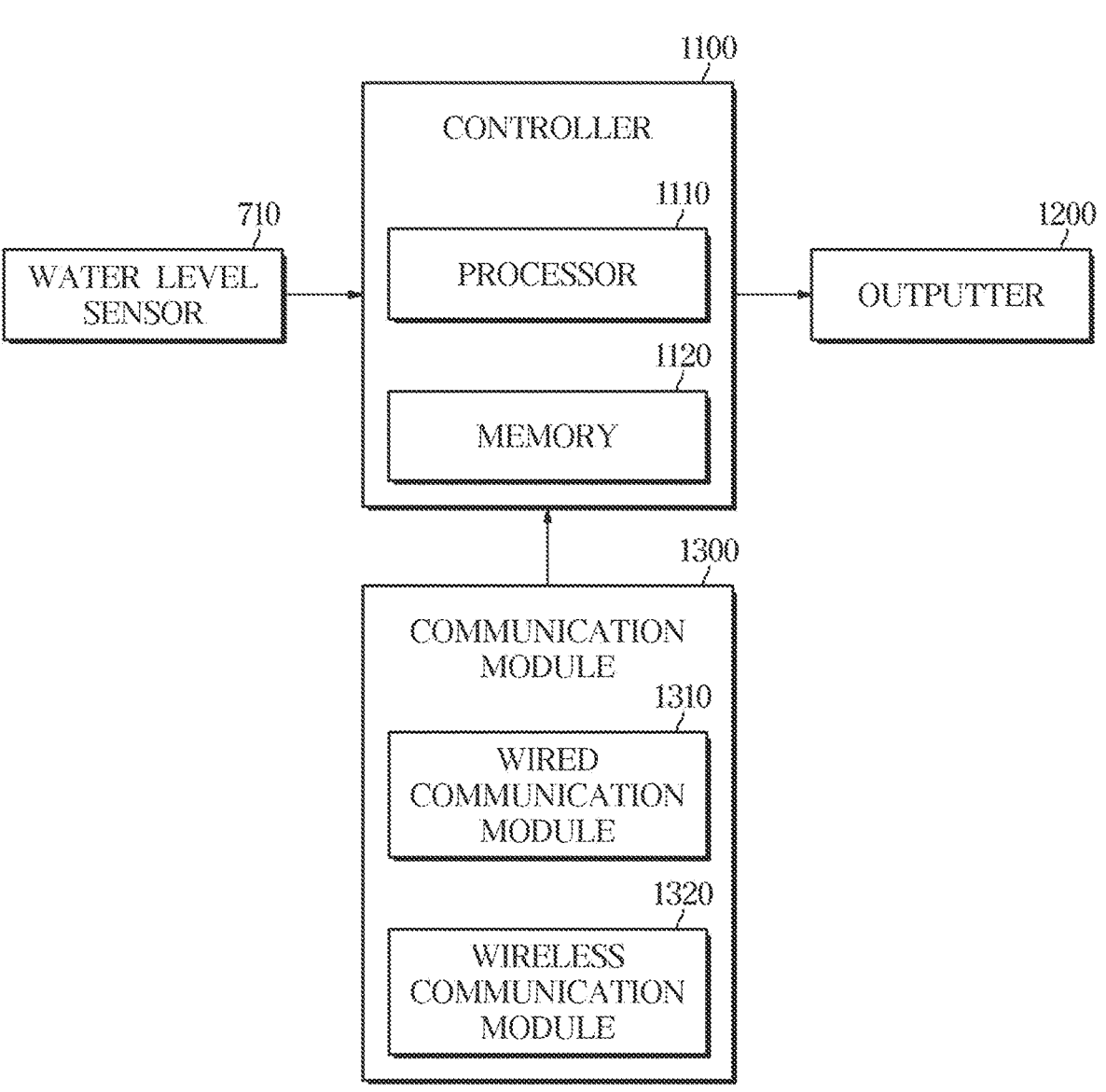
FIG. 15 is a control block diagram illustrating an operation of a water level sensor shown in FIG. 13.

FIG. 15 is a control block diagram illustrating an operation of a water level sensor (not shown) shown in FIG. 14.

Control of a controller 1100 according to an embodiment of the disclosure will be described with reference to FIG. 15.

The food waste disposer 1 may include the controller 1100. The controller 1100 may include a processor 1110 configured to perform calculations and a memory 1120 configured to store data.

The memory 1120 may store or memorize a program (a plurality of instructions) or data for processing signals and providing control signals.

The memory 1120 may include a volatile memory 1120 such as Static Random Access Memory (S-RAM) and Dynamic Random Access Memory (D-RAM), and a non-volatile memory 1120 such as Read Only Memory (ROM), Erasable Programmable Read Only Memory (EPROM). The memory 1120 may be integrally provided with the processor 1110 or may be provided as a semiconductor device separated from the processor 1110.

The processor 1110 may further include a processing core (e.g., an arithmetic circuit, a memory circuit, and a control circuit) that processes signals and outputs control signals based on programs or data stored in the memory 1120.

The processor 1110 may be electrically connected to the water level sensor. The processor 1110 may be electrically connected to the memory 1120.

The processor 1110 may obtain a water level value of the water storage container 530 based on a signal output by the water level sensor in response to the water level of the water storage container 530.

The food waste disposer 1 may include an outputter 1200 controlled by a signal generated by the processor 1110. The outputter 1200 may include a user interface.

The user interface may receive a touch input, and may output an image. The user interface may include an input button configured to obtain a user input and a display provided to display information about the water level of the water storage container 530 in response to the user input.

The plurality of buttons may obtain a user input and provide an electrical signal (e.g., a voltage signal or a current signal) representing the obtained user input to the processor 1110.

Based on the obtained water level value, the processor 1110 may control the outputter 1200 to display information about the water level on the outputter 1200.

The food waste disposer 1 may include a communication module 1300 configured to communicate with the processor 1110.

The communication module 1300 may receive data about the water level from a content source connected to a network.

The communication module 1300 may include a wired communication module 1310 configured to receive water level data from a content source by wire, and a wireless communication module 1320 configured to wirelessly receive water level data from a content source.

The wired communication module 1310 may receive data streams from content sources using various communication standards. For example, the wired communication module 1310 may receive water level data from a content source using Ethernet (IEEE 802.3 technology standard).

The wired communication module 1310 may include a wired communication terminal for wired connection to a network and/or a communication circuit (e.g., a wired communication interface controller) including the processor 1110 and/or the memory 1120 for modulating and/or demodulating data for wired communication.

The wireless communication module 1320 may transmit and receive wireless signals to and from an audio device using various wireless communications. Further, the wireless communication module 1320 may receive a data stream from a content source via the audio device.

For example, the wireless communication module 1320 may access a wireless repeater using WiFi™ (IEEE 802.11 technology standard) wireless communication, and may receive data about the water level from a content source via the wireless repeater.

Wi-Fi wireless communication may provide peer to peer communication between nodes (e.g., a display device and an audio device) without passing through a wireless repeater. As such, direct communication using Wi-Fi wireless communication is referred to as "WiFi P2P" or "WiFi direct". The wireless communication module 1320 may exchange data with an audio device 200 using a Wi-Fi P2P communication standard.

In addition, the wireless communication module 1320 may transmit and receive data with the processor 1110 using Bluetooth™ (IEEE 802.15.1 technical standard) or ZigBee (IEEE 802.15.4 technical standard) wireless communication. Alternatively, the wireless communication module 1320 may exchange data with an audio device using Near Field Communication (NFC).

The wireless communication module 1320 may include an antenna configured to transmit and receive wireless signals and/or a communication circuit (e.g., a wireless communication interface) including the processor 1110 and/or the memory 1120 for decoding/encoding data for wireless communication.

Figure 16:
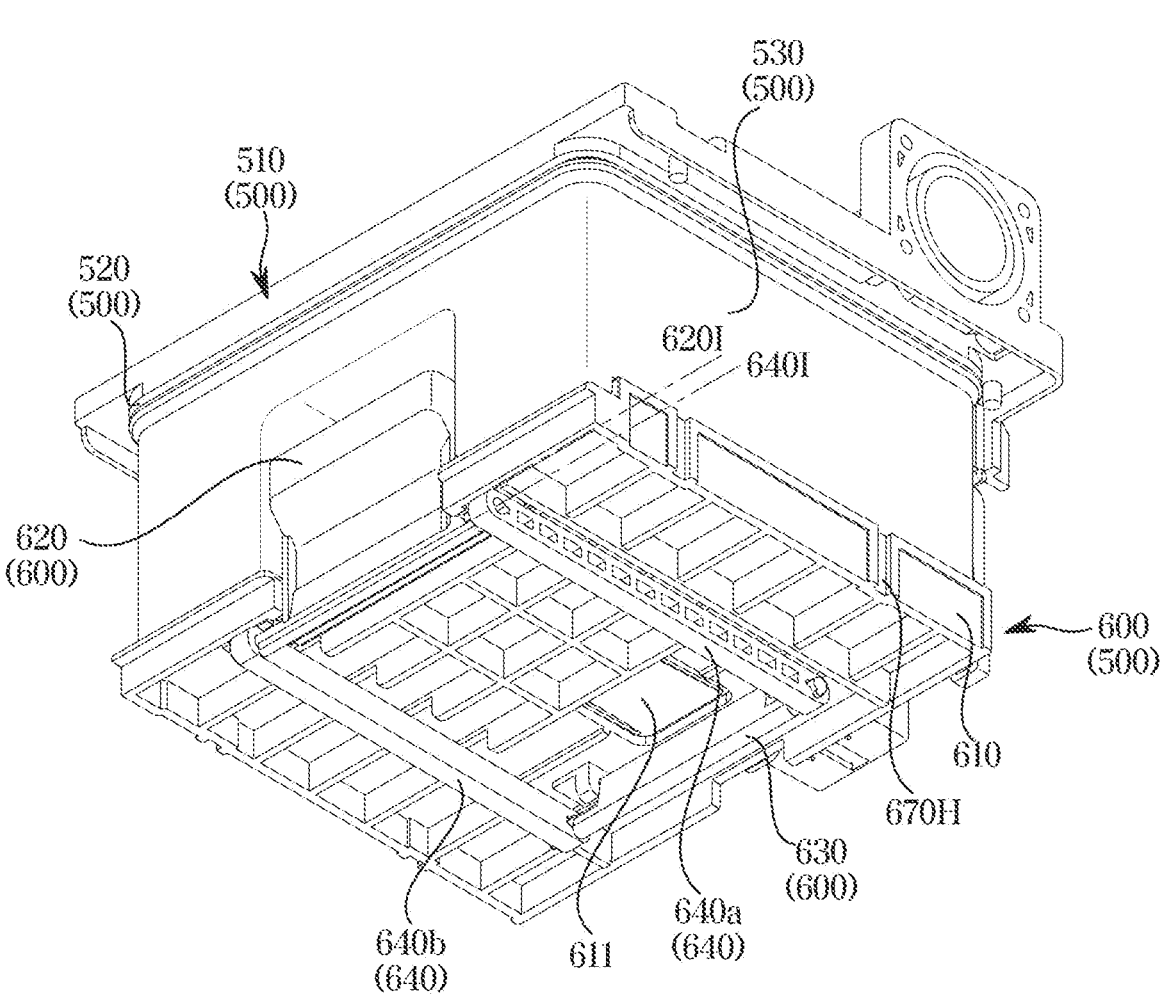
FIG. 16 is a bottom-perspective view illustrating a state in which a water storage cover, a gasket, the water storage container, and a locking seat are separated from the food waste disposer shown in FIG. 12.

FIG. 16 is a bottom-perspective view illustrating a state in which the water storage cover 510, the gasket 520, the water storage container 530, and the locking seat 600 are separated from the food waste disposer 1 shown in FIG. 12.

The locking seat 600 and peripheral configurations according to an embodiment of the disclosure will be described with reference to FIG. 16.

The water storage 500 may include the water storage cover 510 provided to cover the water storage container 530.

The water storage 500 may include the gasket 520 sealing between the water storage container 530 and the water storage cover 510.

The gasket 520 may be coupled to the water storage cover 510.

The water storage 500 may include the locking seat 600. The locking seat 600 may move the water storage container 530 to the locked position in which the movement of the water storage container 530 is prevented. Because the water storage container 530 needs to contain condensed water during the operation of the food waste disposer 1, it is required to prevent the movement of the water storage container 530.

The locking seat 600 may move the water storage container 530 from the locked position, in which the movement the water storage container 530 is prevented, to the unlocked position in which the movement of the water storage container 530 is allowed. Alternatively, the locking seat 600 may move the water storage container 530 from the unlocked position to the locked position. The locking seat 600 may move the water storage container 530 between the unlocked position and the locked position.

The locking seat 600 may move the water storage container 530 from the unlocked position of the water storage container 530 toward a locking direction D3 directed to the locked position. The locking seat 600 may move the water storage container 530 from the locked position of the water storage container 530 to an unlocked position in a direction toward the unlocked position.

The locking seat 600 may be positioned on the water storage container 530. The locking seat 600 may be located on a side that is opposite to a side, on which the water storage cover 510 is located, with respect to the water storage container 530. The locking seat 600 may be located below the water storage container 530.

The locking seat 600 may receive at least a portion of the water storage container 530.

As at least a part of the locking seat 600 moves, the locking seat 600 may move the water storage container 530 toward the gasket 520 or the water storage cover 510. As a result, in the locked position, the water storage container 530 may restricted in movement, and at the same time, odor generated from the condensed water in the water storage container 530 may be prevented from leaking out. That is, when the water storage container 530 is in the locked position, a gap between the water storage container 530 and the water storage cover 510 may be sealed.

The locking seat 600 will be described in more detail later.

Figure 17:
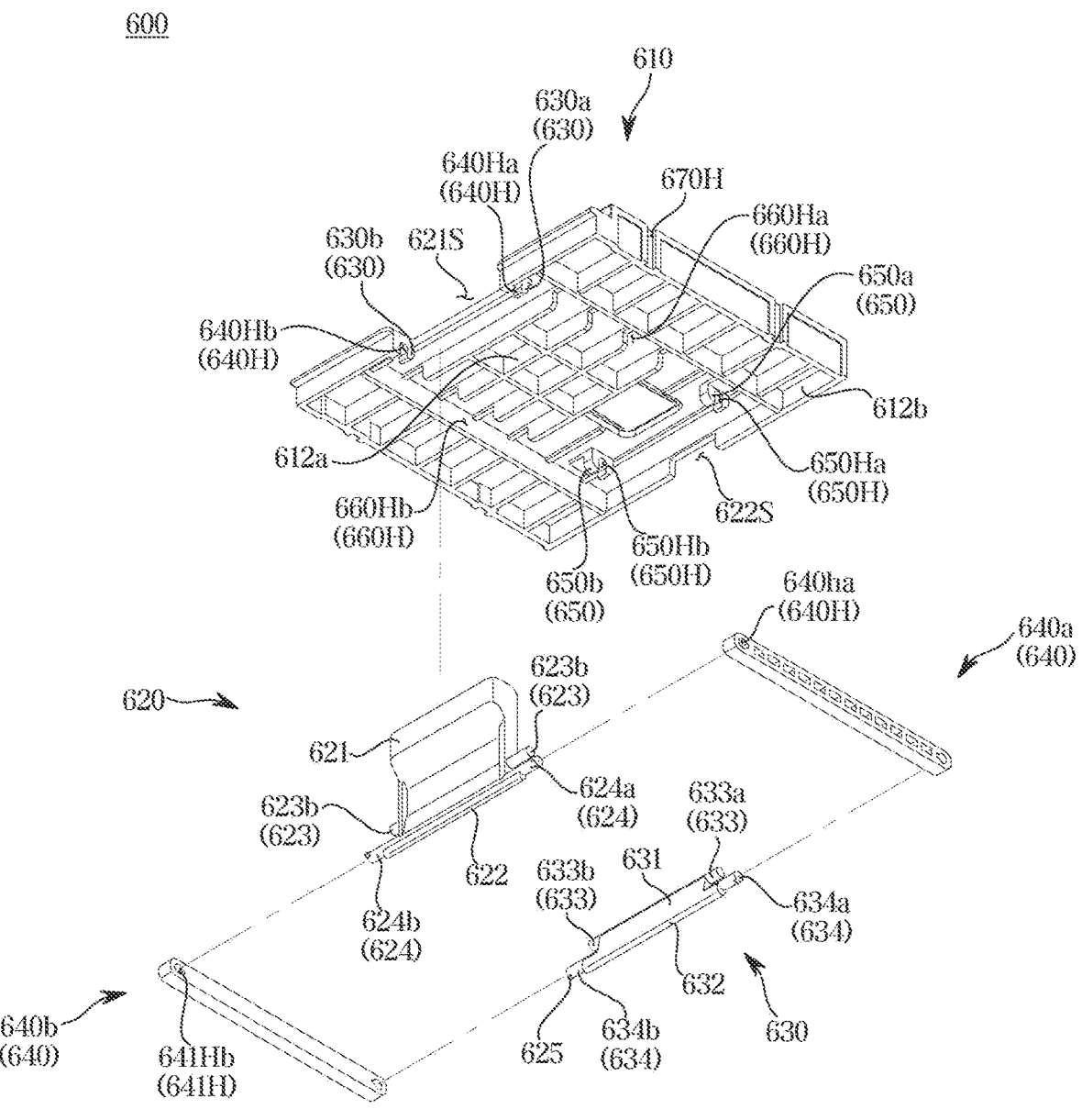
FIG. 17 is an exploded-view of the locking seat of the food waste disposer shown in FIG. 16.

FIG. 17 is an exploded view of the locking seat 600 of the food waste disposer 1 shown in FIG. 16.

The locking seat 600 according to an embodiment of the disclosure will be described with reference to FIG. 17.

The locking seat 600 may include the support plate 610. The support plate 610 may support the water storage container 530.

The support plate 610 may be in contact with the water storage container 530 when the water storage container 530 is in the receiving position. The support plate 610 may be received in the water storage housing 540. This will be described later with reference to the drawings.

The support plate 610 may have a rectangular flat plate shape. However, it is not limited thereto, and the support plate 610 may have a shape corresponding to the shape of the water storage container 530 that is opposite thereto.

The support plate 610 may have a rib shape for increasing a strength a side that is opposite to a side facing the water storage container 530. The rib shape of the support plate 610 may be provided in plurality.

The support plate 610 may include a plastic material. However, it is not limited thereto, and the support plate 610 may include a material such as metal.

The support plate 610 may be formed by injection molding. However, it is not limited thereto, and the support plate 610 may be formed by a suitable process according to the material.

A base guide rib groove 670H may be defined in the support plate 610. The base guide rib groove 670H may be a configuration into which a base guide rib 960 included in a water storage housing 540 to be described later is inserted.

The base guide rib groove 670H may be defined by protruding a periphery thereof.

The base guide rib groove 670H may be located on the left or right side of the support plate 610. However, it is not limited thereto, and the base guide rib groove 670H may be located on the other side in a non-overlapping range in relation to other components.

The base guide rib groove 670H may extend in the locking direction D3 or an unlocking direction D4.

A lock receiving space 621S may be defined in the support plate 610. The lock receiving space 621S may be a space in which the lock 620 is received.

The lock receiving space 621S may be located in the rear portion of the support plate 610. However, it is not limited thereto and the lock receiving space 621S may be located according to a position in which the lock 620 is coupled.

The lock receiving space 621S may be defined to be recessed from a rim of the support plate 610 toward the inside.

A sub-lock receiving space 622S may be defined in the support plate 610. The sub-lock receiving space 622S may be a space provided to receive the sub-lock 630 to be described later.

The sub-lock receiving space 622S may be located in the front side of the support plate 610. However, it is not limited thereto and the sub-lock receiving space 622S may be located according to the position in which the sub-lock 630 is coupled.

Alternatively, the sub-lock receiving space 622S may be located in parallel with the position in which the lock receiving space 621S is located. A description thereof will be described with reference to the drawings related to the lock 620 and the sub-lock 630.

The sub-lock receiving space 622S may be defined to be recessed from the rim of the support plate 610 toward the inside.

The support plate 610 may include a shaft coupler 630. The shaft coupler 630 may be a configuration for coupling a rotation shaft 623 of the lock 620 to be described later.

The shaft coupling groove 640H may be defined on the shaft coupler 630.

The rotation shaft 623 of the lock 620 may be rotatably coupled to the shaft coupling groove 640H. The rotation shaft 623 may be received in the shaft coupling groove 640H.

The shaft coupling groove 640H may be provided to be recessed toward the upper side. However, it is not limited thereto and the shaft coupling groove 640H may face any direction as long as the shaft coupling groove 640H is recessed to receive the rotation shaft 623.

The shaft coupling groove 640H may be positioned adjacent to the lock receiving space 621S.

The shaft coupler 630 may protrude downward. However, it is not limited thereto, and the shaft coupler 630 may protrude in the direction opposite to the direction toward the water storage container 530.

The shaft coupler 630 may be provided in plurality. The shaft coupling groove 640H may be defined in each of the plurality of shaft couplers 630. That is, the shaft coupling groove 640H may be provided in plurality.

The plurality of shaft couplers 630 may include a first shaft coupler 630: 630a defining a first shaft coupling groove 640Ha into which a first rotation shaft 623a of the lock 620 is inserted. The plurality of shaft couplers 630 may include a second shaft coupler 630: 630b defining a second shaft coupling groove 640Hb into which a second rotation shaft 623b of the lock 620 is inserted.

The support plate 610 may include a sub-shaft coupler 650. The sub-shaft coupler 650 may be provided to allow a sub-rotation shaft 633 of the sub-lock 630, to be described later, to be coupled thereto.

The shaft coupling groove 640H may be defined on the sub-shaft coupler 650.

The sub-rotation shaft 633 of the sub-lock 630 may be rotatably coupled to the shaft coupling groove 640H. The sub-rotation shaft 633 may be received in the shaft coupling groove 640H.

The shaft coupling groove 640H may be recessed toward the upper side. However, it is not limited thereto, and the shaft coupling groove 640H may face any direction, as long as the shaft coupling groove 640H is recessed to receive the sub-rotation shaft 633.

The shaft coupling groove 640H may be located adjacent to the sub-lock receiving space 622S.

The sub-shaft coupler 650 may protrude downward. However, it is not limited thereto, and the sub shaft coupler 650 may protrude in the direction opposite to the direction toward the water storage container 530.

The sub-shaft coupler 650 may be provided in plurality. A sub-shaft coupling groove 650H may be defined in each of the plurality of sub-shaft couplers 650. That is, the sub-shaft coupling groove 650H may be provided in plurality.

The plurality of sub-shaft couplers 650 may include a first sub-shaft coupler 650Ha defining a first sub-shaft coupling groove 640Ha into which a first sub-rotation shaft 633a of the sub-lock 630 is inserted. The plurality of sub-shaft couplers 650 may include a second sub-shaft coupler 650b defining a second sub-shaft coupling groove 640Hb into which a second sub-rotation shaft 633b of the sub-lock 630 is inserted.

A link receiving groove 660H may be defined in the support plate 610. The link receiving groove 660H may be provided to receive a connection link 640 to be described later.

The link receiving groove 660H may be positioned to correspond to the connection link 640. The link receiving groove 660H may have a shape corresponding to the con-nection link 640.

The link receiving groove 660H may be located in the lower portion of the support plate 610.

The link receiving groove 660H may be located between the lock receiving space 621S and the sub-lock receiving space 622S.

The link receiving groove 660H may have a shape cor-responding to the shape of the connection link 640.

The link receiving groove 660H may be defined by a rib positioned on the lower side of the support plate 610 to enhance a strength.

The link receiving groove 660H may include a first link receiving groove 660Ha provided to receive a first connec-tion link 640a, and a second link receiving groove 660Hb provided to receive a second connection link 640b.

The locking seat 600 may include the lock 620. The lock 620 may be configured to move the water storage container 530 to the locked position or the unlocked position.

The lock 620 may be rotatably coupled to the support plate 610. Accordingly, a user can easily rotate the lock 620 according to the principle of a lever.

The lock 620 may be located behind the support plate 610. However, it is not limited thereto, and the lock 620 may be positioned at a position exposed to the outside in the locking seat 600. Accordingly, the lock 620 may be easily operated by a user.

The lock 620 may have a substantially rectangular par-allelepiped shape.

The lock 620 may include a plastic material. The lock 620 may be formed by injection molding. However, it is not limited thereto.

The lock 620 may include a handle 621. The handle 621 may be arranged in the lock 620 to be gripped by a user.

The handle 621 may include a shape protruding outward to allow a user to easily grip the handle 621.

The lock 620 may include the rotation shaft 623. The rotation shaft 623 may be a component corresponding to a rotational center of the lock 620.

The rotation shaft 623 may be rotatably coupled to the support plate 610. The rotation shaft 623 may be coupled to the shaft coupler 630 of the support plate 610 while being received in the shaft coupling groove 640H.

The rotation shaft 623 may be provided to protrude from the handle 621. The rotation shaft 623 may protrude to the left or right of the handle 621.

The rotation shaft 623 may be provided in plurality. The plurality of rotation shafts 623 may include the first rotation shaft 623a protruding from the left side of the handle 621. The plurality of rotation shafts 623 may include the second rotation shaft 623b protruding from the right side of the handle 621.

The first rotation shaft 623a may be received in the first shaft coupling groove 640Ha. The second rotation shaft 623b may be received in the second shaft coupling groove 640Hb.

The lock 620 may include a connection shaft 624. The connection shaft 624 may be configured to be coupled to a connection link 640.

The connection link 640 may rotate about a connection link rotation axis 6401. The connection link rotation axis 6401 may be parallel to the direction in which the connec-tion shaft 624 extends.

The connection shaft 624 may be positioned to be spaced apart from the rotation shaft 623. The connection shaft 624 may be positioned below the rotation shaft 623. However, it is not limited thereto.

The connection shaft 624 may extend from one side of the connection shaft support 622. However, it is not limited thereto, and the connection shaft 624 may extend from one side of the lock 620.

The connection shaft 624 may extend parallel to the direction in which the rotation shaft 623 extends.

The connection shaft 624 may be provided to correspond to the rotation shaft 623.

The connection shaft 624 may be rotatably coupled to the connection link 640. The connection shaft 624 may be inserted into a shaft insertion hole 641H defined on the connection link 640 to be described later.

The connection shaft 624 may be provided to protrude from the connection shaft support 622. The connection shaft 624 may protrude to the left or right of the connection shaft support 622.

The connection shaft 624 may be provided in plurality. The plurality of connection shafts 624 may include a first connection shaft 624a protruding from the left side of the connection shaft support 622. The plurality of connection shafts 624 may include a second connection shaft 624b protruding from the right side of the connection shaft support 622.

The first connection shaft 624a may be inserted into a first shaft insertion hole 641Ha defined on the first connection link 640a. The second connection shaft 624b may be inserted into a second shaft insertion hole 641Hb defined on the second connection link 640*b*.

The connection shaft 624 may include a separation prevention protrusion 625. The separation prevention protrusion 625 may be configured to prevent the connection shaft 624 from being separated from the shaft insertion hole 641H.

The separation prevention protrusion 625 may protrude from an end of the connection shaft 624 toward a radial direction of the connection shaft 624.

In response to the connection shaft 624 being inserted into the shaft insertion hole 641H, the separation prevention protrusion 625 may be in contact with the connection link 640 so as to prevent the connection link 640 from being separated.

The lock 620 may include the connection shaft support 622. The connection shaft support 622 may be supported to move the water storage container 530 to the locked position.

While the water storage container 530 moves from the unlocked position to the locked position, the connection shaft support 622 may press the base housing 900 so as to move the water storage container 530.

The connection shaft support 622 may be provided to extend from the handle 621. The connection shaft support 622 may protrude from the handle 621. A distance from an end of the connection shaft support 622 to an end of the handle 621 may be greater than a distance from the handle 621 to the rotation shaft 623.

As described below, the connection shaft support 622 may push the base housing 900 so as to push the support plate 610. Accordingly, the water storage container 530 supported by the support plate 610 may be moved.

That is, as the handle 621 extends from one side of the rotation shaft 623, and the handle 621 is rotated with respect to the rotation shaft 623, the connection shaft support 622 may extend from the handle 622 to be moved from a first position to a second position.

The connection shaft support 622 may have a width corresponding to a width of the handle 621.

The connection shaft support 622 may have the shape of an extended column.

While the water storage container 530 moves from the unlocked position to the locked position, the connection shaft support 622 may be moved from the first position, in which the water storage container 530 and the water storage cover 510 are spaced by a first distance, to the second position, in which the water storage container 530 and the water storage cover 510 are spaced by a second distance less than the first direction.

The locking seat 600 may include the sub-lock 630. The sub-lock 630 may have a function corresponding to the function of the lock 620.

The sub-lock 630 may be coupled to a side, to which the lock 620 is not coupled, of the support plate 610. Accordingly, the support plate 610 may be moved while maintaining a level.

The sub-lock 630 may include a sub-lock body 631. The sub-lock body 631 may define an appearance of the sub-lock 630.

The sub-lock 630 may have a substantially rectangular parallelepiped shape.

The support plate 610 may include a first unit member 612*a* and a second unit member 612*b* arranged in parallel to the first unit member 612*a* with respect to a direction in which the water storage container 530 is received in the cover housings 12 and 13. For example, the first unit member 612*a* may be a front portion of the support plate 610, and the second unit member 612*b* may be a rear portion of the support plate 610.

The lock 620 may be coupled to the first unit member 612*a*.

The sub-lock 630 may be provided to correspond to the lock 620. While the connection shaft support 622 moves from the first position to the second position, the sub-lock 630 may be coupled to the second unit member 612*b* to allow the support plate 610 to be moved while maintaining a level.

The sub-lock 630 may include the sub-rotation shaft 633. The sub-rotation shaft 633 may be a component corresponding to a rotational center of the sub-lock 630.

The sub-rotation shaft 633 may be rotatably coupled to the support plate 610. The sub-rotation shaft 633 may be coupled to be the shaft coupler 630 of the support plate 610 while being received in the shaft coupling groove 640H.

The sub-rotation shaft 633 may be provided to protrude from the handle 621. The sub-rotation shaft 633 may protrude to the left or right of the handle 621.

The sub-rotation shaft 633 may be provided in plurality. The plurality of sub-rotation shafts 633 may include the first sub-rotation shaft 633*a* protruding from the left side of the handle 621. The plurality of sub-rotation shafts 633 may include the second sub-rotation shaft 633*b* protruding from the right side of the handle 621.

The first sub-rotation shaft 633*a* may be received in the first shaft coupling groove 640Ha. The second sub-rotation shaft 633*b* may be received in the second shaft coupling groove 640Hb.

The sub-lock 630 may include a sub-support 632. The sub-support 632 may be supported to move the water storage container 530 to the locked position.

The sub-support 632 may be provided to extend from the sub-lock body 631.

The sub-support 632 may protrude from the sub-lock body 631. A distance from an end of the sub-support 632 to an end of the sub-lock body 631 may be greater than a distance from the sub-lock body 631 to the sub-rotation shaft 633.

As will be described later, the sub-support 632 may push the support plate 610 by pushing the base housing 900. Accordingly, the water storage container 530 supported by the support plate 610 may be moved.

The sub-support 632 may have a width corresponding to a width of the sub-lock body 631.

The sub-support 632 may have the shape of an extended column.

The sub-lock 630 may include a sub-connection shaft 634. The sub-connection shaft 634 may be configured to be coupled to the connection link 640.

The sub-connection shaft 634 may be positioned to be spaced apart from the sub-rotation shaft 633. The sub-connection shaft 634 may be located below the sub-rotation shaft 633. However, it is not limited thereto.

The sub-connection shaft 634 may extend from one side of the sub-support 632. However, it is not limited thereto, and the sub-connection shaft 634 may extend from one side of the sub-lock 630.

The sub-connection shaft 634 may extend parallel to the direction in which the sub-rotation shaft 633 extends.

The sub-connection shaft 634 may be provided to correspond to the sub-rotation shaft 633.

The sub-connection shaft 634 may be rotatably coupled to the connection link 640. The sub-connection shaft 634 may be inserted into a sub-shaft insertion hole 641H defined on the connection link 640 to be described later.

The sub-connection shaft 634 may be provided to protrude from the sub-support 632. The sub-connection shaft 634 may protrude to the left or right of the sub support 632.

The sub-connection shaft 634 may be provided in plurality. The plurality of sub-connection shafts 634 may include a first sub-connection shaft 634*a* protruding from the left side of the sub-support 632. The plurality of sub-connection shafts 634 may include a second sub-connection shaft 634*b* protruding from the right side of the sub-support 632.

The first sub-connection shaft 634*a* may be inserted into a first sub-shaft insertion hole 642Ha defined on the first connection link 640*a*. The second sub-connection shaft 634*b* may be inserted into a second sub-shaft insertion hole 642Hb defined on the second connection link 640*b*.

The sub-connection shaft 634 may include the separation prevention protrusion 625. The separation prevention protrusion 625 may be configured to prevent the sub-connection shaft 634 from being separated from the sub-shaft insertion hole 641H.

The separation prevention protrusion 625 may protrude from an end of the sub-connection shaft 634 toward a radial direction of the sub-connection shaft 634.

In response to the sub-connection shaft 634 being inserted into the sub-shaft insertion hole 641H, the separation prevention protrusion 625 may be in contact with the connection link 640 so as to prevent the connection link 640 from being separated.

The locking seat 600 may include the connection link 640. The connection link 640 may be a configuration capable of interlocking the movement of the lock 620 and the sub-lock 630.

The connection link 640 may connect the lock 620 and the sub-lock 630. The connection link 640 may allow the sub-lock 630 to move according to the movement of the lock 620.

The connection link 640 may be rotatably coupled to the lock 620 and the sub-lock 630. The connection link 640 may be rotatably coupled to the connection shaft 624. The connection link 640 may be rotated with respect to the connection shaft 624. The connection link 640 may be rotatably coupled to the sub-connection shaft 634. The connection link 640 may be rotated with respect to the sub-connection shaft 634.

The connection link 640 may be provided to be received in the link receiving groove 660H.

When the lock 620 is rotated, the connection link 640 may move the sub-connection shaft 634 of the sub-lock 630 so as to allow the sub-lock 630 to be moved according the movement of the lock 620. When the water storage container 530 moves from the locked position to the unlocked position, the lock 620 may be rotated downward. When the lock 620 is rotated downward, the connection link 640 may be moved backward to move the sub-lock 630. Because the connection link 640 moves according to the movement of the lock 620, it is required to reduce the frictional force that limits the movement of the connection link 640.

The connection link 640 may have a bar shape.

At least one groove may be provided on the connection link 640 to save material costs.

The connection link 640 may be rotatably coupled to the lock 620 and the sub-lock 630 so as to allow the lock 620 and the sub-lock 630 to be moved in conjunction with each other.

The shaft insertion hole 641H may be defined to allow the connection shaft 624 to be inserted into the end of the connection link 640.

The shaft insertion hole 641H may be defined to correspond to the connection shaft 624.

The connection link 640 may include a plastic material. The connection link 640 may be formed by injection molding. However, it is not limited thereto.

The connection link 640 may be provided in plurality. The plurality of connection links 640 may include the first connection link 640*a*. The first connection link 640*a* may be rotatably coupled to the first connection shaft 624*a* and the first sub-connection shaft 634*a*.

The plurality of connection links 640 may include the second connection link 640*b*. The second connection link 640*b* may be rotatably coupled to the second connection shaft 624*b* and the second sub connection shaft 634*b*.

The first connection link 640*a* and the second connection link 640*b* may support the left and right sides of the lock 620 and the sub-lock 630, respectively. As a result, the lock 620 and the sub-lock 630 may be stably connected.

Figure 18:
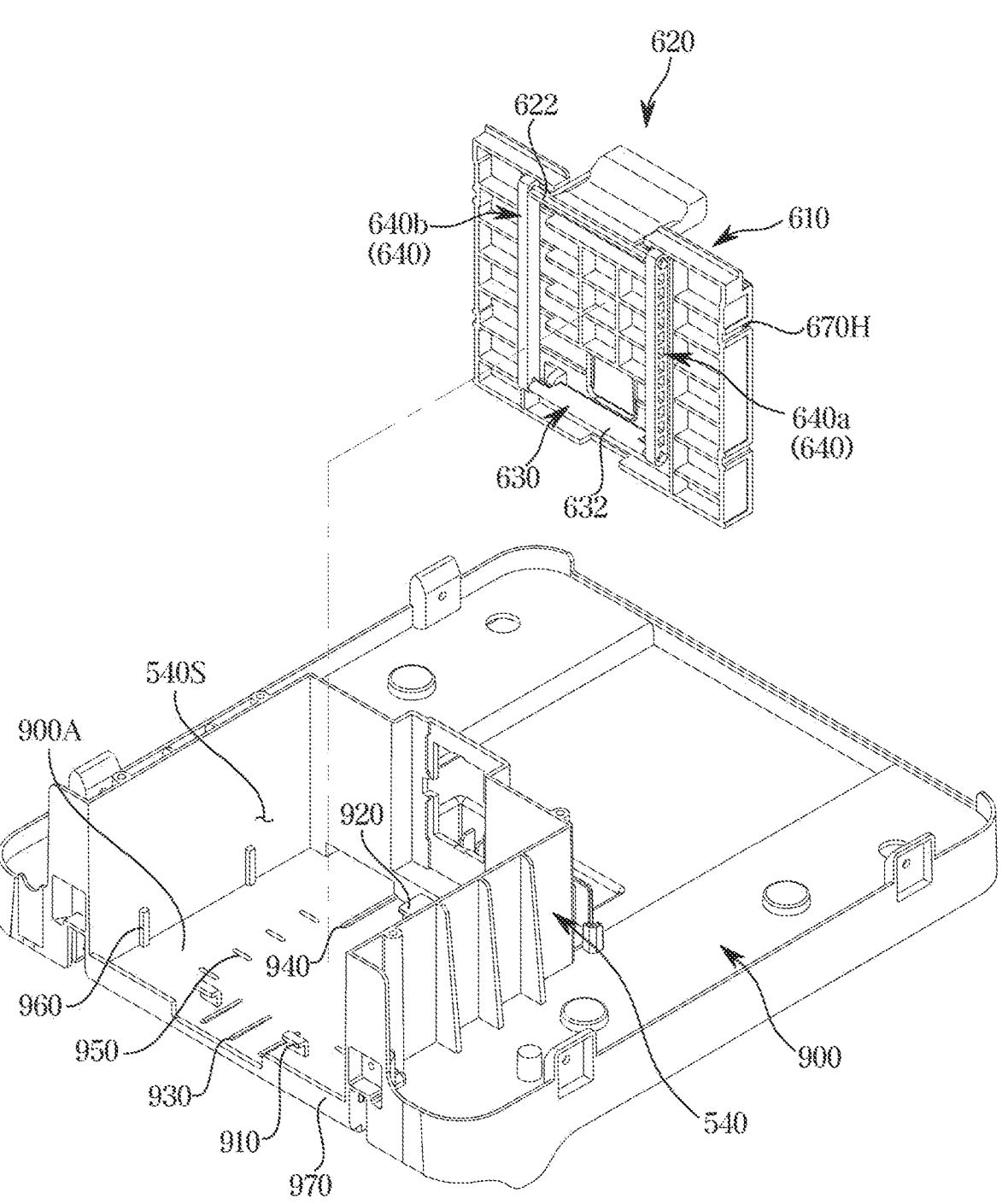
FIG. 18 is an exploded-view illustrating the locking seat of the food waste disposer shown in FIG. 16 and a water storage housing and a base housing to which the locking seat is coupled.
Figure 19:
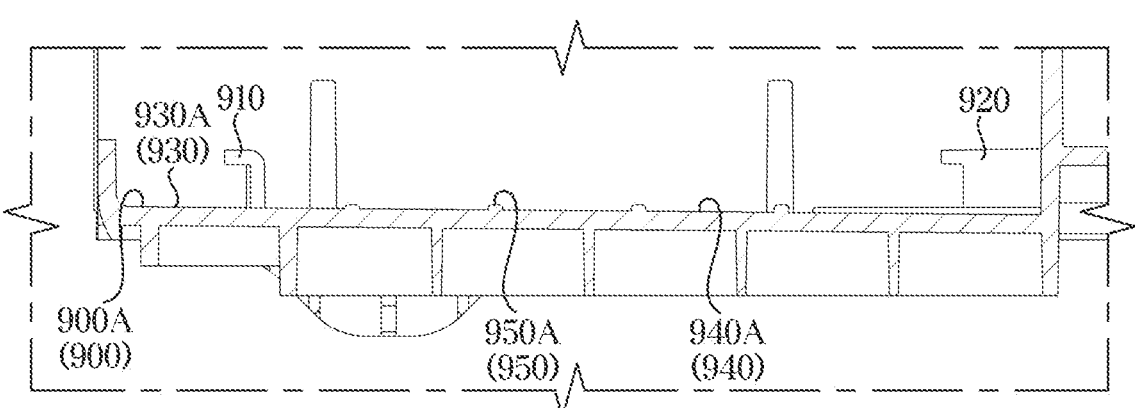
FIG. 19 is an exploded-view of the water storage housing and the base housing shown in FIG. 18 taken along line M-M'.

FIG. 18 is an exploded view illustrating the locking seat 600 of the food waste disposer 1 shown in FIG. 16 and the water storage housing 540 and the base housing 900 to which the locking seat is coupled. FIG. 19 is an exploded view of the water storage housing 540 and the base housing 900 shown in FIG. 18 taken along line M-M'.

Interactions between the locking seat 600, the water storage housing 540, and the base housing 900 according to an embodiment of the disclosure will be described with reference to FIGS. 18 and 19.

The base housing 900 may include a base surface 900A defining the water storage space 530S. The base surface 900A may be an upper surface of the base housing 900.

The base face 900A may be inclined toward one side of the base housing 900. The base surface 900A may be inclined downward toward the front. Accordingly, condensed water leaking from the water storage container 530 may be collected on one side of the base housing 900.

A water leak sensor (not shown) may be arranged on one side of the base housing 900.

The water leak sensor may be in contact the condensed water collected along the slope of the base surface 900A of the base housing 900, so as to output a signal regarding the presence or absence of the water leakage of the water storage container 530.

The base housing 900 may include a friction rib 950. The friction rib 950 may be provided to be in contact with the connection link 640.

The friction rib 950 may protrude toward the locking seat 600 to reduce the frictional force generated between the locking seat 600 and the base housing 900.

The friction rib 950 may protrude from the base surface 900A toward the support plate 610.

The friction rib 950 may protrude toward the connection link 640. The friction rib 950 may be in contact with the connection link 640. Accordingly, instead of being in contact with the base surface 900A, the connection link 640 may be in contact with the friction rib 950. Therefore, a small amount of frictional force may be applied to the connection link 640.

In order for the sub-lock 630 to be moved according to the movement of the lock 620, it is required to move the connection link 640. While the connection link 640 moves, the connection link 640 may be in contact with the friction rib 950 and smoothly moved.

The friction rib 950 may be positioned to correspond to the connection link 640.

The friction rib 950 may be provided to extend in the left and right direction.

The friction rib 950 may be provided in plurality. The plurality of friction ribs 950 may be arranged in a row along the connection link 640. The plurality of friction ribs 950 may be arranged in the front and rear direction. Accordingly, the friction rib 950 may support the connection link 640 without shaking.

The plurality of friction ribs 950 may form two rows to correspond to the first connection link 640*a* and the second connection link 640*b*.

The plurality of friction ribs 950 arranged in a row may have a height to correct an inclination of the base surface 900A.

When the base surface 900A is inclined downward toward the front, each of the plurality of friction ribs 950 may be provided to increase in height toward the rear side. The plurality of friction ribs 950 may have a height in such a way that a rib friction surface 950A, which is a surface of the friction rib 950 facing the connection link 640, is positioned on a plane parallel to the ground.

The base housing 900 may include a lock support rib 930. The lock support rib 930 may support the lock 620.

The lock support rib 930 may be in contact with the lock 620 in response to the connection shaft support 622 being in the first position. When the connection shaft support 622 moves from the first position to the second position, the lock support rib 930 may extend in the direction, in which the connection shaft support 622 moves, to allow a vibration to be generated as the lock support rib 930 is separated from the lock 620.

The lock support rib 930 may protrude toward the support plate 610 from the base surface 900A.

The lock support rib 930 may protrude toward the lock 620. The lock support rib 930 may be in contact with the lock 620. Accordingly, the lock 620 may be in contact with the lock support rib 930 instead of being in contact with the base surface 900A. Therefore, a small amount of frictional force may be applied on the lock 620.

In order to move the water storage container 530 by moving the support plate 610, the lock 620 may be rotated while being in contact with the base housing 900. The connection shaft support 622 of the lock 620 may be in contact with the lock support rib 930 while the lock 620 is rotated. While the connection shaft support 622 moves, the connection shaft support 622 may be smoothly rotated as being in contact with the lock support rib 930.

The lock support rib 930 may be positioned to correspond to the lock 620.

The lock support rib 930 may be provided to extend in the front and rear direction.

When the water storage container 530 is in the locked position, the lock support rib 930 may extend to prevent contact with the connection shaft support 622 of the lock 620. While the water storage container 530 moves from the unlocked position to the locked position, the connection shaft support 622 may be moved as being in contact with the lock support rib 930, and when the water storage container 530 is located in the locked position, the connection shaft support 622 may be moved to be in contact with the surface of the base housing 900 in the lock support rib 930. Accordingly, sound or vibration may occur in the lock 620. Due to the sound or vibration, a user can identify that the water storage container 530 is in the locked position. This may be equally applied to a sub-lock support rib 940.

The lock support rib 930 may be provided in plurality. The plurality of lock support ribs 930 may be arranged in a row along the lock 620. The plurality of lock support ribs 930 may be arranged in the left and right direction. A direction in which the plurality of lock support ribs 930 is arranged may cross a direction in which the plurality of friction ribs 950 is arranged.

The lock support rib 930 may have a height to correct the inclination of the base surface 900A.

When the base surface 900A is inclined downward toward the front, the lock support rib 930 may be provided to increase in height toward the rear side. The height of the lock support rib 930 may be set in such a way that a surface facing the lock 620 is positioned on a plane parallel to the ground.

The lock support rib 930 may include a rib support surface 930A facing the lock 620.

The base housing 900 may include the sub lock support rib 940. The sub-lock support rib 940 may be provided to support the sub-lock 630.

The sub lock support rib 940 may protrude toward the support plate 610 from the base surface 900A.

The sub-lock support rib 940 may protrude toward the sub-lock 630. The sub-lock support rib 940 may be in contact with the sub-lock 630. Accordingly, the sub-lock 630 may be in contact with the friction rib 950 instead of the base surface 900A. Therefore, a small amount of frictional force may be applied to the sub-lock 630.

In order to move the water storage container 530 by moving the support plate 610, the sub-lock 630 may be rotated while being in contact with the base housing 900. The connection shaft support 622 of the sub-lock 630 may be in contact with the sub-lock support rib 940 while the sub-lock 630 is rotated. While the connection shaft support 622 moves, the sub-lock 630 may be smoothly rotated as being in contact with the sub-lock support rib 940.

The sub-lock support rib 940 may be positioned to correspond to the sub-lock 630.

The sub-lock support rib 940 may be provided to extend in the front and rear direction.

The sub-lock support rib 940 may be provided in plurality. The plurality of sub-lock support ribs 940 may be arranged in a row along the sub-lock 630. The plurality of sub-lock support ribs 940 may be arranged in the left and right direction. A direction in which the plurality of sub-lock support ribs 940 is arranged may cross a direction in which the plurality of friction ribs 950 is arranged.

The sub-lock support rib 940 may have a height to correct the inclination of the base surface 900A.

When the base surface 900A is inclined downward toward the front, the sub-lock support rib 940 may be provided to increase in height toward the rear side. The height of the sub-lock support rib 940 may be set in such a way that a surface facing the sub-lock 630 is positioned on a plane parallel to the ground.

The sub-lock support rib 940 may include a sub-rib support surface 940A facing the sub-lock 630.

The base housing 900 may include a lock contact member 910. The lock contact member 910 may be provided to be in contact with the lock 620.

While the water storage container 530 moves from the locked position to the unlocked position, the lock contact member 910 may support the connection shaft support 622 to allow the support plate 610 to be moved toward the base housing 900.

The lock contact member 910 may be in contact with the connection shaft support 622 of the lock 620.

The lock contact member 910 may be located at a position corresponding to the connection shaft support 622. The lock contact member 910 may be provided to receive the connection shaft support 622.

The lock contact member 910 may be provided to protrude toward the lock 620 from the surface of the base housing 900.

The lock contact member 910 may have a hook shape. The lock contact member 910 may have a hook shape bent rearward. Accordingly, the lock contact member 910 may come into contact with the connection shaft support 622 from the inside.

As described later, while the water storage container 530 moves from the locked position to the unlocked position, the lock contact member 910 may support the connection shaft support 622 to allow the support plate 610 to be moved downward.

The lock contact member 910 may be provided in plurality. The plurality of lock contact members 910 may be provided to support the left and right sides of the lock 620 to allow the lock 620 to be stably supported.

The base housing 900 may include a sub-lock contact member 920. The sub-lock contact member 920 may be provided to be in contact with the sub-lock 630.

The sub-lock contact member 920 may be in contact with the sub-support 632 of the sub-lock 630.

The sub-lock contact member 920 may be located at a position corresponding to the sub-support 632. The sub-lock contact member 920 may be provided to receive the sub-support 632.

The sub-lock contact member 920 may be provided to protrude toward the sub-lock 630 from the surface of the base housing 900.

The sub-lock contact member 920 may have a shape extending backward to support the sub-support 632. The sub-support 632 may be in contact with the lower side of the shape of the sub-lock contact member 920 that extends backward.

As described later, while the water storage container 530 moves from the locked position to the unlocked position, the sub-lock contact member 920 may support the sub-support 632 to allow the support plate 610 to be moved downward.

The sub-lock contact member 920 may extend left and right. Accordingly, the sub-lock contact member 920 may simultaneously support the left and right sides of the sub-lock 630, and thus the sub-lock 630 may be stably supported.

The base housing 900 may include a base guide rib 960. The base guide rib 960 may be received in a base guide rib groove 670H of the support plate 610.

While the water storage container 530 moves from the unlocked position to the locked position, the base guide rib 960 may extend in a direction toward the water storage cover 510 and be inserted into the support plate 610, thereby guiding the support plate 610.

The base guide rib 960 may be provided at a position corresponding to the base guide rib groove 670H.

The base guide rib 960 may be provided to slide in the base guide rib groove 670H. The base guide rib 960 may be vertically received in the base guide rib groove 670H.

The base guide rib 960 may extend in the vertical direction. The base guide rib 960 may extend in the locking direction D3. The base guide rib 960 may extend upward from the base surface 900A.

The base guide rib 960 may be provided to protrude into the receiving space 540S.

As the base guide rib 960 is received in the base guide rib groove 670H and moved in the locking direction D3 or the unlocking direction D4, the movement of the support plate 610 in the locking direction D3 or the unlocking direction D4 may be guided.

The lock 620 may be rotated and move the support plate 610. As the lock 620 is rotated, the connection shaft support 622 of the lock 620 may push the base housing 900 and move the support plate 610. The connection shaft support 622 may not press the support plate 610 only in the locking direction D3. Therefore, a structure for guiding the movement of the support plate 610 may be required.

That is, the base guide rib 960 may guide the movement of the support plate 610. In addition, the base guide rib 960 may function to guide the coupling position of the support plate 610 to allow the support plate 610 to be positioned at a predetermined position.

The base guide rib 960 may be provided in plurality. The plurality of base guide ribs 960 may be provided at positions corresponding to both sides of the support plate 610. The plurality of base guide ribs 960 may be provided at corresponding positions on the front and rear sides of the support plate 610, respectively. Accordingly, the support plate 610 may be stably moved.

The base housing 900 may include a plate stepped member 970. The plate stepped member 970 may be configured to limit movement of the support plate 610 in the front and rear direction.

The plate stepped member 970 may be positioned adjacent to the receiving opening 540A.

The plate stepped member 970 may be located behind the support plate 610.

Accordingly, it is possible to prevent the plate stepped member 970 from moving in the separating direction D2. As described later, the water storage container 530 may slide in the separating direction D2 with respect to the support plate 610. In this case, it is required to fix the support plate 610 to sperate only the water storage container 530.

The support plate 610 may extend upward.

Figure 20:
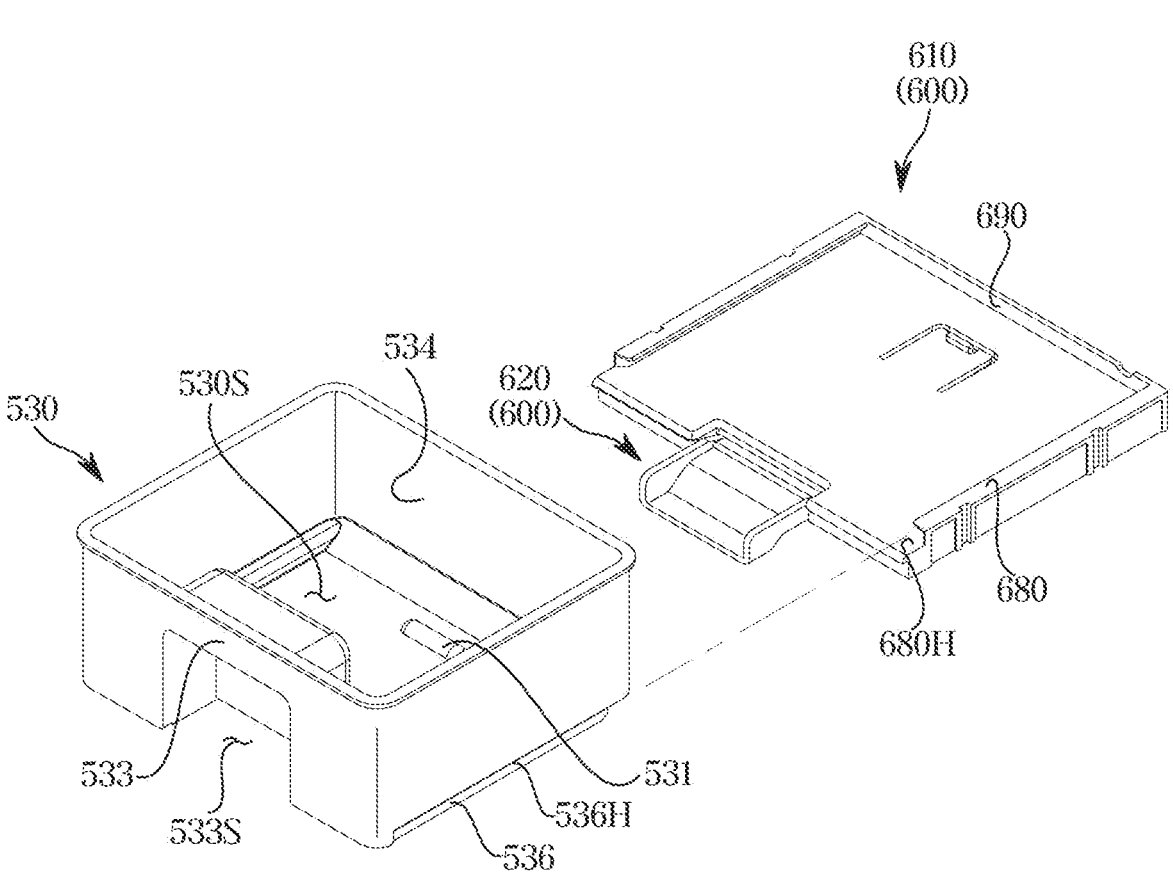
FIG. 20 is an exploded-view illustrating the locking seat of the food waste disposer shown in FIG. 16 and the water storage container provided to be coupled to the locking seat.

FIG. 20 is an exploded view illustrating the locking seat 600 of the food waste disposer 1 shown in FIG. 16 and the water storage container 530 coupled to the locking seat 600.

An interaction between the water storage container 530 and the support plate 610 according to an embodiment of the disclosure will be described with reference to FIG. 20.

The water storage container 530 may be moved relative to the support plate 610. The water storage container 530 may slide in the receiving direction D1 or the separating direction D2 with respect to the support plate 610.

A rail groove 536H may be defined on the left or right side of the water storage container 530. The rail groove 536H may be defined to be recessed from the left or right side of the water storage container 530 toward the water storage space 530S.

The rail groove 536H may extend in the receiving direction D1 or the separating direction D2.

The support plate 610 may include a rail member 680 insertable into the rail groove 536H provided on the water storage container 530.

The rail member 680 may be located on the left or right side of the support plate 610. The rail member 680 may be provided to protrude inward from the left or right side of the support plate 610.

The rail member 680 may have a shape that is received in the rail groove 536H. The rail member 680 may extend in the receiving direction D1 or the separating direction D2.

The rail member 680 may protrude in the locking direction D3 from the surface of the support plate 610 facing the water storage container 530.

An end of the rail member 680 may be bent toward the inside of the support plate 610 while defining an insertion receiving groove 680H on the lower side.

The water storage container 530 may include a rail insertion member 536 arranged below the rail groove 536H to be received in the insertion receiving groove 680H.

The rail insertion member 536 may protrude toward the outside of the water storage container 530.

When the support plate 610 moves in the locking direction D3 or the unlocking direction D4, the rail may allow the water storage container 530 to be moved together with the support plate 610, and when the water storage container 530 moves in the receiving direction D1 or the separating direction D2, the rail may allow the water storage container 530 to be moved, but the support plate 610 to be restricted in movement.

The support plate 610 may include a plate counter wall 690. The plate counter wall 690 may prevent the water storage container 530 from being moved further in the receiving direction D1 from the receiving position.

The plate counter wall 690 may be provided to extend in the locking direction D3 from a surface, which faces the water storage container 530, of the support plate 610. The plate counter wall 690 may extend upwardly from the front end of the support plate 610.

The plate counter wall 690 may be provided to face the counter container wall 534 of the water storage container 530. As the plate counter wall 690 is in contact with the counter container wall 534 of the water storage container 530, the plate counter wall 690 may limit the movement of the water storage container 530.

Hereinafter the movement of the water storage container 530 to the locked position or the unlocked position will be described.

Figure 21:
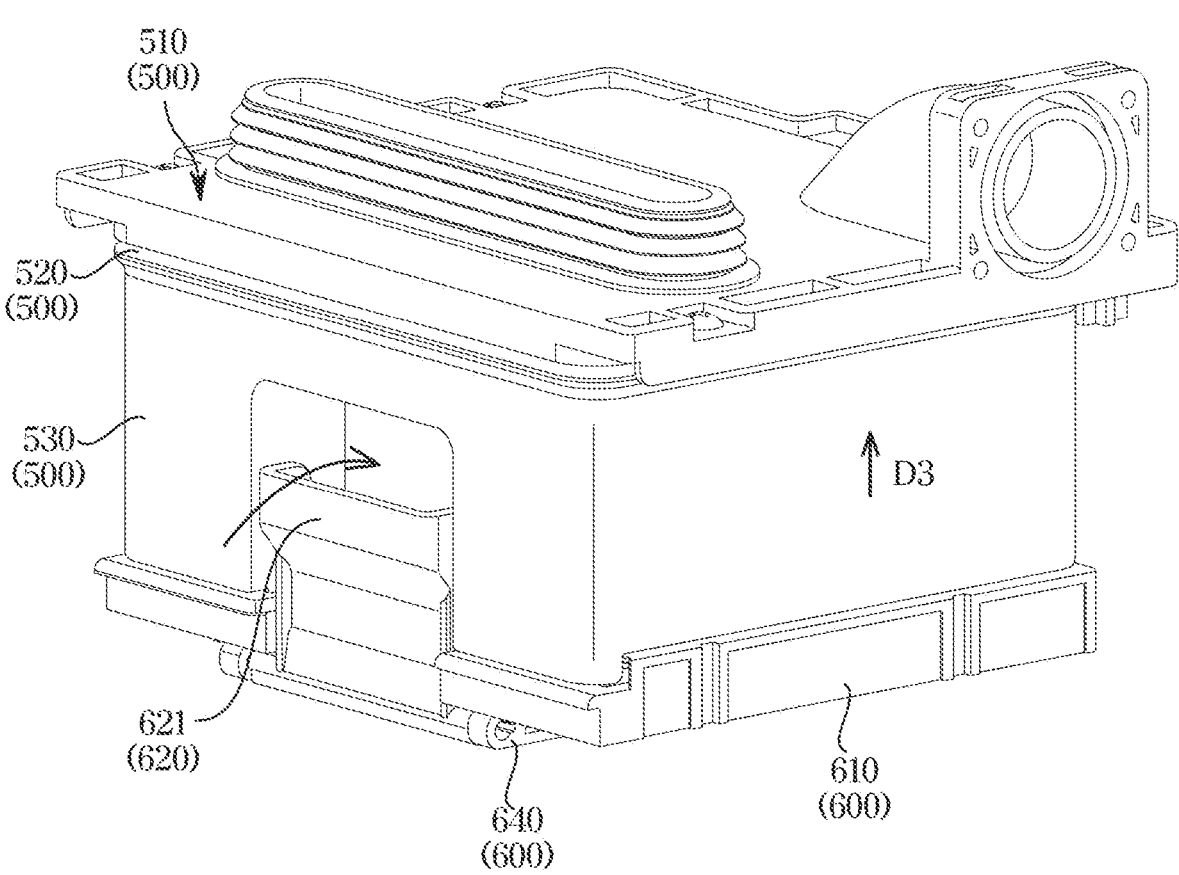
FIG. 21 is a perspective view illustrating a state in which the water storage container of the food waste disposer shown in FIG. 16 is in a locked position.
Figure 22:
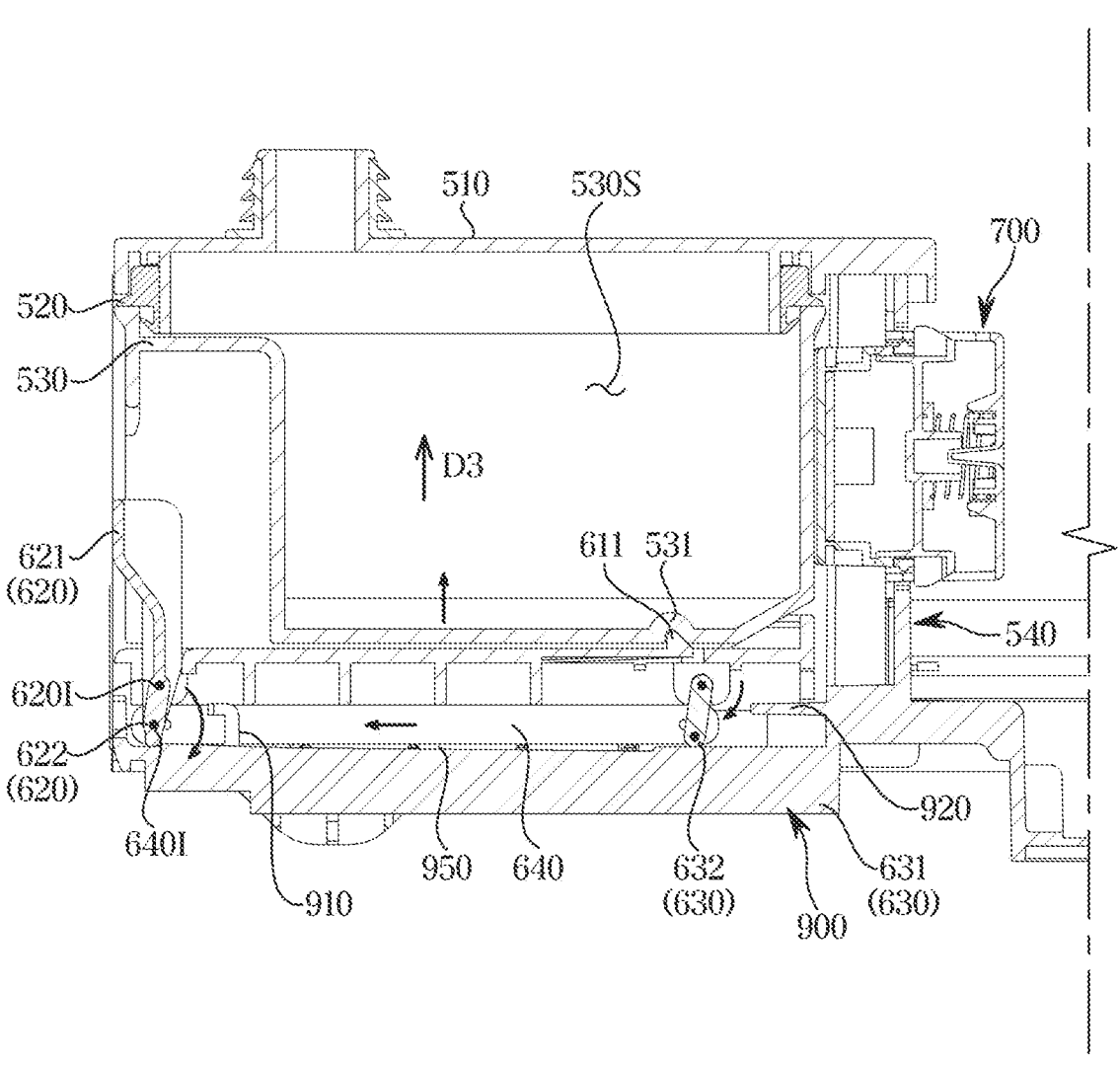
FIG. 22 is a cross-sectional view illustrating the state in which the water storage container of the food waste disposer shown in FIG. 16 is in the locked position.

FIG. 21 is a perspective view illustrating a state in which the water storage container 530 of the food waste disposer 1 shown in FIG. 16 is in the locked position. FIG. 22 is a cross-sectional view illustrating the state in which the water storage container 530 of the food waste disposer 1 shown in FIG. 16 is in the locked position.

The movement of the water storage container 530 from the unlocked position to the locked position according to an embodiment of the disclosure will be described with reference to FIGS. 21 and 22.

The lock 620 may be rotated upward to move the water storage container 530 from the unlocked position to the locked position. When the lock 620 is rotated, the lock 620 may be rotated around the lock rotation axis 6201. The lock rotation axis 6201 may be positioned along the direction in which the rotation shaft 623 extends.

The handle 621 may extend from one side of the rotation shaft 623. The connection shaft support 622 may extend from the other side of the rotation shaft 623. When a user rotates the handle 621 upward, the connection shaft support 622 may be rotated downward.

For a clearer description, this will be described with reference to FIG. 22.

As shown in FIG. 22, the lock 620 may be rotated clockwise. Accordingly, an end of the connection shaft support 622 may press the base housing 900.

In the unlocked position, a line connecting the end of the connection shaft support 622 and the lock rotation axis 6201 may be at a position approximately parallel to the ground. In the locked position, the line connecting the end of the connection shaft support 622 and the lock rotation axis 6201 may be at a position approximately perpendicular to the ground.

The connection shaft support 622 may extend from the rotation shaft 623, and thus a predetermined distance may occur from the lock rotation axis 6201 to the end of the connection shaft support 622. Accordingly, when the line connecting the end of the connection shaft support 622 and the rotation axis of the lock 620 is perpendicular to the ground, the lock rotation axis 6201 may be spaced apart from the base housing 900. This is because the end of the connection shaft support 622 is in contact with the base housing 900. When the end of the connection shaft support 622 is in contact with the base housing 900, the lock rotation axis 6201 may be moved toward the locking direction D3 by a predetermined distance because the end of the connection shaft support 622 and the lock rotation axis 6201 are spaced apart by the predetermined distance.

When the lock rotation axis 6201 moves in the locking direction D3, the support plate 610 coupled to the rotation shaft 623 may also be moved in the locking direction D3.

In this case, the movement of the support plate 610 to the locking direction D3 may be guided by the base guide rib 960.

The connection shaft support 622 may move the support plate 610 while pressing the base housing 900. Particularly, the connection shaft support 622 may move the support plate 610 while pressing the lock support rib 930.

As the connection shaft support 622 moves, the sub-support 632 of the sub-lock 630 may also be moved.

The sub-support 632 may move the support plate 610 while pressing the base housing 900. Particularly, the connection shaft support 622 may move the support plate 610 while pressing the sub-lock support rib 940.

As the connection shaft support 622 and the sub-support 632 are moved together, the support plate 610 may be moved while maintaining a level.

In order to allow the sub-support 632 to be moved according to the movement of the connection shaft support 622, the connection link 640 may be also moved. While the connection link 640 moves, the connection link 640 may press the base housing 900. Particularly, while the connection link 640 moves, the connection link 640 may press the friction rib 950. Accordingly, the support plate 610 may be moved stably.

Particularly, as the connection shaft support 622 moves, a part coupled to the lock 620 of the connection link 640 may be moved backward. Accordingly, the connection link 640 may be moved backward. While the connection link 640 moves backward, a portion of the sub-lock 630 connected to the connection link 640 may be moved backward.

The support plate 610 may be moved in the locking direction D3. As the support plate 610 moves, the water storage container 530 may be moved in the locking direction D3. The water storage container 530 may be pressed by the support plate 610 and moved in the locking direction D3.

While the water storage container 530 moves in the locking direction D3, the water storage container 530 may be moved toward the water storage cover 510.

When the water storage container 530 moves from the unlocked position to the locked position, the lock 620 may be moved downward from the lock support rib 930 and in contact with the surface of the water storage housing 540. Due to the step difference between the lock support rib 930 and the surface of the water storage housing 540, sound or vibration may occur. Accordingly, a user can confirm that the water storage container 530 is located in the locked position.

When the water storage container 530 is in the locked position, a gap between the water storage cover 510 and the gasket 520 may be sealed. Accordingly, condensed water may be prevented from leaking to the outside of the food waste disposer 1 through a gap between the water storage container 530 and the water storage cover 510.

When the water storage container 530 is in the locked position, the movement of the water storage container 530 may be limited by the gasket 520. The gasket 520 may limit the movement of the water storage container 530 in the separating direction D2. This is because the water storage container 530 and the gasket 520 are in contact with each other.

The movement of the water storage container 530 in the separating direction D2 may be limited by the lock 620. The lock 620 is located in the separating direction D2 rather than the water storage container 530, and thus when the water storage container 530 moves in the separating direction D2, the water storage container 530 may be in contact with the lock 620 and the movement of the water storage container 530 may be prevented.

As mentioned above, when the water storage container 530 is in the locked position, it is possible to prevent the water storage container 530 from being moved to the separating direction D2, and it is possible to prevent condensed water from leaking between the water storage container 530 and the water storage cover 510.

When the water storage container 530 is filled with condensed water above a predetermined water level, it is required to remove the condensed water, or to separate the water storage container 530 to clean the water storage container 530. Hereinafter the movement of the water storage container 530 from the locked position to the unlocked position will be described.

Figure 23:
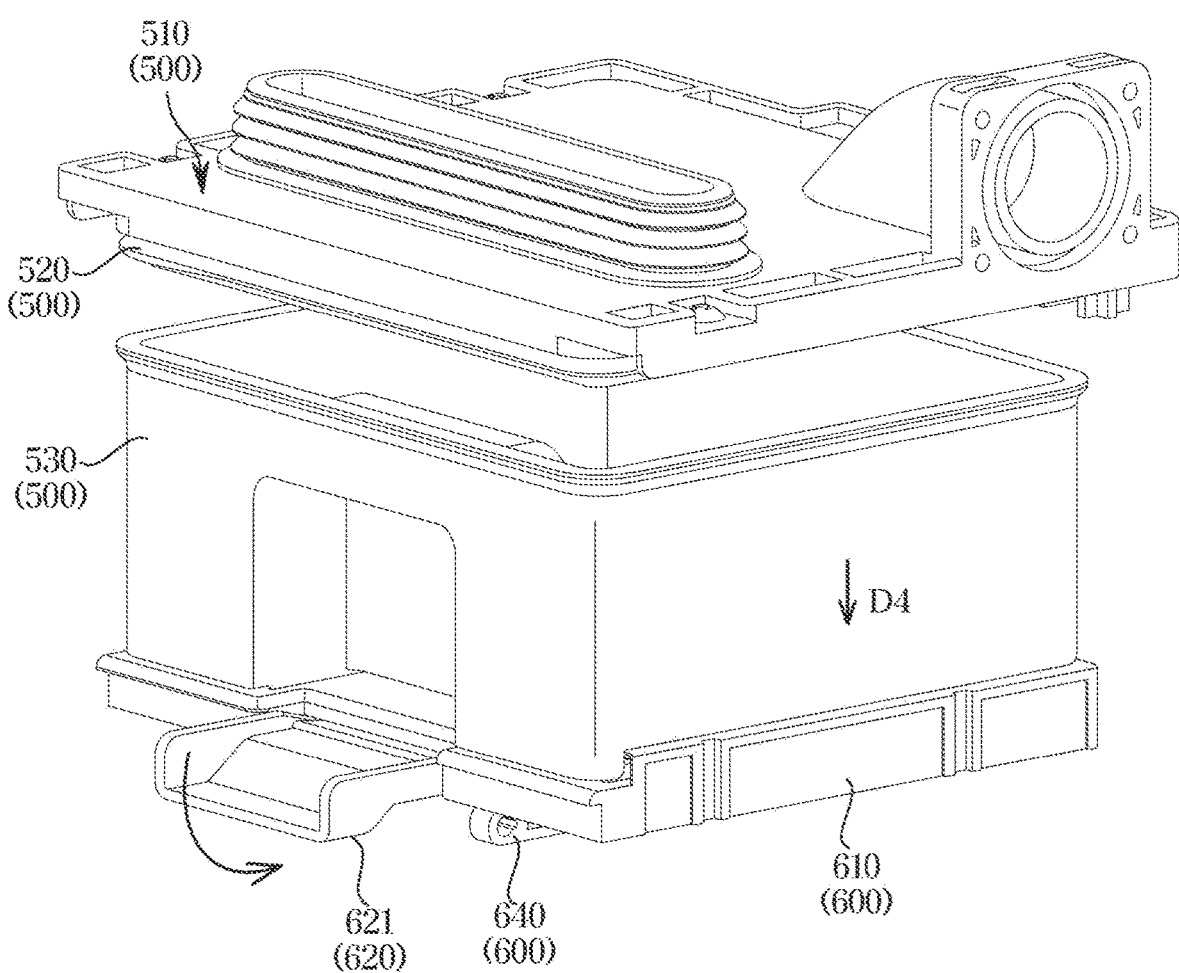
FIG. 23 is a perspective view illustrating a state in which the water storage container of the food waste disposer shown in FIG. 16 is in an unlocked position.
Figure 24:
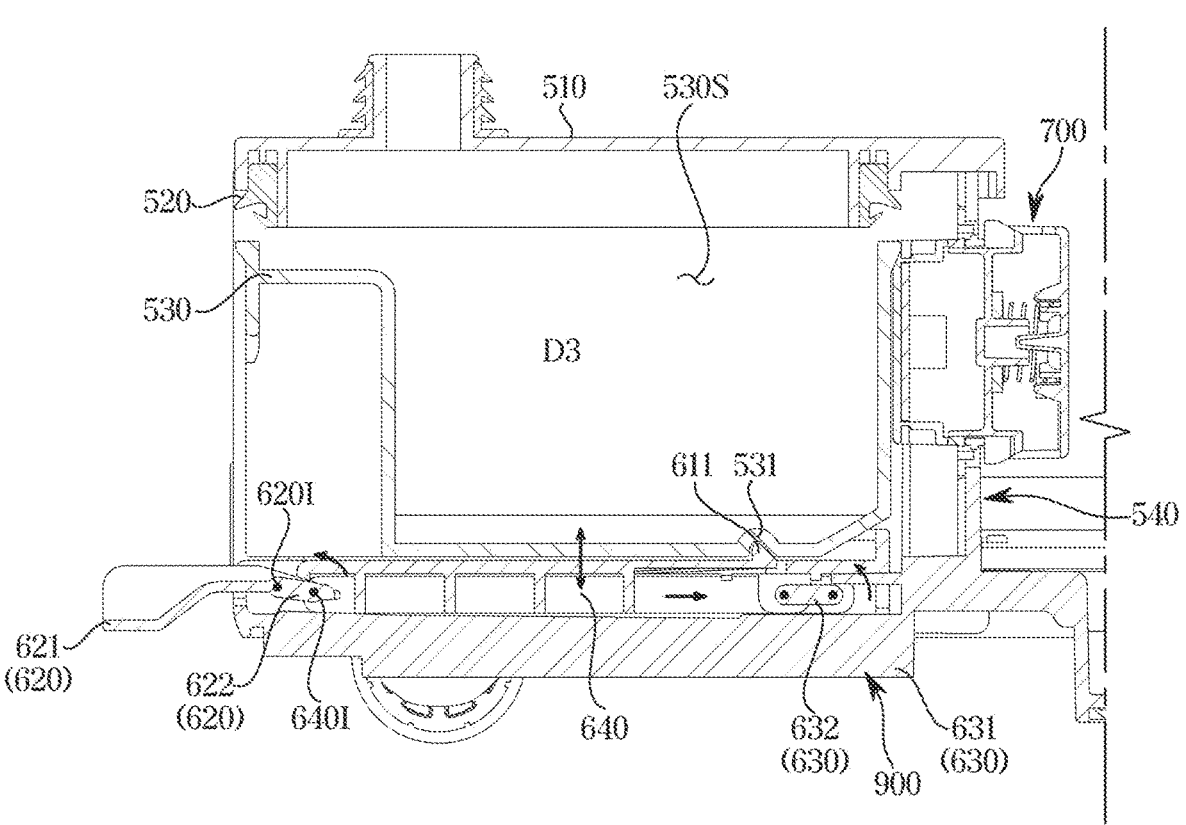
FIG. 24 is a cross-sectional view illustrating the water storage container of the food waste disposer shown in FIG. 21 is in the unlocked position.
Figure 25:
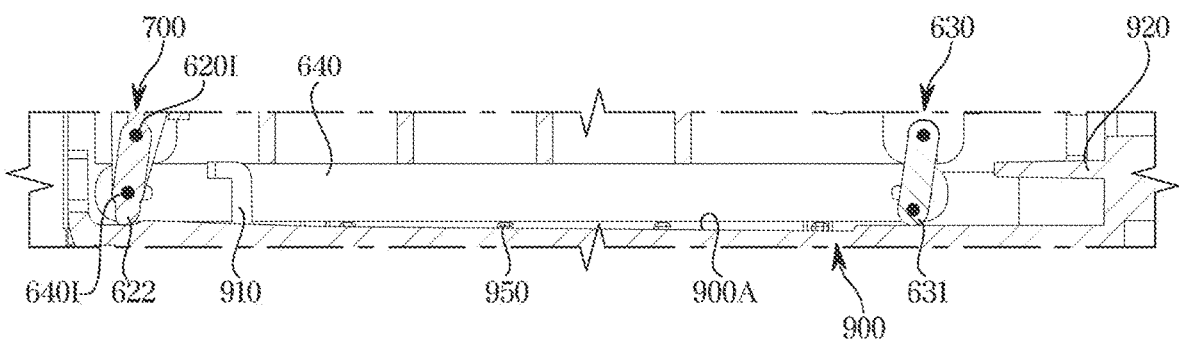
FIG. 25 is an enlarged cross-sectional view illustrating a state in which the water storage container of the food waste disposer shown in FIG. 24 moves from the locked position to the unlocked position.
Figure 26:
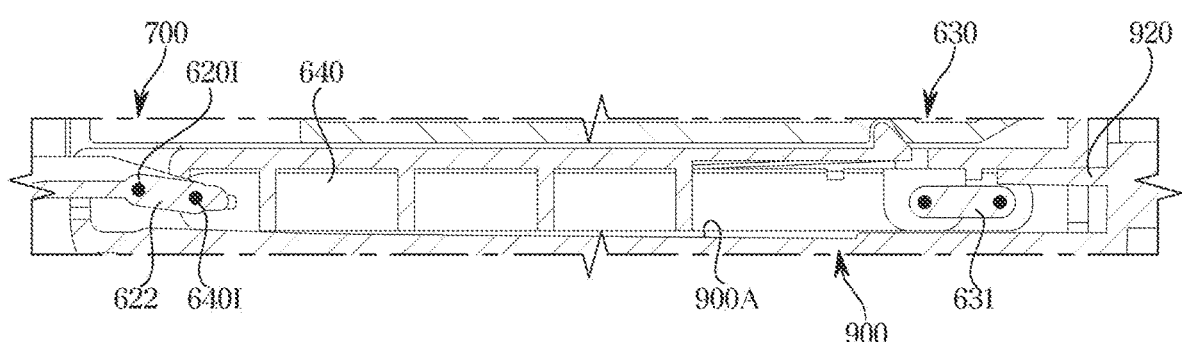
FIG. 26 is an enlarged cross-sectional view illustrating a state in which the water storage container of the food waste disposer shown in FIG. 25 is in the unlocked position.

FIG. 23 is a perspective view illustrating a state in which the water storage container 530 of the food waste disposer 1 shown in FIG. 16 is in the unlocked position. FIG. 24 is a cross-sectional view illustrating the water storage container 530 of the food waste disposer 1 shown in FIG. 21 is in the unlocked position. FIG. 25 is an enlarged cross-sectional view illustrating a state in which the water storage container 530 of the food waste disposer 1 shown in FIG. 24 moves from the locked position to the unlocked position. FIG. 26 is an enlarged cross-sectional view illustrating a state in which the water storage container 530 of the food waste disposer 1 shown in FIG. 25 is in the unlocked position.

The movement of the water storage container 530 from the locked position to the unlocked position according to an embodiment of the disclosure will be described with reference to FIGS. 23 to 26.

The lock 620 may be rotated downward to rotate the water storage container 530 from the locked position to the unlocked position.

When a user rotates the handle 621 downward, the connection shaft support 622 may be rotated downward.

For a clearer description, this will be described with reference to FIG. 24.

The lock 620 may be rotated counterclockwise, as illustrated in FIG. 24.

In the locked position, the line connecting the end of the connection shaft support 622 and the lock rotation axis 6201 may be at a position approximately perpendicular to the ground. In the unlocked position, the line connecting the end of the connection shaft support 622 and the lock rotation axis 6201 may be at a position approximately parallel to the ground.

While the line connecting the end of the connection shaft support 622 and the lock rotation axis 6201 is approximately parallel to the ground, the lock rotation axis 6201 may be close to the base housing 900.

When the lock rotation axis 6201 moves in the unlocking direction D4, the support plate 610 coupled to the rotation shaft 623 may be also moved in the unlocking direction D4.

In this case, the movement of the support plate 610 toward the unlocking direction D4 may be guided by the base guide rib 960.

Particularly, as shown in FIGS. 25 and 26, while the connection shaft support 622 presses the lock contact member 910, the connection shaft support 622 may move the support plate 610. More particularly, the connection shaft support 622 may move the support plate 610 while pressing the inside of the lock contact member 910.

Due to the load of the water storage container 530, the condensed water or the water storage container 530, the support plate 610 may descent only by the movement of the support 662 without a configuration pressed by the connection shaft support 622.

However, a negative pressure may be generated between the water storage container 530 and the gasket 520. The movement of the water storage container 530 may be limited by friction with the gasket 520. When the food waste disposer 1 is in operation, air may be moved to the filter assembly 150. Accordingly, the water storage container 530 may be pressed toward the water storage cover 510. In this case, a structure capable of moving the support plate 610 may be required.

As the connection shaft support 622 moves, the sub-support 632 of the sub-lock 630 may also be moved.

The sub-support 632 may move the support plate 610 while pressing the sub-lock contact member 920. Particularly, the sub-support 632 may move the support plate 610 while pressing the inside of the sub-lock contact member 920.

In order to allow the sub-support 632 to be moved according to the movement of the connection shaft support 622, the connection link 640 may be also moved. The connection link 640 may be moved forward.

The support plate 610 may be moved in the unlocking direction D4. As the support plate 610 moves, the water storage container 530 may be moved in the unlocking direction D4. The water storage container 530 may be pressed by the support plate 610, and moved in the unlocking direction D4.

While the water storage container 530 moves in the unlocking direction D4, the water storage container 530 may be moved toward a direction away from the water storage cover 510.

When the water storage container 530 is in the unlocked position, the water storage container 530 may be spaced apart from the gasket 520. The water storage container 530 may be movable in the separating direction D2.

Hereinafter a food waste disposer 1 according to another embodiment of the disclosure will be described. In describing embodiments, the same reference numerals may be given to the same components as those shown in FIGS. 1 to 26 and a description thereof may be omitted.

Embodiments described in this disclosure may be implemented together to the extent that the embodiments are not contrary to each other. Each of the embodiments may be implemented by combining with each other or changing some configurations.

Figure 27:
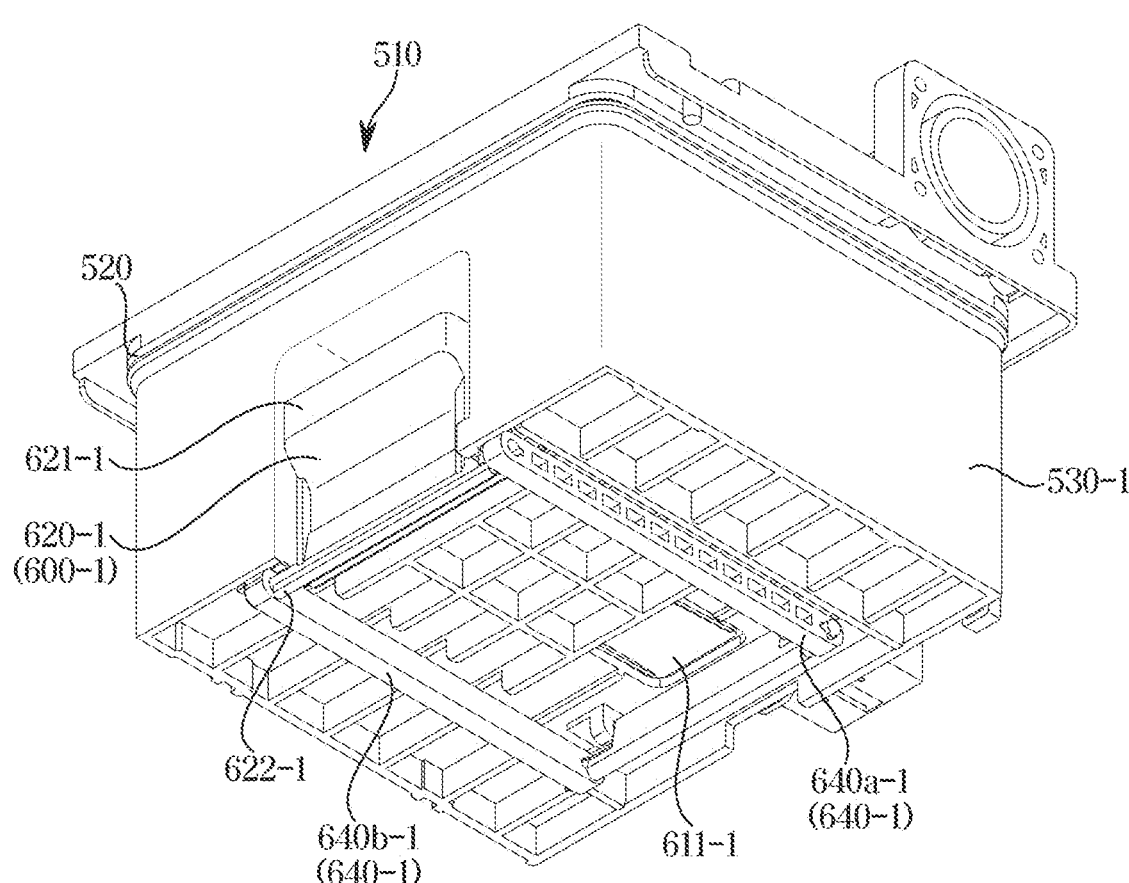
FIG. 27 is a perspective view illustrating a food waste disposer according to an embodiment of the disclosure.

FIG. 27 is a perspective view illustrating a food waste disposer 1-1 according to an embodiment of the disclosure.

A water storage container 530-1 and a support plate 610 according to an embodiment of the disclosure will be described with reference to FIG. 27.

According to an embodiment of the disclosure, the water storage container 530-1 and the support plate 610 may be integrally formed. The water storage container 530-1 and the support plate 610 may be provided as one configuration.

When the water storage container 530-1 moves in the separating direction D2 in a state in which the water storage container 530-1 and the support plate 610 are provided in one configuration, a locking seat 600-1 may be moved together in the separating direction D2.

The water storage container 530-1 and the locking seat 600-1 may be provided as one module.

Figure 28:
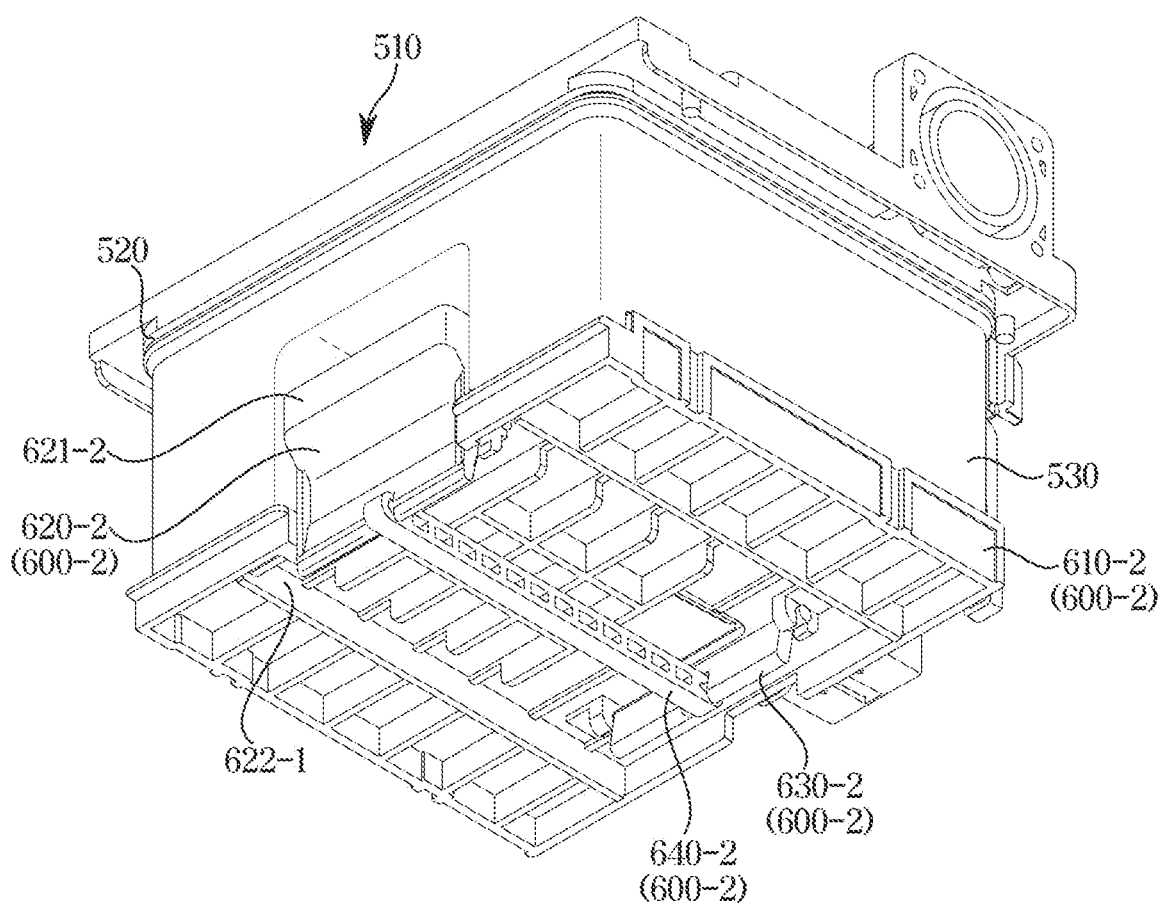
FIG. 28 is a perspective view illustrating a food waste disposer according to an embodiment of the disclosure.

FIG. 28 is a perspective view illustrating a food waste disposer 1-2 according to an embodiment of the disclosure.

A locking seat 600-2 according to an embodiment of the disclosure will be described with reference to FIG. 28.

Unlike the embodiment shown in FIGS. 1 to 26, the locking seat 600-2 may include a single connection link 640-2.

For stable movement, the connection link 640-2 may be located at a position corresponding to the center of symmetry of the lock 620-2 and the center of symmetry of the sub-lock 630-2.

Figure 29:
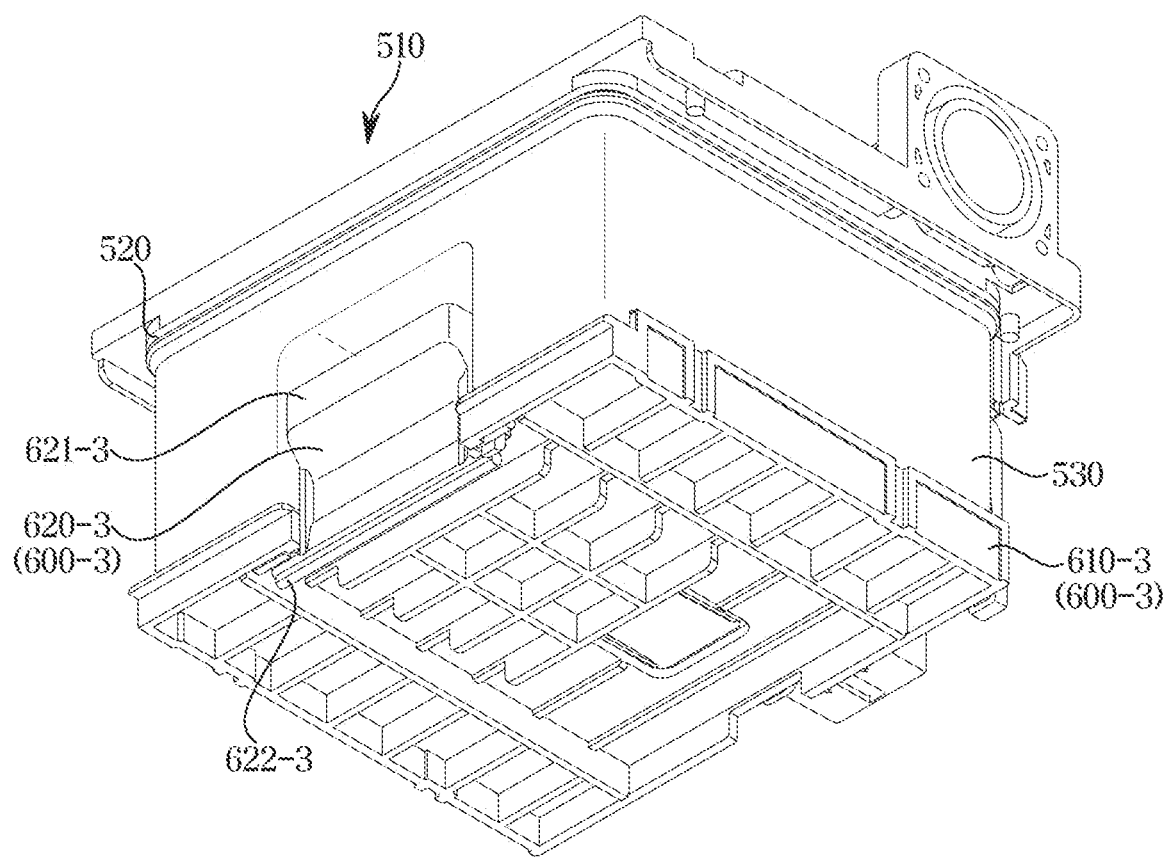
FIG. 29 is a perspective view illustrating a food waste disposer according to an embodiment of the disclosure.

FIG. 29 is a perspective view illustrating a food waste disposer 1-3 according to an embodiment of the disclosure.

A locking seat 600-3 according to an embodiment of the disclosure will be described with reference to FIG. 29.

The locking seat 600-3 may include a lock 620-3.

Unlike the embodiment shown in FIGS. 1 to 26, the locking seat 600-3 may not include the connection link 640 and the sub-lock 630.

A support plate 610-3 may be moved to the locking direction D3 by the lock 620-3.

Figure 30:
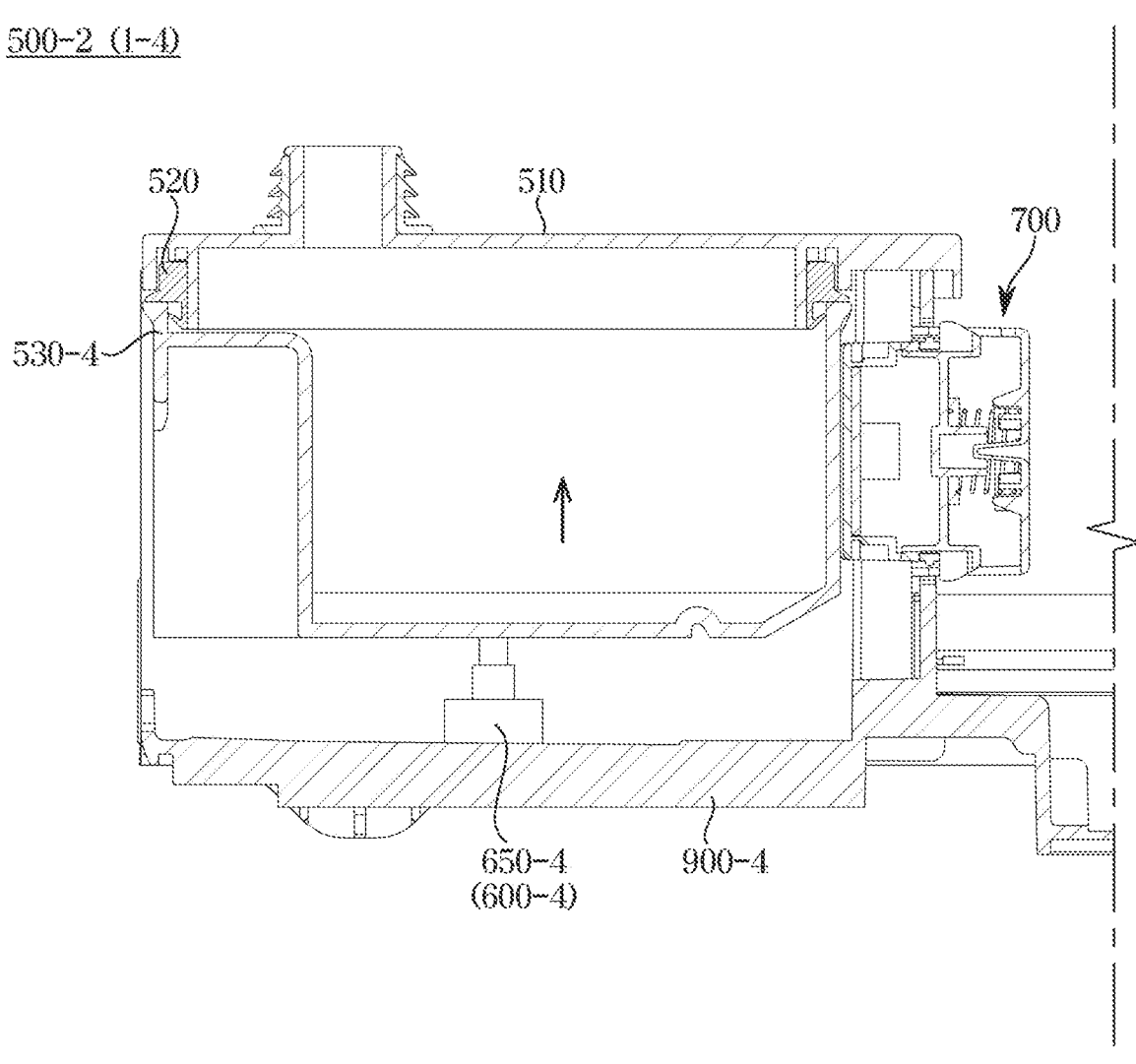
FIG. 30 is a cross-sectional view of a food waste disposer according to an embodiment of the disclosure.

FIG. 30 is a cross-sectional view of a food waste disposer 1-4 according to an embodiment of the disclosure.

A locking seat 600-4 according to an embodiment of the disclosure will be described with reference to FIG. 30.

The locking seat 600-4 may include a lifting device 650-4 configured to move the water storage container 530 toward the locking direction D3.

The lifting device 650-4 may move the water storage container 530 toward the water storage cover 510.

The lifting device 650-4 may include a motor (not shown).

The lifting device 650-4 may be positioned between the water storage container 530 and the base housing 900.

The lifting device 650-4 may move the water storage container 530 toward the locking direction D3.

The lifting device 650-4 may support the water storage container 530.

The lifting device 650-4 may move the water storage container 530 to the locked position or the unlocked position as a length of the lifting device 650-4 is changed.

Figure 31:
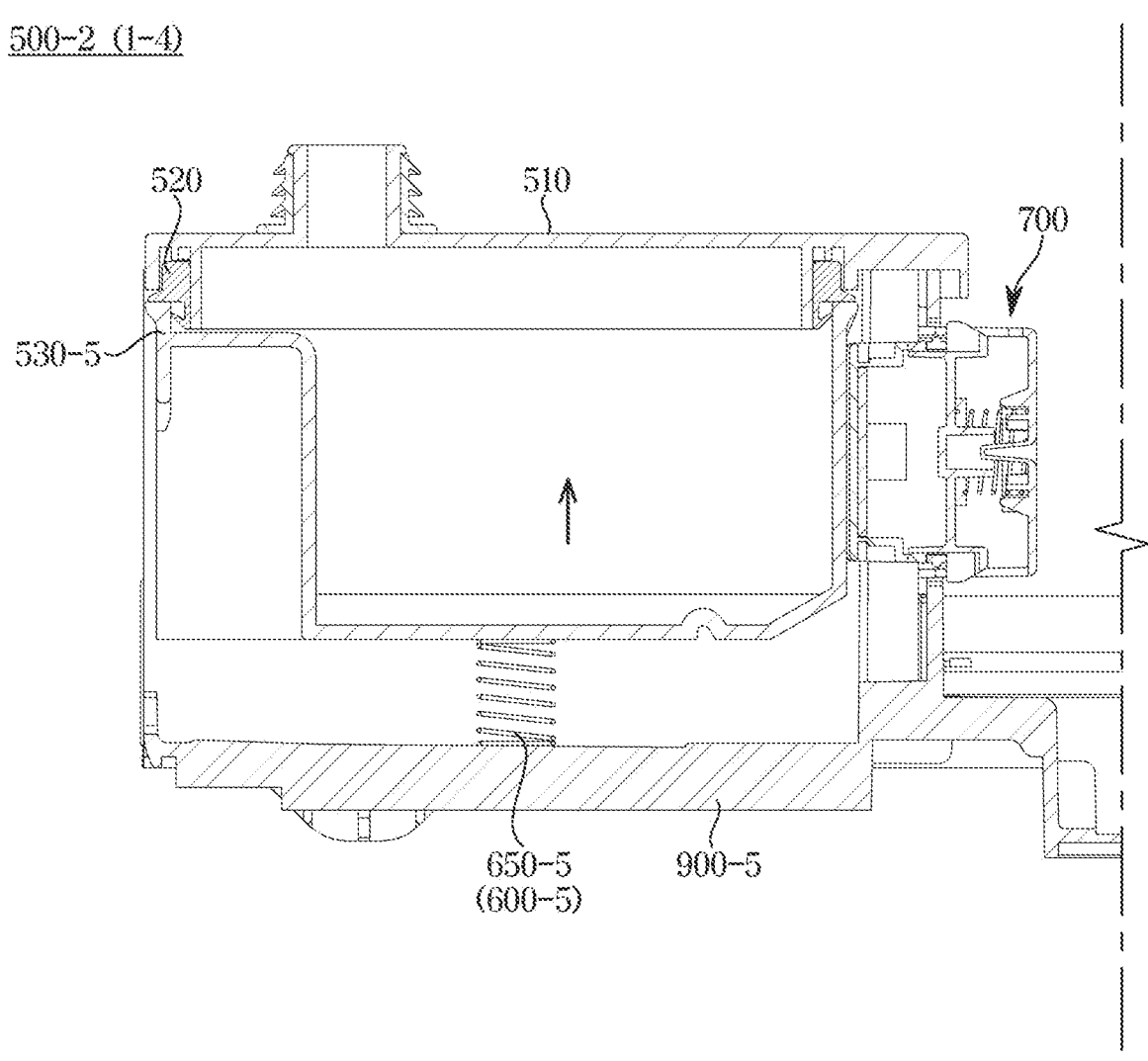
FIG. 31 is a cross-sectional view of a food waste disposer according to an embodiment of the disclosure.

FIG. 31 is a cross-sectional view of a food waste disposer 1-5 according to an embodiment of the disclosure.

A locking seat 600-5 according to an embodiment of the disclosure will be described with reference to FIG. 31.

The locking seat 600-5 may include an elastic body 660-5.

The elastic body 660-5 may be positioned between the water storage container 530 and the base housing 900.

The elastic body 660-5 may be provided by being compressed. The elastic body 660-5 may press the water storage container 530 and the base housing 900 toward an extension direction.

The elastic body 660-5 may elastically support the water storage container 530.

By the elastic body 660-5, the water storage container 530 may be positioned in the locked position in the receiving position.

When a user wants to move the water storage container 530 toward the separating direction D2, the user can separate the water storage container 530 by pressing the water storage container 530 toward the unlocking direction D4.

Figure 32:
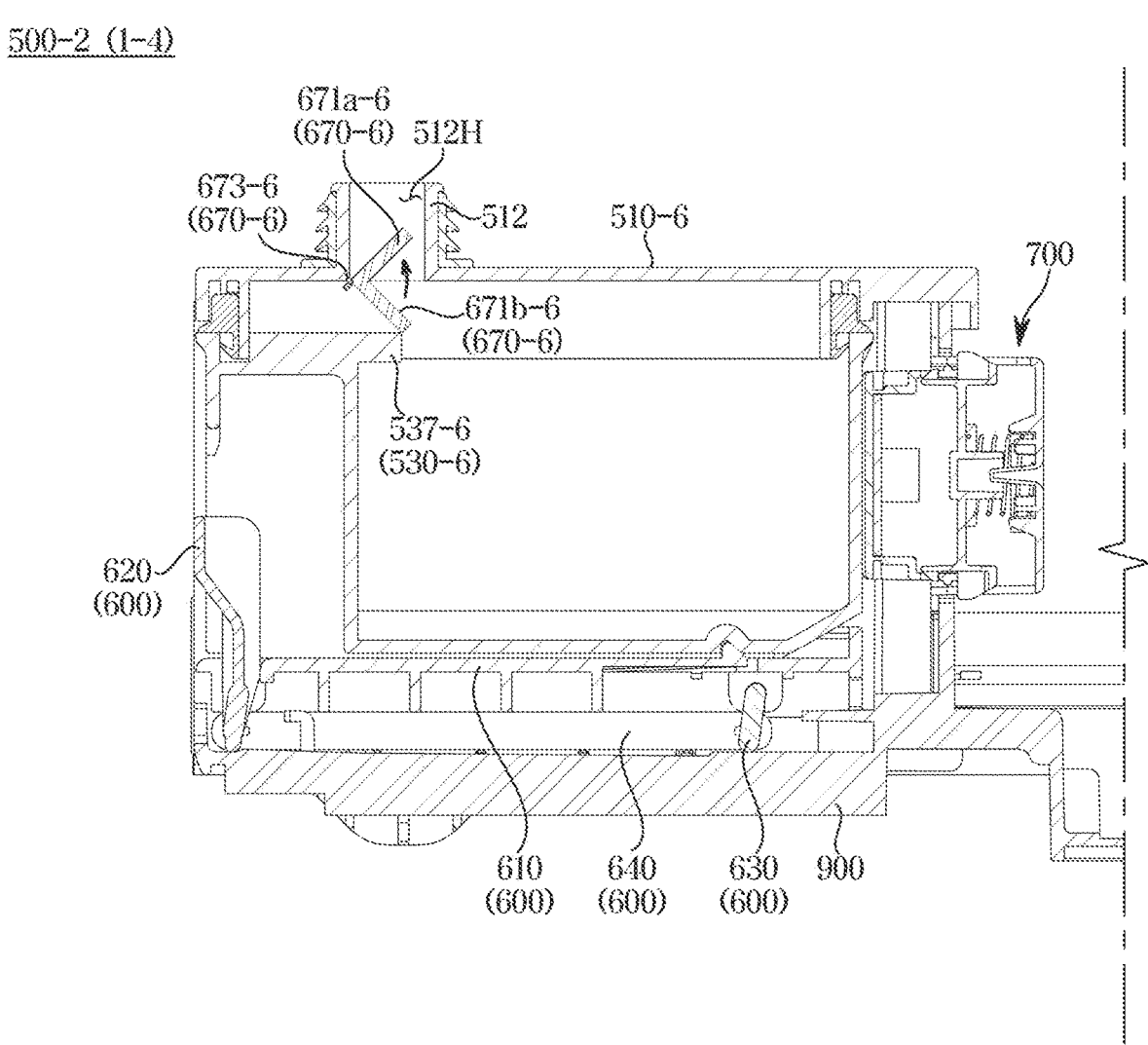
FIG. 32 is a cross-sectional view of a food waste disposer according to an embodiment of the disclosure.
Figure 33:
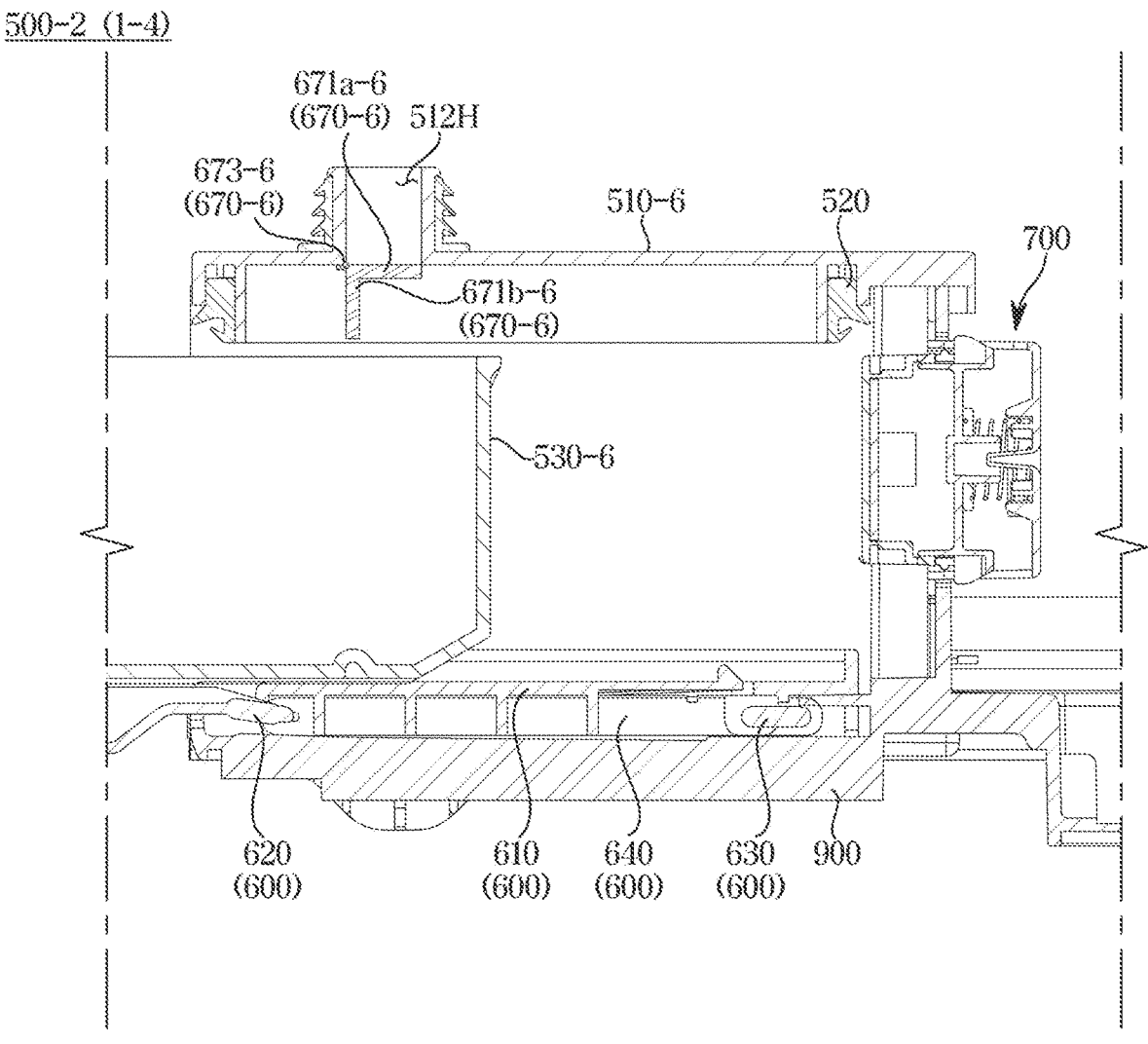
FIG. 33 is a cross-sectional view illustrating a state in which a water storage container of the food waste disposer shown in FIG. 32 is in a separating position.

FIG. 32 is a cross-sectional view of a food waste disposer 1-6 according to an embodiment of the disclosure. FIG. 33 is a cross-sectional view illustrating a state in which a water storage container 530-6 of the food waste disposer 1-6 shown in FIG. 32 is in a separating position Referring to FIGS. 32 and 33, the water storage 500-6 according to an embodiment of the disclosure may include an opening and closing device 670-6.

A water storage cover 510-6 may include a filter connection hole 512H defined to communicate with the outside of the cover housings 12 and 13.

The opening and closing device 670-6 may be configured to open the filter connection hole 512H when the water storage container 530-6 is in the locked position. The opening and closing device 670-6 may be configured to close the filter connection hole 512H when the water storage container 530-6 is located outside the cover housings 12 and 13.

When the water storage 500-6 is in the separating position, the opening and closing device 670-6 may be configured to close the filter connection hole 512H, and when the water storage 500-6 is in the receiving position, the opening and closing device 670-6 may be configured to open the filter connection hole 512H.

When the water storage container 530-6 is in the separating position, the exhaust pipes 110 and 130 may communicate with the outside of the food waste disposers 1-6. Accordingly, odor generated from the condensed water may be released around the food waste disposers 1-6.

The opening and closing device 670-6 may be positioned adjacent to the filter connection hole 512H. The opening and closing device 670-6 may be rotatably coupled to one side of the filter mounting member 512.

The opening and closing device 670-6 may have a shape extending in one direction and in another direction crossing the one direction.

The opening and closing device 670-6 may include a first extension member 671a-6 extending forward from a rotation axis in response to the water storage container 530-6 being in the separating position. The first extension member 671a-6 may close the filter connection hole 512H.

The opening and closing device 670-6 may include a second extension member 671a-6 extending downward from the rotation axis in response to the water storage container 530-6 being in the separating position.

The opening and closing device 670-6 may include an opening and closing device stopper 673 supported by the water storage cover 510 to limit rotation in response to the water storage container 530-6 being in the separating position.

When the water storage container 530-6 is in the receiving position, the filter connection hole 512H may be closed by the first extension member 671a-6.

The water storage container 530-6 may include an opening and closing device pressing member 537-6 extending forward. The opening and closing device pressing member 537-6 may be configured to be rotated by pressing the opening and closing device 670-6.

When the water storage container 530 is in the receiving position, the opening and closing device pressing member 537-6 may press a second extension member 671*b*-6. Accordingly, the first extension member 671*a*-6 may be moved to the inside of the filter connection hole 512H.

In this case, the filter connection hole 512H may be open. When the water storage container 530-6 is in the receiving position, air may need to be moved to the filter assembly 150.

As is apparent from the above description, a food waste disposer may include a water storage connected to an exhaust flow path, and the water storage may be configured to removably receive a water storage container. Accordingly, the water storage container may be removable.

Further, a food waste disposer may include a locking seat configured to prevent a water storage container from being moved to a separating position. Therefore, when the water storage container is received, the water storage container may not be easily separated, and thus it is possible to prevent condensed water from splashing, thereby preventing the contamination of the surrounding area during an operation.

Further, a food waste disposer may include a water storage cover and a gasket provided to seal a water storage container when the water storage container is received. Accordingly, it is possible to prevent odors generated from condensed water stored in the water storage container from leaking out of the food waste disposer.

Further, a food waste disposer may allow a water storage container to be moved to a locked position for sealing the water storage container when the water storage container is in a receiving position. Accordingly, it is possible to seal between the water storage container and a water storage cover.

Further, a food waste disposer may include a lock configured to pivot so as to allow a water storage container to be moved to a water storage cover, and thus the water storage container may be easily moved to the water storage cover.

Further, a food waste disposer may include a lock and a sub-lock arranged opposite to the lock. Accordingly, while a water storage container moves to a locked position, the water storage container may be moved while maintaining a level.

Further, a food waste disposer may slide to a separating direction relative to a locking seat. Accordingly, while a water storage container moves from a receiving position to a separating position, the locking seat may be prevented from being moved.

Further, a food waste disposer may include a protrusion rib provided to reduce a friction with a lock by reducing a contact area with the lock. Accordingly, the locking seat may be easily moved.

Further, a food waste disposer may include a water storage housing provided to receive a water storage container, and the water storage housing may include a base surface inclined to one side, and a protrusion rib protruding from the base surface to correct an inclination. Accordingly, it is possible to prevent condensed water from overflowing from the water storage container, and to maintain a level of the water storage container.

Although a few embodiments of the disclosure have been shown and described, it would be appreciated by those skilled in the art that changes may be made in these embodiments without departing from the principles and spirit of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A food waste disposer comprising:
a cover housing;
a disposal being inside the cover housing and configured to receive food waste;
an exhaust pipe connected to the disposal and configured to guide air containing moisture;
a water storage container having a water storage opening configured to collect condensed water from the exhaust pipe, the water storage container configured to separate from the cover housing;
a water storage cover connected to the exhaust pipe, the water storage cover configured to cover the water storage opening of the water storage container; and
a locking seat configured to limit movement of the water storage container,
wherein a space between the water storage container and the water storage cover is sealed in response to the movement of the water storage container being limited by the locking seat, and
wherein while the water storage container moves toward the water storage cover, the water storage container moves from an unlocked position allowing the movement to a locked position limiting the movement.

2. The food waste disposer of claim 1, further comprising a base housing configured to support the water storage container between the base housing and the water storage cover,
wherein the locking seat includes a lock including a connection shaft support configured to move the water storage container by pressing the base housing while the water storage container moves from the unlocked position to the locked position.

3. The food waste disposer of claim 2, wherein the connection shaft support is configured to move from a first position, in which the water storage container and the water storage cover are spaced apart by a first distance, to a second position, in which the water storage container and the water storage cover are spaced apart by a second distance less than the first distance while the water storage container moves from the unlocked position to the locked position.

4. The food waste disposer of claim 3, further comprising:
a gasket being between the water storage container and the water storage cover and configured to seal between the water storage container and the water storage cover in response to the water storage container being in the locked position.

5. The food waste disposer of claim 3, wherein:
the locking seat further includes a support plate coupled to the water storage container, the support plate being between the water storage container and the base housing, and
the connection shaft support is configured to move the water storage container by pressing the support plate while the water storage container moves from the unlocked position to the locked position.

6. The food waste disposer of claim 5, wherein:
the support plate is configured to move together with the water storage container in response to the water storage container moving from the locked position to the unlocked position; and

the water storage container is configured to slide with respect to the support plate while the water storage container is separated from the cover housing.

7. The food waste disposer of claim 6, wherein:

the lock further includes:

a rotation shaft rotatably coupled to the support plate; and a handle extending from one side of the rotation shaft, and the connection shaft support extends from the handle and is configured to move from the first position to the second position in response to rotation of the handle with respect to the rotation shaft.

8. The food waste disposer of claim 7, wherein:

the support plate includes:

a first unit member; and a second unit member being in parallel to the first unit member with respect to a direction in which the water storage container is received in the cover housing, the lock is coupled to the first unit member, and the locking seat includes a sub-lock provided to correspond to the lock, the sub-lock configured to couple to the second unit member and configured to allow the support plate to move while maintaining a level while the connection shaft support moves from the first position to the second position.

9. The food waste disposer of claim 8, wherein the locking seat includes a connection link rotatably coupled to the lock and the sub-lock so as to allow the lock and the sub-lock to move in conjunction with each other.

10. The food waste disposer of claim 9, wherein the base housing includes a lock support rib provided to be in contact with the lock in response to the connection shaft support being in the first position, the lock support rib provided to extend toward a direction, in which the connection shaft support moves, and configured to allow vibration to occur as the lock support rib is separated from the lock in response to the connection shaft support moving from the first position to the second position.

11. The food waste disposer of claim 7, wherein the base housing includes a lock contact member provided to support the connection shaft support and configured to allow the support plate to move toward the base housing while the water storage container moves from the locked position to the unlocked position.

12. The food waste disposer of claim 11, wherein the base housing includes a base guide rib provided to extend in a direction toward the water storage cover, the base housing configured to insert into the support plate so as to guide the support plate while the water storage container moves from the unlocked position to the locked position.

13. The food waste disposer of claim 3, wherein the base housing includes at least one friction rib protruding toward the locking seat and configured to reduce a frictional force generated between the base housing and the locking seat.

14. The food waste disposer of claim 13, wherein:

the base housing has a base surface provided to face the locking seat, the base surface is inclined to collect condensed water, and the at least one friction rib has a rib friction surface facing the locking seat, the rib friction surface defined to correct an inclination of the base surface.

15. A food waste disposer comprising:

a cover housing;

54 a disposal arranged inside the cover housing;

a heater configured to heat the disposal;

an exhaust pipe connected to the disposal;

a water storage container comprising a water storage opening configured to collect condensed water in the exhaust pipe, the water storage container is configured to separate from the cover housing;

a water storage cover connected to the exhaust pipe, and configured to cover the water storage opening of the water storage container;

a gasket arranged between the water storage container and the water storage cover and configured to create a seal between the water storage container and the water storage cover; and a locking seat comprising a lock configured to move the water storage container from an unlocked position, in which a movement out of the cover housing is allowed, to a locked position, in which the movement is limited, wherein in response the water storage container being in the locked position, the gasket seals between water storage cover and the water storage container.

16. The food waste disposer of claim 15, further comprising:

a base housing configured to allow the water storage container to be located between the base housing and the water storage cover, wherein the lock comprises:

a rotation shaft configured to be rotated;

a handle extending from one side of the rotation shaft; and a connection shaft support provided to extend in a direction opposite to the handle, the connection shaft support configured to move the water storage container to the gasket by pressing the base housing in response to rotation of the handle with respect to the rotation shaft.

17. The food waste disposer of claim 15, wherein the locking seat comprises a lifting device configured to move the water storage container to the water storage cover.

18. The food waste disposer of claim 15, wherein:

the water storage cover comprises a filter connection hole defined to communicate with an outside of the cover housing, and wherein the food waste disposer comprises an opening and closing device configured to open the filter connection hole in response to the water storage container being in the locked position, and configured to close the filter connection hole in response to the water storage container being outside the cover housing.

19. A food waste disposer comprising:

a cover housing;

a disposal configured to receive food waste;

an exhaust pipe connected to the disposal to guide air containing moisture;

a water storage container configured to collect condensed water in the exhaust pipe, and configured to be separated out of the cover housing;

a water storage cover connected to the exhaust pipe, and configured to cover the water storage container; and a locking seat configured to move the water storage container from an unlocked position, in which a movement out of the cover housing is allowed, to a locked position, in which the movement is limited.

* * * * *